(12) United States Patent
Altberg et al.

(10) Patent No.: US 9,105,032 B2
(45) Date of Patent: *Aug. 11, 2015

(54) SYSTEMS AND METHODS TO PROVIDE ADVERTISEMENTS FOR REAL TIME COMMUNICATIONS

(75) Inventors: Ebbe Altberg, Mill Valley, CA (US); Scott Faber, San Francisco, CA (US); Ron Hirson, San Francisco, CA (US); Sean Van Der Linden, Berkeley, CA (US); Paul G. Manca, Oakland, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 1599 days.

This patent is subject to a terminal disclaimer.

(21) Appl. No.: 12/114,556

(22) Filed: May 2, 2008

(65) Prior Publication Data

US 2008/0275785 A1 Nov. 6, 2008

Related U.S. Application Data

(60) Provisional application No. 60/915,913, filed on May 3, 2007.

(51) Int. Cl.
*G06Q 30/00* (2012.01)
*G06Q 30/02* (2012.01)
*G05B 19/418* (2006.01)

(52) U.S. Cl.
CPC ............ *G06Q 30/02* (2013.01); *G06Q 30/0256* (2013.01); *G06Q 30/0264* (2013.01); *G06Q 30/0275* (2013.01); *G06Q 30/0277* (2013.01)

(58) Field of Classification Search
None
See application file for complete search history.

(56) References Cited

U.S. PATENT DOCUMENTS 4,741,025 A 4/1988 Maruyama et al.
4,796,293 A 1/1989 Blinken et al.
(Continued)

FOREIGN PATENT DOCUMENTS

GB 2329046 3/1999
KR 20020076497 10/2002
WO 2002044870 6/2002

OTHER PUBLICATIONS

"New telecommunications technology will change the face of advertising", Copyright Boston Globe Newspaper Feb. 27, 1999. It discusses real time advertising in telecommunications.*

(Continued)

*Primary Examiner* — Victoria Vanderhorst
(74) *Attorney, Agent, or Firm* — Kilpatrick Townsend & Stockton LLP

(57) ABSTRACT

Systems and methods to provide advertisements based on the content of documents in which the advertisements are presented. One embodiment includes: a web server to receive a request for an advertisement in reference to a document provided to a user by a content provider; a backend server to identify the advertisement based on relevancy of the advertisement to the content of the document and to associate a communication reference with the advertisement and the content provider, the web server to provide the advertisement and the reference for inclusion in the document; and a telecommunication server coupled to a session border controller and the backend server to receive a connection request via the reference, to determine contact information of the advertiser and identify the content provider based on the reference, and to establish the connection between the user and the advertiser using the determined contact information.

20 Claims, 38 Drawing Sheets

(56) References Cited

U.S. PATENT DOCUMENTS

| | | | |
|---|---|---|---|
| 5,099,510 | A | 3/1992 | Blinken, Jr. et al. |
| 5,361,295 | A | 11/1994 | Solomon et al. |
| 5,373,549 | A | 12/1994 | Bales et al. |
| 5,436,957 | A | 7/1995 | McConnell |
| 5,483,352 | A | 1/1996 | Fukuyama et al. |
| 5,483,588 | A | 1/1996 | Eaton et al. |
| 5,539,813 | A | 7/1996 | Jonsson |
| 5,544,237 | A | 8/1996 | Bales et al. |
| 5,555,298 | A | 9/1996 | Jonsson |
| 5,559,875 | A | 9/1996 | Bieselin et al. |
| 5,608,786 | A | 3/1997 | Gordon |
| 5,619,555 | A | 4/1997 | Fenton et al. |
| 5,644,715 | A | 7/1997 | Baugher |
| 5,689,553 | A | 11/1997 | Ahuja et al. |
| 5,740,549 | A | 4/1998 | Reilly et al. |
| 5,841,763 | A | 11/1998 | Leondires et al. |
| 5,862,223 | A | 1/1999 | Walker et al. |
| 5,991,394 | A | 11/1999 | Dezonno et al. |
| 6,131,085 | A | 10/2000 | Rossides |
| 6,223,165 | B1 | 4/2001 | Lauffer |
| 6,301,350 | B1 | 10/2001 | Henningson et al. |
| 6,529,946 | B2 | 3/2003 | Yokono et al. |
| 6,535,506 | B1 | 3/2003 | Narain et al. |
| 6,976,017 | B1 | 12/2005 | Getchius |
| 7,136,875 | B2 | 11/2006 | Anderson et al. |
| 7,380,139 | B2 | 5/2008 | Tagawa et al. |
| 7,548,915 | B2 * | 6/2009 | Ramer et al. ............... 705/14.54 |
| 2002/0032631 | A1 * | 3/2002 | Rose .............................. 705/37 |
| 2003/0086556 | A1 * | 5/2003 | Welch et al. ............ 379/265.09 |
| 2003/0220866 | A1 * | 11/2003 | Pisaris-Henderson et al. . 705/37 |
| 2004/0059708 | A1 | 3/2004 | Dean et al. |
| 2004/0093327 | A1 * | 5/2004 | Anderson et al. ................. 707/3 |
| 2005/0091106 | A1 | 4/2005 | Reller et al. |
| 2005/0149395 | A1 | 7/2005 | Henkin et al. |
| 2005/0165615 | A1 | 7/2005 | Minar |
| 2006/0031516 | A1 | 2/2006 | Kumer |
| 2006/0075104 | A1 | 4/2006 | Kumer |
| 2006/0184378 | A1 | 8/2006 | Agarwal et al. |
| 2006/0282412 | A1 | 12/2006 | Getchius |
| 2007/0072676 | A1 | 3/2007 | Baluja |
| 2007/0112656 | A1 | 5/2007 | Howe et al. |
| 2008/0215961 | A1 * | 9/2008 | Altberg et al. ................ 715/205 |

OTHER PUBLICATIONS

"Applying Technology News," Accounting Technology, p. 14, Feb./Mar. 1997.

"TriNet's 'Help Me, I'm Stuck' Internet Voice Button Services Pushes Web Pages to Online Users," Business Wire, Mar. 25, 1998.

allexperts.com, company information retrieved from http://www.allexperts.com, available at least by Apr. 9, 2000.

answers.com, company information retrieved from http://www.answers.com, available at least by Aug. 8, 2000.

Dalton, Gregory, "Rent-An-Expert on the Web," Information Week, p. 75, Sep. 6, 1999.

exp.com, Inc., company information retrieved from http://www.exp.com, available at least by Sep. 20, 2000.

expertcity.com, "About Us," company information retrieved from http://www.expertcity.com, available at least by Apr. 9, 2000.

Experts Exchange, Inc., company information retrieved from http://www.experts-exchange.com, available at least by Apr. 9, 2000.

Sterling, Greg, "Ingenio's Ether—Pay Per Professional Advice," Search Engine Journal, Mar. 3, 2006.

University of Texas—Austin, information on the Electronic Emissary Project retrieved at www.tapr.org/ emissary, available at least by Apr. 9, 2000.

Wasik, Joann M., "Information for Sale: Commercial Digital Reference and AskA Services," Virtual Reference Desk, http://www.vrd.org/AskA/commAskA.html, Sep. 20, 1999.

Wieland, Heidi et al., "Expertcity.com Launches Premier Online Marketplace for Expert Services," PR Newswire, Aug. 30, 1999.

USPTO Transaction History of U.S. Appl. No. 12/027,144, filed Feb. 6, 2008, entitled "Systems and Methods to Facilitate Communications.".

* cited by examiner

FUNCTIONAL DESCRIPTION OF SYSTEM

— 114

SCROLL DOWN to see more listings    Refine your search by Zip Code:

Your search found 105 listings, Listings 1 to 15 listed below ...

Thinking of buying a new car?
Fill out iMotors' simple online form and receive a free new car quote from a local dealer by email within 24 hours. There is no obligation and no hassle. Serious buyers only please.

FEATURED DIRECTORY LISTINGS    scroll down for more listings

Dream Car Rentals    Cite Gold
3734 Las Vegas Blvd.
LAS VEGAS, NV
Phone: (702) 555-6661
Fax: (702) 555-6665
We Specialize in Excitement! Ferrari's. Viper's Porsche's & Hummers. Harley-Davidson's and SUV's "DRIVE THE DREAM"

Cite Gold
RENT-A-VETTE
5021 SWENSON STREET
LAS VEGAS, NV 89119
Phone: (702) 555-2692
Fax: (702) 555-2044

ONLINE LISTINGS    scroll down for more listings

Expedia: For All Your Car Rental Needs  http://www.expedia.com
Save with Expedia.com, your one-stop source for flights, hotels, vacation packages, cruises, and rental

FIG. 9

SYSTEMS AND METHODS TO PROVIDE ADVERTISEMENTS FOR REAL TIME COMMUNICATIONS

CROSS-REFERENCE TO RELATED APPLICATIONS

The present application claims the priority from Provisional U.S. Patent Application Ser. No. 60/915,913, filed May 3, 2007 and entitled "Systems and Methods to Provide Advertisements for Real Time Communications," the disclosure of which is incorporated herein by reference.

The present patent application is related to: U.S. patent application Ser. No. 11/565,546, filed Nov. 30, 2006 and claimed priority from Provisional U.S. Patent Application Ser. No. 60/862,710 filed Oct. 24, 2006; U.S. patent application Ser. No. 11/505,225, filed Aug. 15, 2006; U.S. patent application Ser. No. 11/559,860, filed Nov. 14, 2006; U.S. patent application Ser. No. 11/077,655, filed Mar. 10, 2005 and claimed priority from Provisional U.S. Patent Application 60/653,708 filed on Feb. 16, 2005, Provisional U.S. Patent Application Ser. No. 60/568,156 filed on May 4, 2004, Provisional U.S. Patent Application Ser. No. 60/560,926 filed on Apr. 9, 2004 and Provisional U.S. Patent Application Ser. No. 60/552,124 filed on Mar. 10, 2004; U.S. patent application Ser. No. 11/092,309, filed Mar. 28, 2005 and claimed priority from Provisional U.S. Patent Application 60/653,660 filed on Feb. 16, 2005; and U.S. patent application Ser. No. 11/095,853, filed Mar. 30, 2005 and claimed priority from Provisional U.S. Patent Application 60/653,661 filed on Feb. 16, 2005. The parent patent application Ser. No. 11/092,309 is a continuation in part application of: U.S. patent application Ser. No. 11/014,073, filed Dec. 15, 2004; U.S. patent application Ser. No. 10/872,117, filed Jun. 17, 2004; and, U.S. patent application Ser. No. 11/021,939, filed Dec. 23, 2004, which is a continuation in part application of U.S. patent application Ser. No. 10/679,982, filed Oct. 6, 2003. The disclosures of the above applications are hereby incorporated herein by reference.

TECHNOLOGY FIELD

At least some embodiments relate to telephonic connections and advertising in general and performance-based advertising in particular.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, in one form of performance-based search advertising, an advertisement is included within a result page of a keyword search. Each selection ("click") of the advertisement from the results page is the measurable event for which the advertiser pays. In other words, payment by the advertiser is on a per click basis in such advertising.

BRIEF DESCRIPTION OF THE DRAWINGS

The present disclosure is illustrated by way of example and not limitation in the figures of the accompanying drawings in which like references indicate similar elements.

FIG. 9 shows an example of a search engine result page, which includes an advertisement generated, in accordance with one embodiment.

DETAILED DESCRIPTION

In the following description, for purposes of explanation, numerous specific details are set forth in order to provide a thorough understanding of the description. It will be apparent, however, to one skilled in the art that the techniques can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
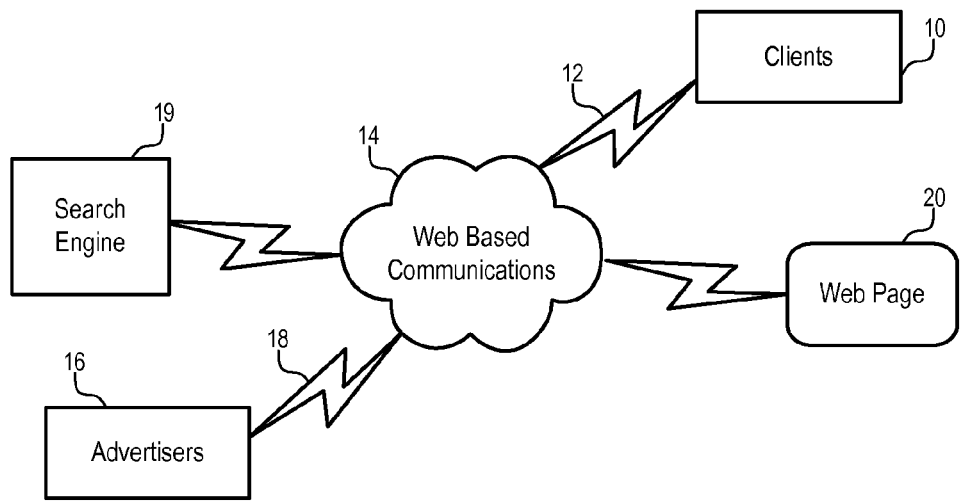
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
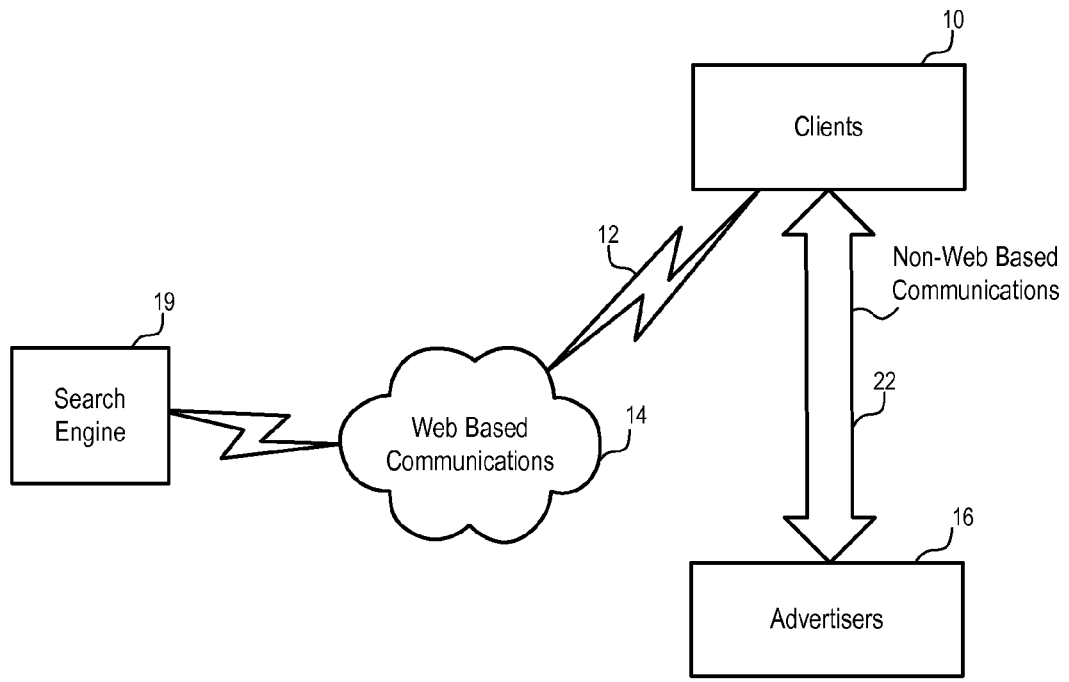
FIG. 2 shows an interaction between clients and advertisers, in accordance with one embodiment.

Referring now to FIG. 2 of the drawings, a method for allowing advertisers to participate in a pay per call advertising program, without requiring that the advertisers have a web presence, in accordance with one embodiment, is illustrated.

As will be seen, the clients 10 are coupled to the WAN 14 via the communications path 12, as before. However, the communications path between the advertisers 16 and the WAN 14 is purely optional. In other words, the techniques allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages. Instead, in accordance with the techniques disclosed herein, an alternative non-web based communications path 22 is provided between the clients 10 and the advertisers 16. According to some embodiments, the non-web based communications path 22 may be provided by a conventional telephone network. Alternatively, the non-web based communications path 22 may utilize Voice over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, VoIP clients, etc.

Figure 3:
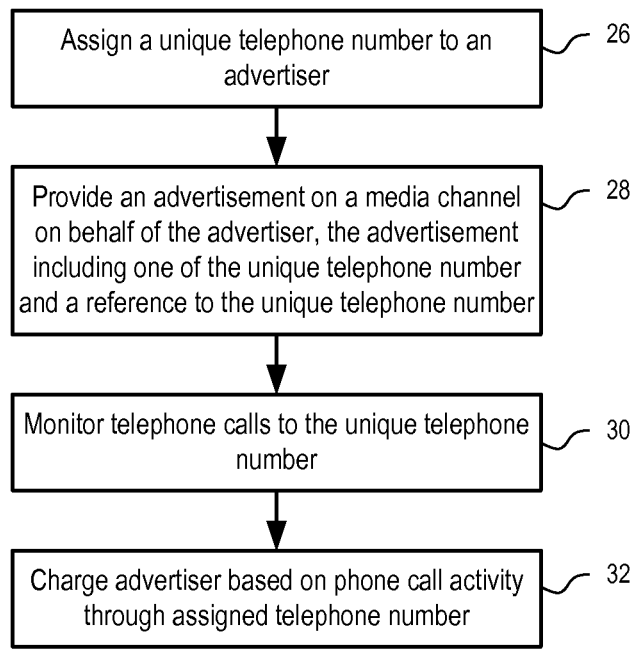
FIG. 3 shows a flowchart of operations performed in accordance with one embodiment.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
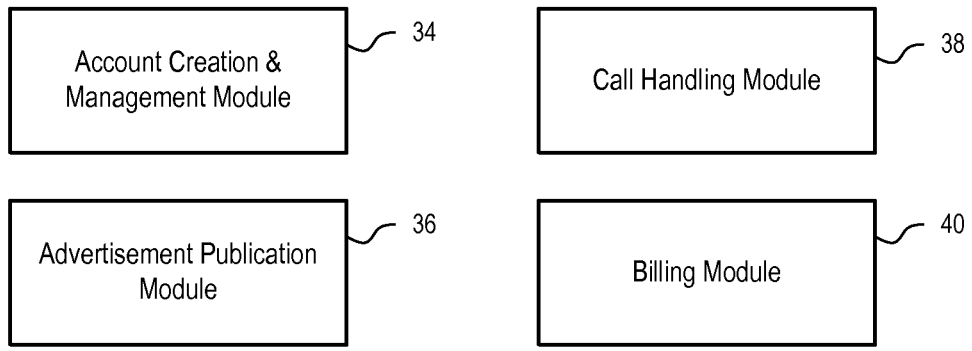
FIG. 4 shows a high level functional description of a system in accordance with one embodiment.

FIG. 4 of the drawings shows a functional description of a system to implement the method of FIG. 3. Referring to FIG. 4, the system includes account creation and management module 34, advertisement publication module 36, call handling module 38, and billing module 40. In alternative embodiments, additional, less, or different modules may be included in the system.

Figure 5:
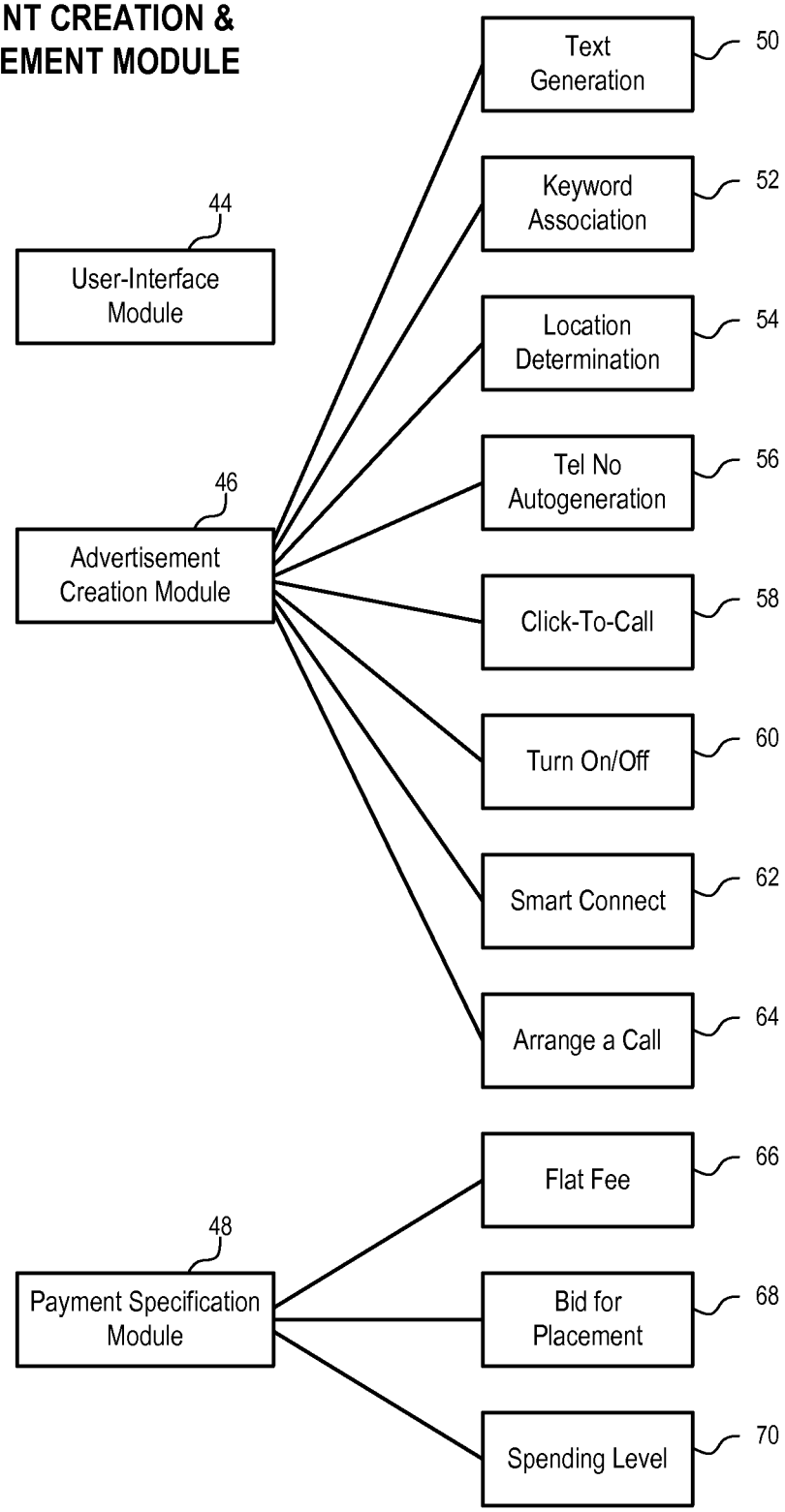
FIG. 5 illustrates the Account Creation and Management module of the system, in greater detail.
Figure 8A:
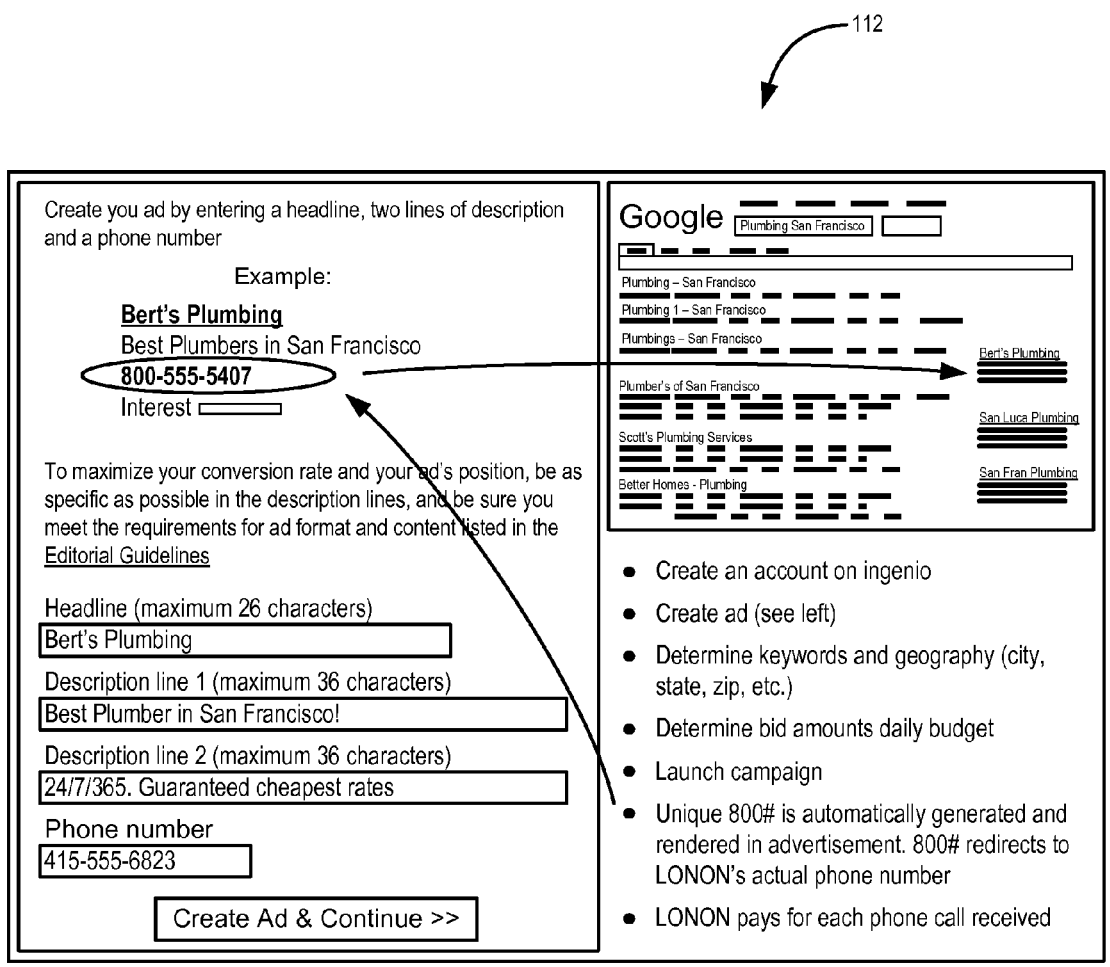
FIG. 8A shows an example of a user interface that may be presented to a user during advertisement creation, in accordance with one embodiment.
Figure 8B:
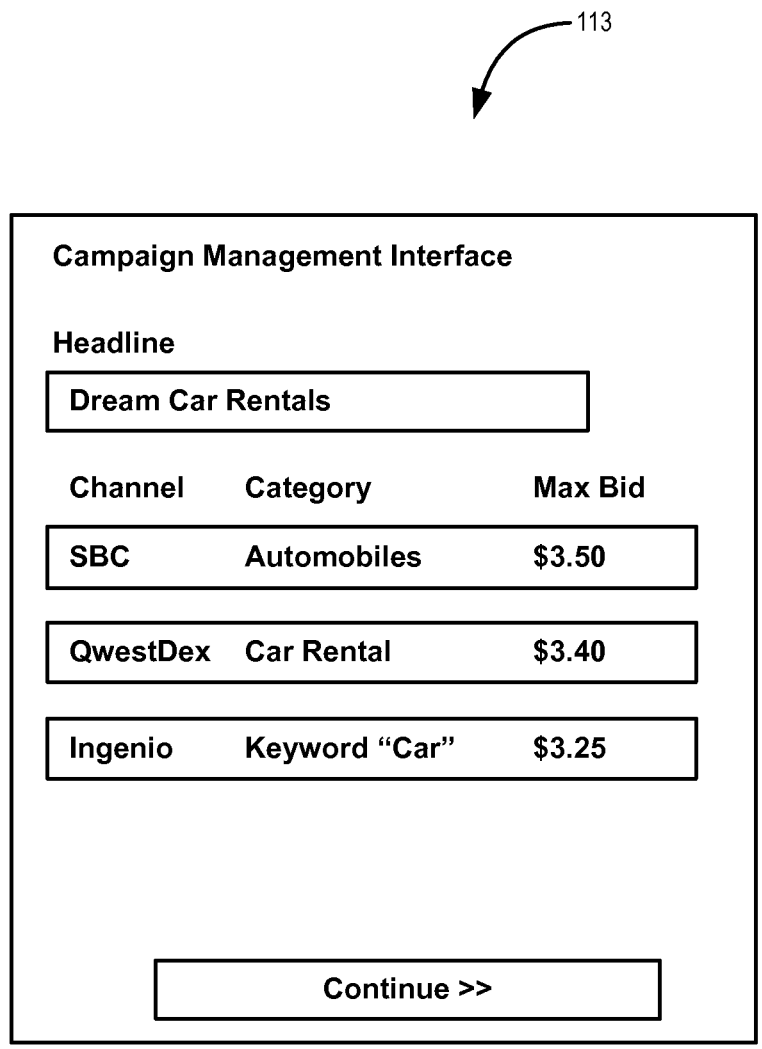
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client.

The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding, for the remainder of this description, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will be displayed to clients searching within the San Francisco area.

In one embodiment, the module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number is generated or selected from a pool of numbers at the time the advertisement is created; alternatively, the telephone number is generated or selected at the time the advertisement is being requested for display. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1 800 YEL PAGES-1234, the call will be automatically routed to Burt's telephone as will be described in more detail below.

In one embodiment, the telephone number (e.g., a traditional telephone number with or without an extension, or a VoIP-based telephone reference, such as a Session Initiation Protocol (SIP) address) is automatically generated or selected at the time the advertisement is being requested for display. Alternatively, the telephone number assigned to the advertiser is generated or selected at the time the system accepts the submission of the advertisement from the advertiser. Alternatively, the telephone number assigned to the advertiser is generated or selected at the time the advertisement is being activated for publication via the system.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then tries cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory, or keyword. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account. Alternatively, Burt may provide payment information (e.g., a credit card number or bank account) to the system such that the system can automatically transfer additional funds, when needed, to his account according to the payment information.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system may be configured to waive the charges on leads from customers who have already called a particular advertiser within a specified number of days. In alternative embodiments, additional, less, or different logic may be included in the system.

Figure 6:
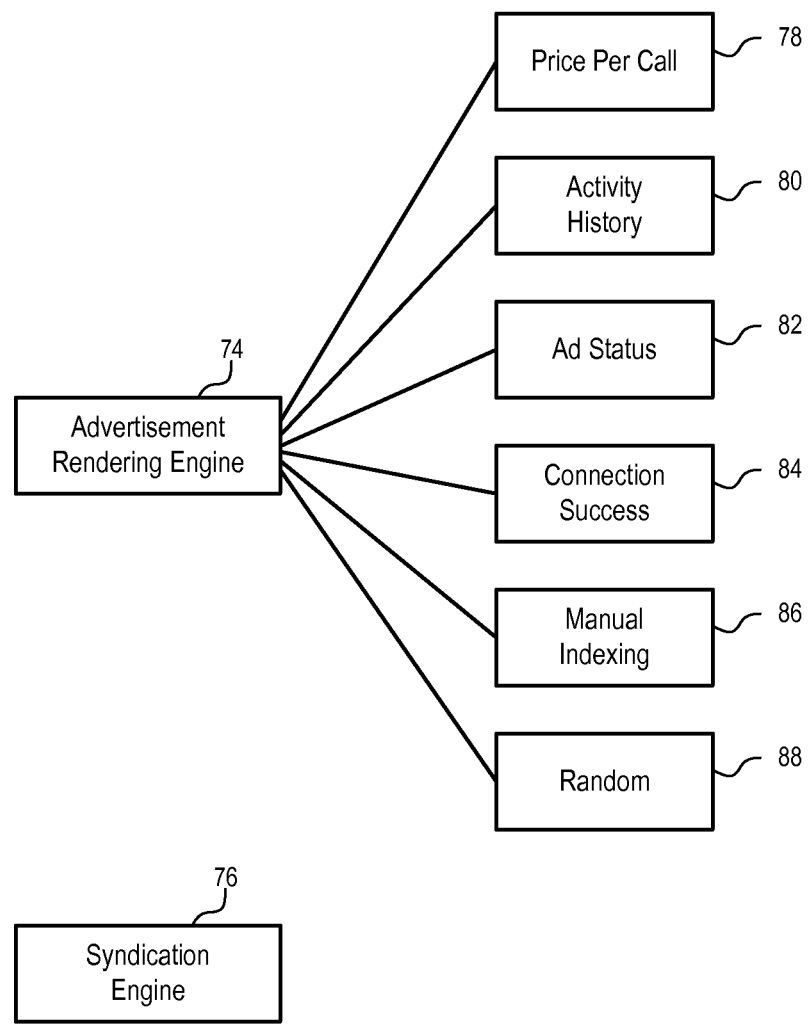
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement engine 74, and an advertisement syndication engine 76. The purpose of the advertisement engine 74 is to automatically provide Burt's advertisement on a particular channel. In some embodiments, the advertisement engine 74 causes a campaign management interface 113 (see FIG. 8B of the drawings) to be displayed to an advertiser. The interface 113 allows the advertiser to optionally choose a channel, e.g., Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately provided. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
| --- | --- | --- |
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a give time period, for example, the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement engine 74.

In one embodiment, an advertisement engine 74 further includes one or more modules for searching advertisements according to a query request, sorting advertisements, allocating real time communication references (e.g., traditional telephone numbers, SIP address, user ID of instant messaging system, etc.).

Figure 7:
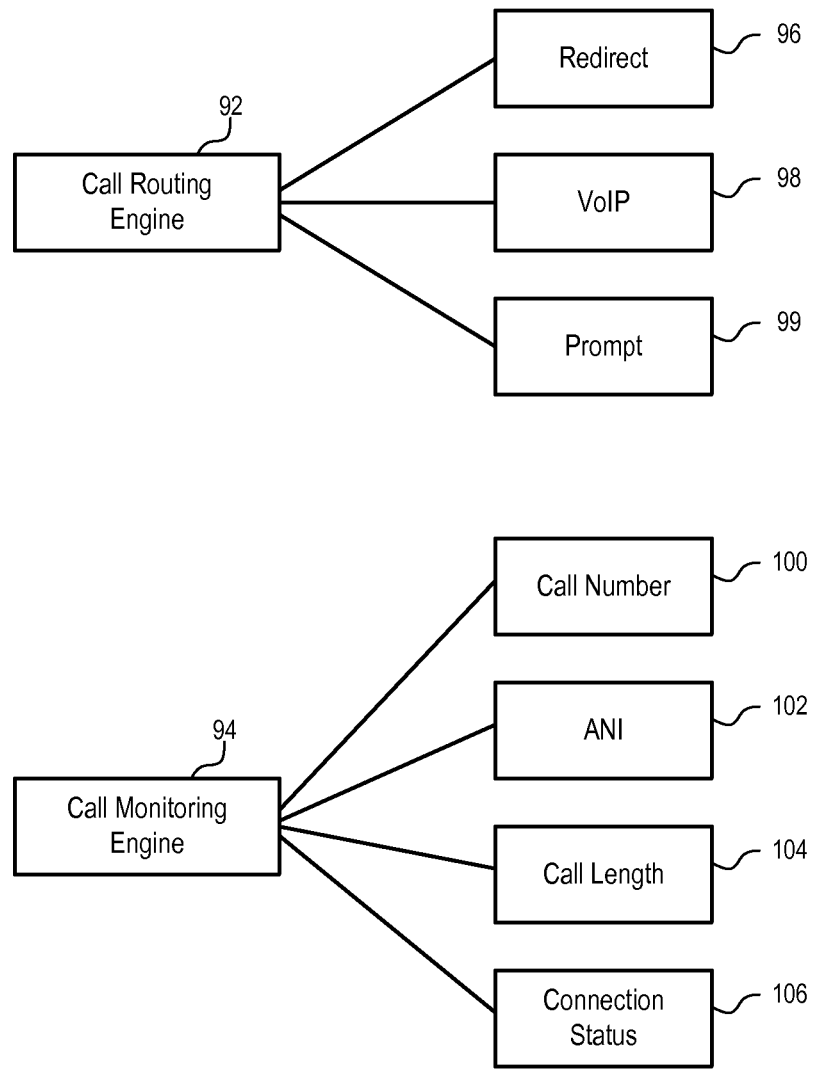
FIG. 7 illustrates the Call Handling Module of the system, in greater detail.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

Figure 10:
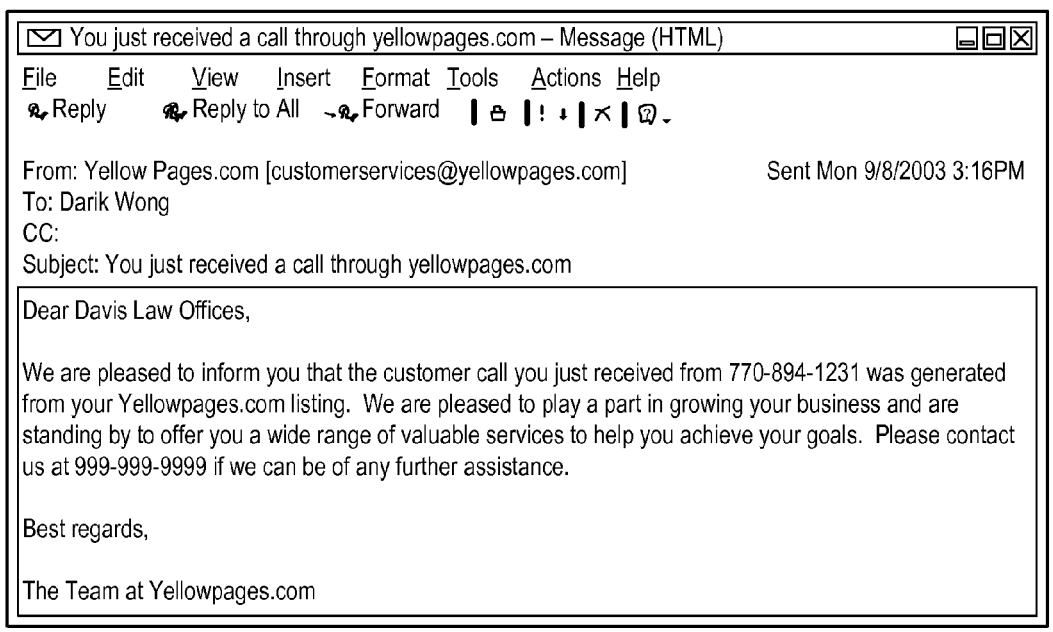
FIG. 10 shows an example of an email alert that is sent to an advertiser, when a call is generated, in accordance with one embodiment.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100 106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. In one embodiment, the report provides additional information based on an address lookup of the ANI, including but not limited to demographic, socioeconomic, and psychometric information. The report may be used by Burt in order to monitor the effectiveness of an advertisement campaign, and to optimize the campaign. In alternative embodiments, additional, less, or different logic may be included in the call monitoring engine 94.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
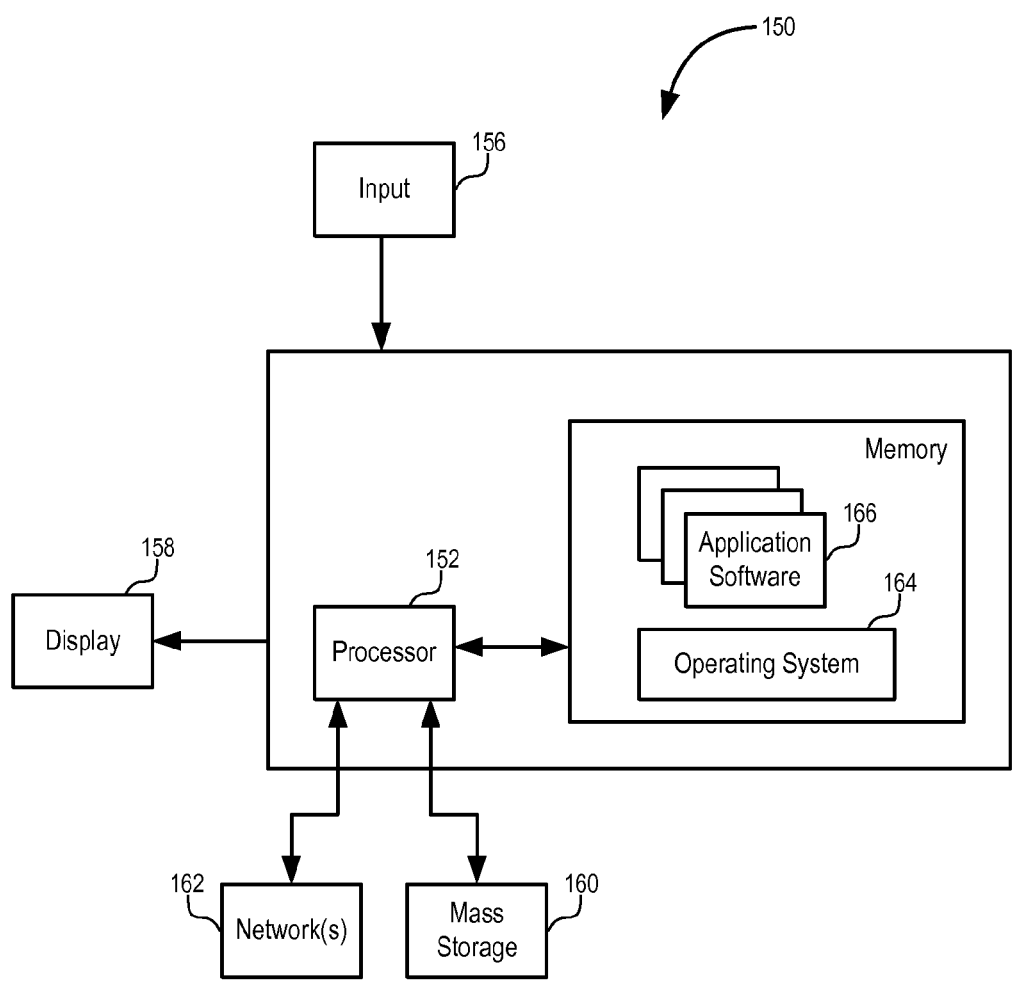
FIG. 11 shows a high level hardware block diagram of a system that may be used to implement the system, in accordance with one embodiment.

Referring to FIG. 11 of the drawings, reference numeral 150 generally indicates hardware that may be used to implement the above-described system. The hardware 150 typically includes at least one processor 152 coupled to the memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. These demand partners (also referred to herein as syndication partners) can receive a percentage of the advertising revenue generated via the pay-per-call method and system described, herein. Thus, as in the example of the table above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
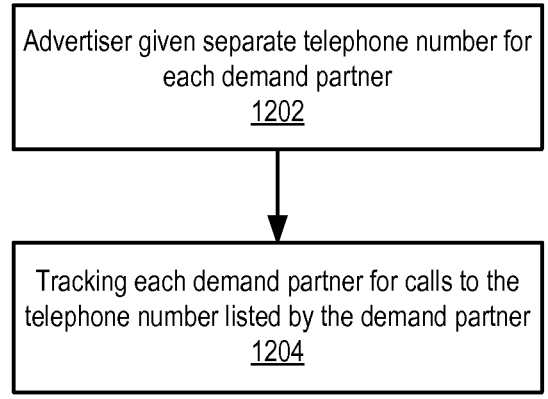
FIGS. 12-19 describe processes in accordance with some embodiments to track/credit demand partners.

In one embodiment, described in the flow diagram of FIG. 12, in process 1202 an advertiser (also referred to herein as a merchant or listing) is given a separate telephone number for each separate demand partner that is posting the merchant's advertisement. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
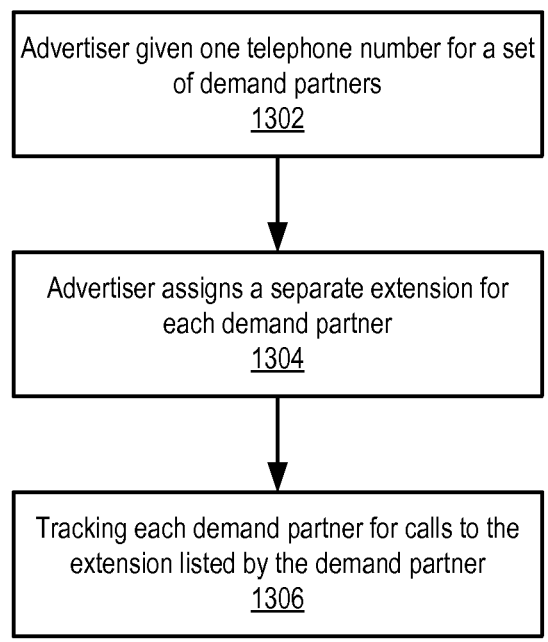

In another embodiment, described in the flow diagram of FIG. 13, in process 1302 an advertiser receives a single/base (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new-cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
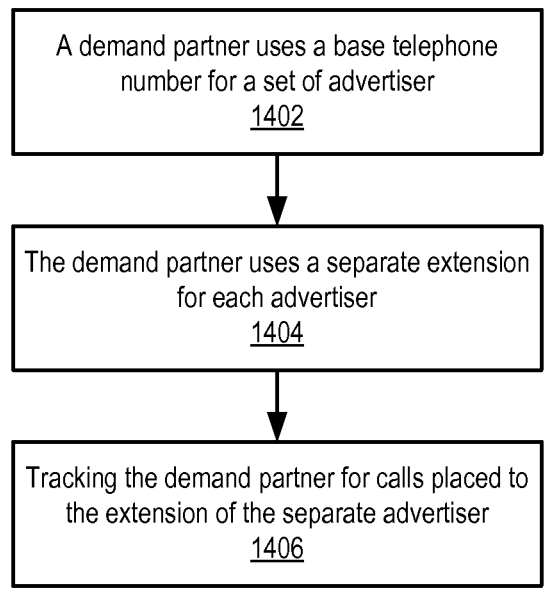

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
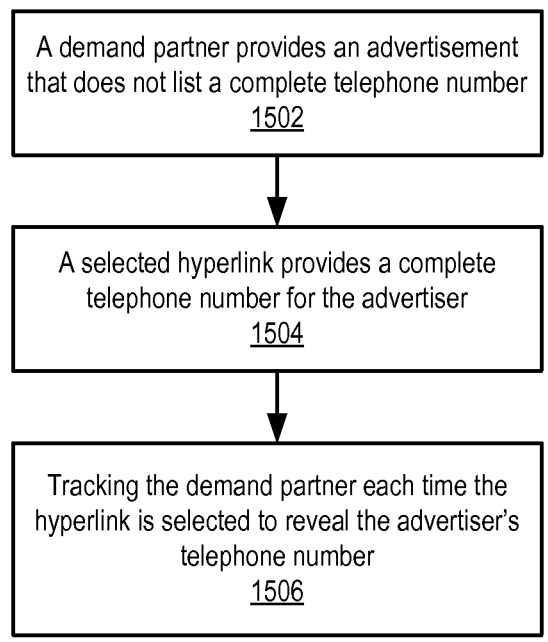

According to another embodiment, a click-to-reveal method is proposed, as described in co-pending U.S. Patent Application No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the advertisement engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
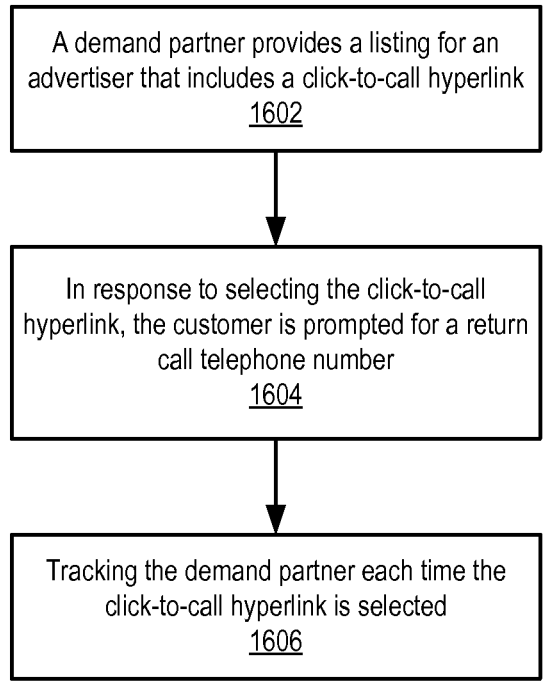

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link (e.g., a hyperlink, or an icon, or a button) is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
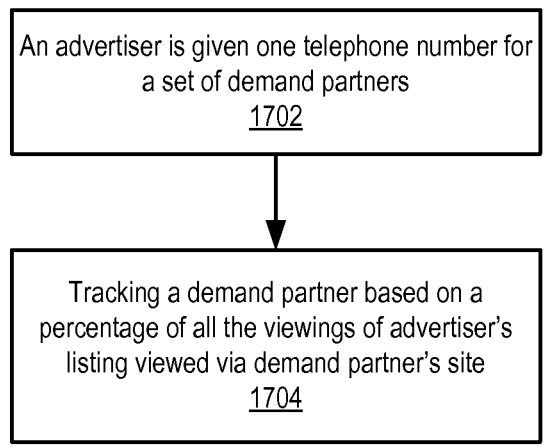

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
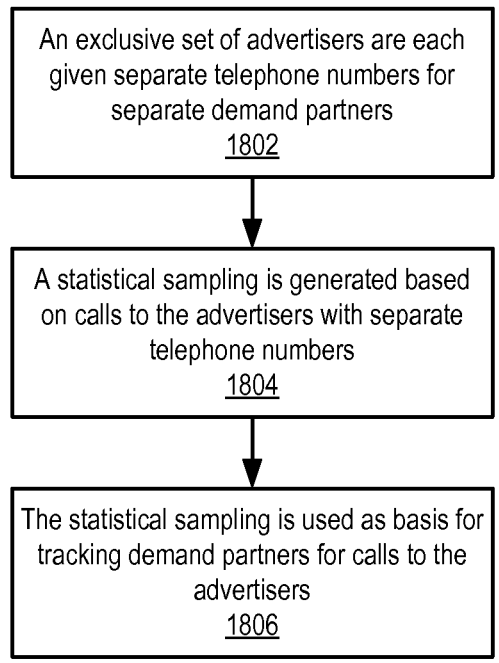

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are each give a unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers. By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for consumers to call. By counting the number of telephone calls such advertisements receive, the campaign's effectiveness can be measured. This is of benefit both to the advertiser and to the directory/publisher.

Telephone-call tracking can be also used as such in directories that are online, such as online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that described in U.S. patent application Ser. No. 10/872,117, filed Jun. 17, 2004, an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

In one embodiment, not only is it designed to track the number of calls and precise time of calls, but the demand source at which the caller viewed the advertisement may also be tracked. Online directories can have many different external web sites through which they syndicate the same advertisers, and it can be useful to know from which web site the phone call originated so that, in some cases, the directory can compensate the external web site for having brought customers. Provisional U.S. Patent Application Ser. No. 60/560,926, filed on Apr. 9, 2004, outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time/duration of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers. By monitoring which unique phone number was dialed, it can be determined which demand source deserves the credit for producing the call.

A potential problem with this approach is that it can require very many unique phone numbers. A single plumber could have five different advertisements, which each could be syndicated across 100 web-site directories, resulting in the provisioning of 500 unique phone numbers just to track the call distribution of a single plumber. A directory with 100,000 advertisers would need many millions of unique phone numbers to track call distribution. Unique phone numbers, either local numbers or toll-free 1-800 numbers, can be expensive to provision. Using large quantities of them as outlined above is prohibitively expensive.

One embodiment, therefore, provides a system to allocate and recycle telephone numbers. In one embodiment, the telephone numbers are allocated dynamically, only when they are needed. As a result, far fewer numbers are necessary. For instance, it could be that a particular plumber's advertisement for "industrial shower heads" might never be displayed at a certain search engine website. It would therefore be wasteful to allocate a unique phone number for that advertisement at that website. Only if a customer searches for "industrial shower heads" at that particular website should the system, dynamically, at that moment, allocate a unique phone number. This way, numbers would only be allocated when they are needed, and waste would be reduced.

In addition, one embodiment recycles numbers, thereby further reducing the total amount of numbers needed. For example, if a certain amount of time has passed since a unique number has been displayed, the system may automatically consider the number "clean" and recycle it, placing it back into the pool of numbers. Similarly, if a certain amount of time has passed since a unique number has been called, the system may automatically consider the number "clean" and recycle it, placing it back into the pool of numbers. Using these and other parameters, one embodiment conserves and recycles unique telephone numbers, requiring less telephone numbers and potentially reducing cost.

Figure 19:
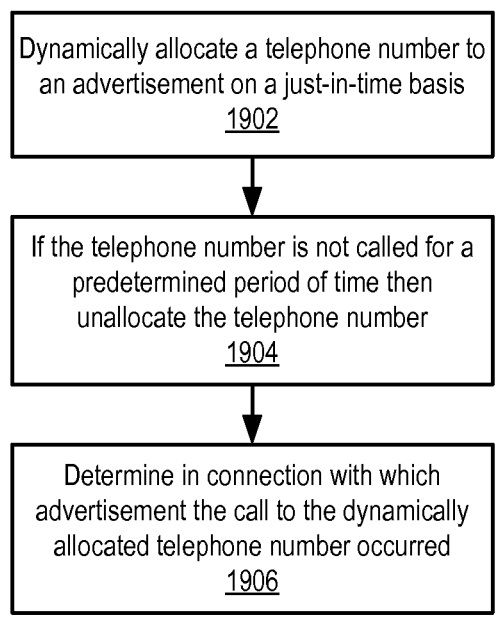

FIG. 19 provides a flow diagram describing the processes of allocating telephone numbers in accordance with one embodiment. Referring to FIG. 19, in process 1902 a telephone number is dynamically allocated to an advertisement on a just-in-time basis. For example, the telephone number is allocated in response to an end-user search submitted to a demand partner that would call for a particular advertiser's telephone number to be displayed. In one embodiment, a pool of unallocated telephone numbers is maintained. An unallocated telephone number is a telephone number that is not preassigned or linked in any way to a particular advertisement, advertiser, or demand partner. The process 1902 is performed by selecting a telephone number from the pool of unallocated telephone numbers and allocating the selected telephone number to the advertisement on a just-in-time basis. By use of the term "just-in-time basis" it is meant that the telephone number remains in the pool of unallocated telephone numbers and gets assigned or allocated to a particular advertisement just before a customer is about to view an advertisement that would include the telephone number.

In process 1904, if the telephone number that was allocated to the advertisement is not called for a predefined period of time, then the telephone number is unallocated and recycled into the pool of unallocated telephone numbers. For example, in one embodiment, the predefined period may be a fixed number of days. If no telephone call is made to the telephone number, then the telephone number gets unallocated.

In reference to FIG. 19, if the allocated telephone number does get called within the predefined time period, then the telephone number is correlated with the advertisement/advertiser to which it was allocated. Once the telephone call using the allocated telephone number is made, then the allocated telephone number is assigned to the advertiser associated with the advertisement (herein after the "associated advertisement"). Otherwise, if the allocated telephone number is not called, then the number remains free, and may be used for all demand partners.

In one embodiment, if the advertisement served by a demand partner results in a query, but no telephone call, then the dynamically allocated telephone number is associated with the advertisement for a predefined period of time. If the dynamically allocated telephone number is called within that predefined period of time, then the telephone number is associated with the advertisement for a longer period of time.

Referring again to FIG. 19, in process 1906, it is determined in connection with which advertisement the call to the allocated telephone number occurred. This determination is made for purposes of compensating/crediting demand partner that was the effective cause of the telephone call to the allocated telephone number.

Figure 20:
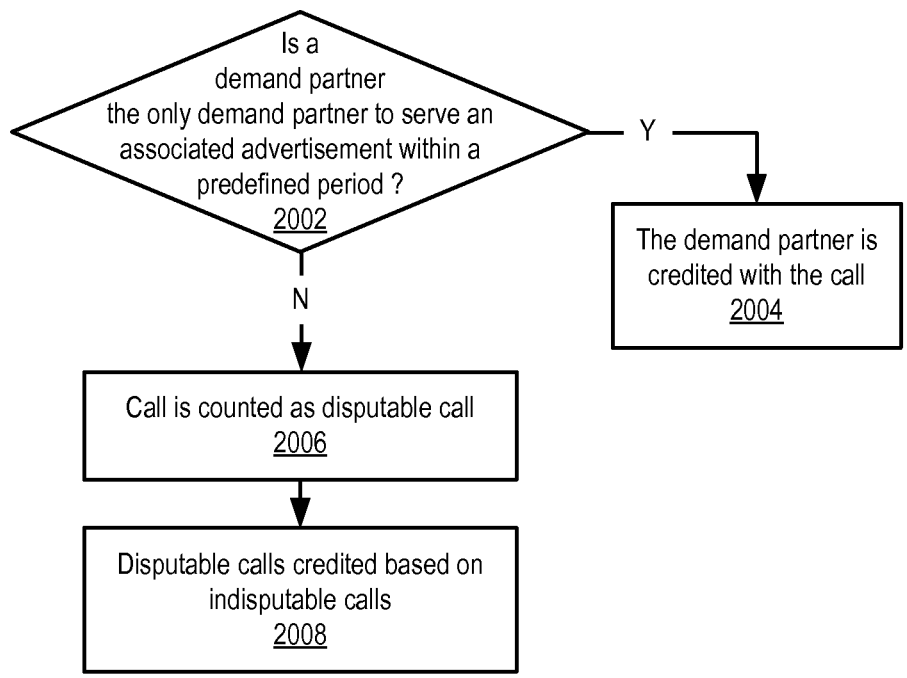
FIG. 20 presents a flow diagram describing the process of determining a demand partner to be credited with serving an advertisement that produced a phone call.

FIG. 20 presents a flow diagram describing the process of determining a demand partner to be credited with serving an advertisement that produced a phone call. In one embodiment, the determination is based on a temporal proximity between when a demand partner served the associated advertisement, and when the call occurred. In process 2002, if a particular demand partner was the only demand partner that served the associated advertisement within a predefined time period before the call occurred, then in process 2004 the particular demand partner is determined to be the demand partner in connection with which the call occurred. For example, if a demand partner X was the only demand partner that served the associated advertisement say within the past 30 minutes, then the demand partner X is determined to be the demand partner in connection with which the telephone call was made.

In one embodiment, if more than one demand partner served the associated advertisement within a predefined time period before the call occurred, then in process 2006 the telephone call is counted as part of a pool of disputable telephone calls. In one embodiment, in process 2008 credit is given to particular demand partners for which calls are placed in the pool of disputable calls, based on the proportion of indisputable calls attributable to the particular demand partner. For example, if a particular demand partner X has been attributed 70% off the indisputable calls, then demand partner X will also be attributed 70% off the calls in the disputable pool.

Figure 21:
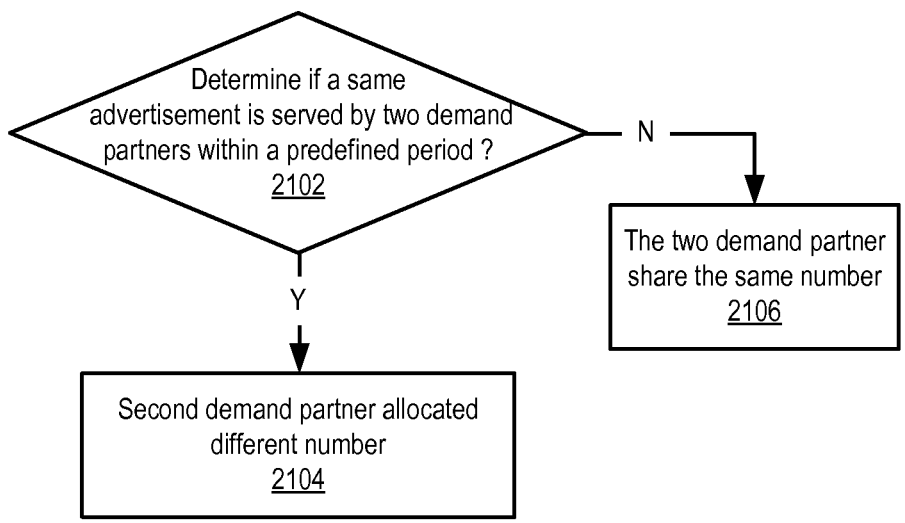
FIG. 21 presents a flow diagram describing the processes of allocating a telephone number for an advertiser/advertisement to multiple demand partners.

In another embodiment, the same telephone number may be allocated to different demand partners for the same advertiser/advertisement, thereby to reduce the number of required telephone numbers. FIG. 21 presents a flow diagram describing the processes of allocating a telephone number for an advertiser/advertisement to multiple demand partners. In process 2102, if an advertisement is served by a first demand partner, and then by a second demand partner within a predefined period of time, say 30 minutes, then in process 2104 the second demand partner would be allocated a new or different telephone number. However, if the service on the second demand partner occurs beyond the predefined period of time (30 minutes), then in process 2106 the same telephone number may be allocated to the second demand partner. In general, the longer the period within which no call occurs after the first service, the more feasible it becomes to use the same telephone number allocated to the first demand partner since the probability of having a disputable telephone.

Example Implementation of Allocating Telephone Numbers

An example of the one embodiment of the A web advertising company promotes advertisements from local merchants—plumbers, roofers, dentists—all across the country. It promotes the advertisements by syndicating them at 1,000 different web sites. To track the call activity that results from these promotions, the advertising company maintains a pool of 50,000 unique phone numbers.

For instance, at a single website, at the moment when a user searches for "dentist in Kansas City," the advertising company communicates with the website to insert advertisements for the ten dentists who have purchased advertising for the Kansas City area. The ten dentists have purchased the advertising by agreeing to "pay per call," meaning they will pay a fee, such as $5, at the moment a call comes in from a potential customer. The dentists can pay a higher fee if they would like to be displayed higher than their peers. The advertising company displays the dentists in descending order from the highest per-call price to the lowest.

When the advertising company displays the three advertisements upon the website, it dynamically allocates unique phone numbers that appear in the advertisements. This way, if a dentist is called by a potential customer, the advertising company can determine which website was responsible for the call taking place. It can also determine the time of the call and bill the dentist the amount the dentist had agreed to pay per call at that moment. Once having done so, the advertising company routes the call to the dentist's standard phone number, and the dentist receives the call.

Of the ten unique telephone numbers that were displayed, several of them were toll-free 1-800 or 1-866 numbers. One of them was a local Kansas City 913 area-code number because that dentist requested that his advertisement only be shown with a unique phone number that appears to be local.

The advertising company is syndicating the ten dentists' advertisements across 1,000 different websites. Throughout the day, it is continually displaying the ten dentists at hundreds of different sites, whenever an end user happens to search on dentists in Kansas City. In order to track the resulting call activity, if the advertising company were to allocate a unique telephone number for each dentist at each of the 1,000 websites, it would have to allocate 10,000 unique telephone numbers. Since unique telephone numbers are costly to provision and maintain, this would be a very expensive proposition. The advertising company must find a way to minimize the unique telephone numbers it allocates, and by no means can it use more than the 50,000 total unique numbers it has in its pool.

In order to reduce the unique telephone numbers it must allocate, the advertising company uses the techniques to dynamically allocate and recycle unique telephone numbers. In the case of the Kansas City dentists, it does not allocate all 10,000 combinations to begin with. Instead, it only allocates a unique telephone number at the moment a search is done for Kansas City dentists at a particular website. The dynamic, "just in time" allocation, prevents the wasteful allocation of numbers to advertisements that may never be summoned and displayed.

In one embodiment, a system records that a particular advertiser's advertisement was displayed at a certain time at a particular website with a particular unique telephone number. As more and more advertisements are displayed at different websites, in one embodiment the system keeps track of when each of the allocated telephone numbers were respectively last displayed.

Figure 22:
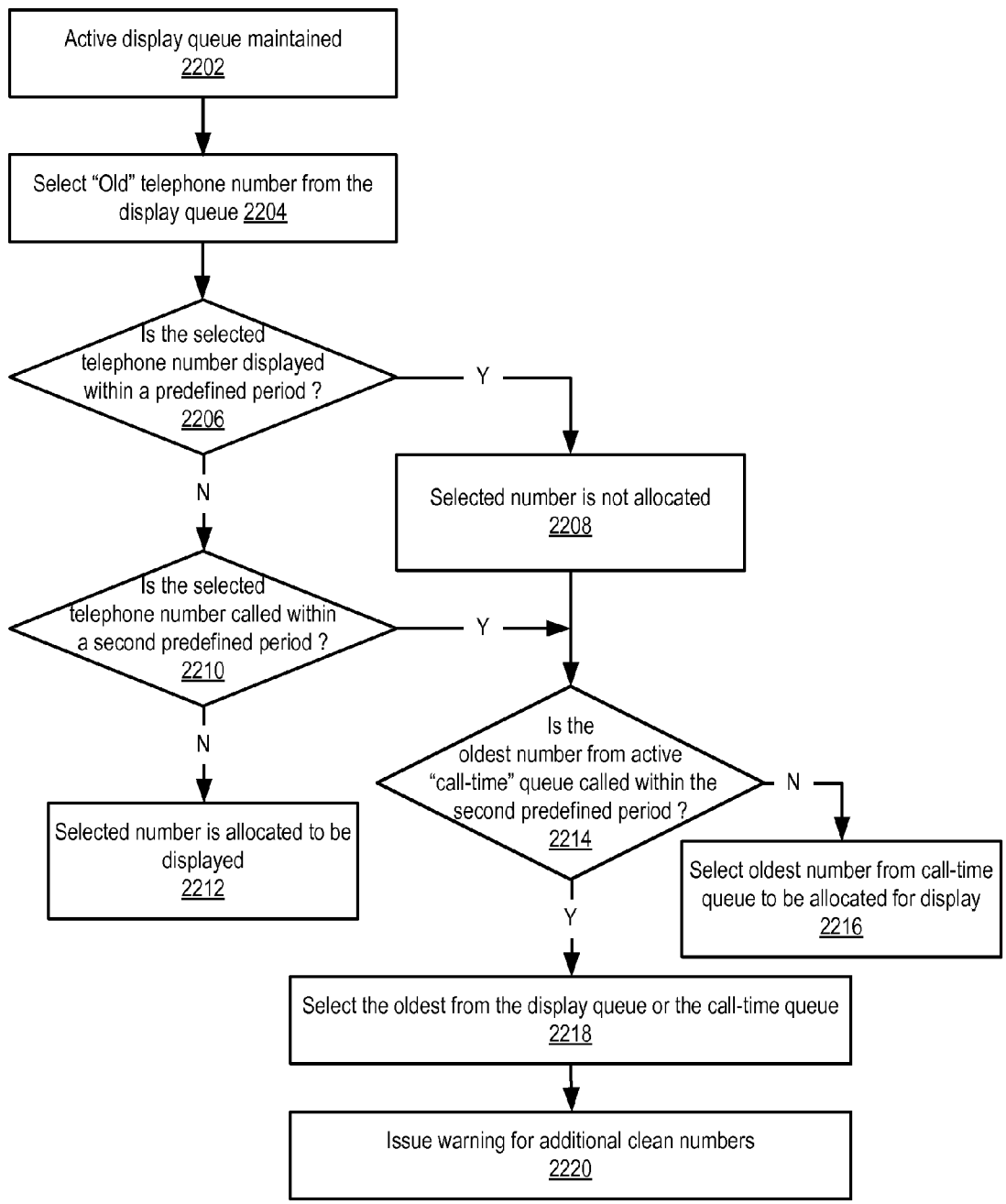
FIG. 22 presents a flow diagram describing one embodiment of recycling telephone numbers.

FIG. 22 presents a flow diagram describing one embodiment of recycling telephone numbers. In one embodiment, in process 2202 an active "display queue" of telephone numbers is maintained. The active display queue lists the telephone numbers according to the time they have been displayed from "youngest" (displayed recently) to "oldest" (displayed longer ago).

When, for instance, an advertiser's advertising is displayed at a particular website and a unique telephone number is required, in process 2204 a telephone is selected from the "oldest" end of the display queue, or a telephone number that has not relatively recently been displayed. Since presumably there is a finite pool of numbers it could be that the phone number that is picked has been used before. But since it is the "oldest" number—displayed perhaps five weeks ago, there is a greater probability that this number will not be confused with the advertisement it was displayed with in the past. In this way, telephone numbers are recycled based on the time of last display to reduce potential confusion.

In one embodiment, in process 2206 the system determines if the selected telephone number was recently displayed within a predefined period of time. For instance, the system can check whether a telephone number was displayed in a different context within, for example, in the last 24 hours. If the selected telephone number was displayed within the predefined period of time, in process 2208 then the number pool is in danger of over-recycling and the selected telephone number is not allocated at that time.

If the system determines the selected telephone number was not displayed within the predefined period of time, in one embodiment, in process 2210 the system proceeds to determine whether the selected telephone phone number was recently called within a predefined period of time. For example, if a telephone number was displayed on a dentist's advertisement three months ago, but last called yesterday, it could introduce confusion if the number is reallocated to a plumber today.

If the system determines that the selected telephone number has not been displayed within a predefined period of time (e.g., 24 hours) and has not been called within a second predefined period of time (e.g., the last 30 days), in process 2212 the system deems the selected telephone number to be safe, and the selected telephone number is allocated to be displayed in a new context.

As previously described, if the selected number (presumably the "oldest number" displayed) was last displayed within the predefined period of time, the selected number does not pass the minimum threshold. As a result, the number pool may then be in jeopardy of over-recycling and alternative measures are taken by the system to select a telephone number for allocation.

In one embodiment, the system then evaluates the number pool based on how often the numbers have been called. In one embodiment, the system maintains an active "call-time queue" of the telephone numbers that have been called, listing them from "youngest" (called recently) to "oldest" (called longer ago). In process 2214, if the "oldest" number in the display queue was last displayed within the predefined period of time, in one embodiment, the system then evaluates the "oldest" number in the call-time queue. If the "oldest" number in the call-time queue was last called in greater than the second predefined threshold, then system selects the "oldest" number in the call-time queue to be allocated.

If neither the "oldest" number in the display queue nor the "oldest" number in the call-time queue meets the respective minimum thresholds, then other measures may be taken by the system. In process 2216, the system evaluates which of the two "oldest" numbers is closer to meeting its respective safety threshold, and selects that telephone number to be allocated for display. By evaluating numbers according to the time of last display and time of last call, the system recycles numbers with the reduced probability for end-user confusion.

Due to the dual queue procedures, the system will not break catastrophically—it will only become gradually less safe if is overburdened. If numbers are displayed and called too often, all numbers will be below the minimum display and call thresholds, but the system will still function. In fact, it will produce the safest number given the pool it has to deal with. In the case of overburden, the system will automatically cycle through the numbers faster, making them collectively more "dirty," but not failing. In such a case, in process 2218 the system automatically issues a warning to the administrator at this point, indicating that more "clean" numbers need to be added to the number pool. In alternative embodiments, more or less of the processes described in relation to FIG. 22 may be used.

Figure 23:
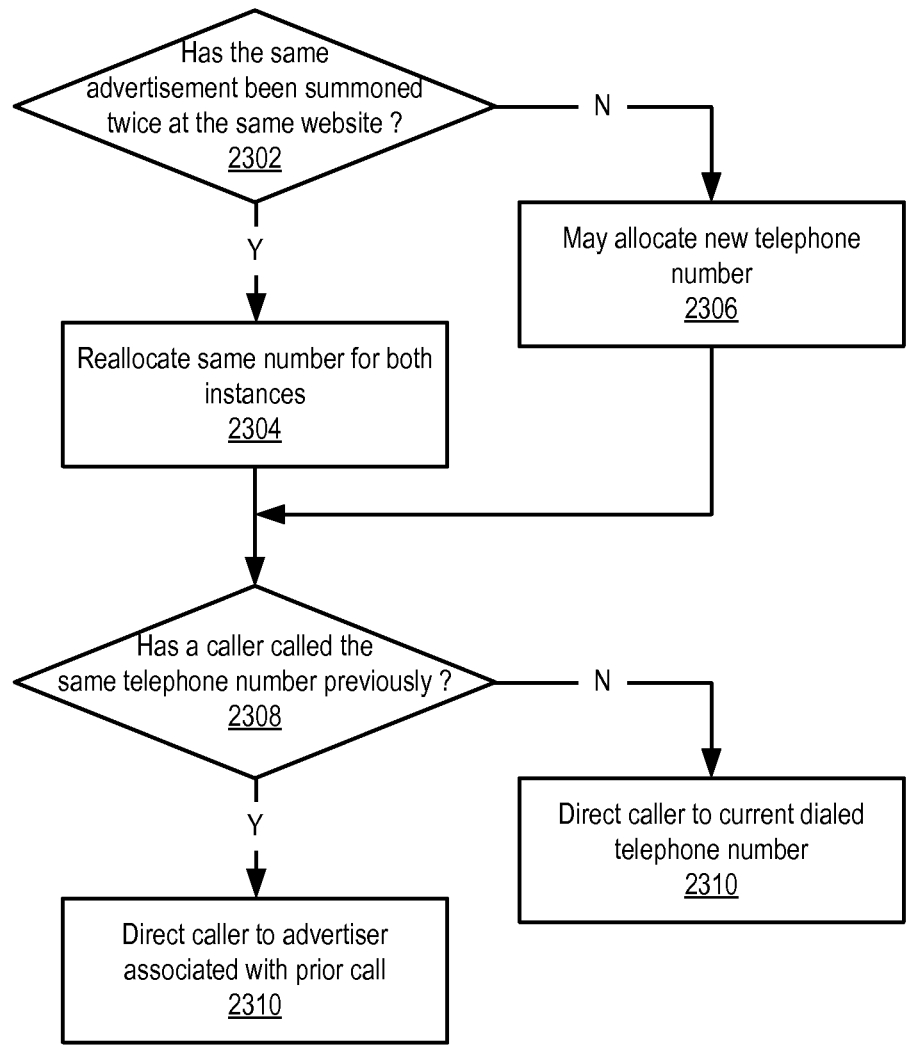
FIG. 23 provides a flow diagram describing additional processes for allocating telephone numbers in accordance with one embodiment.

In addition to optimizing the cleanliness of the pool of telephone numbers, one embodiment of the system may execute procedures to improve efficiency of allocating recycled telephone numbers. FIG. 23 provides a flow diagram describing additional processes for allocating telephone numbers in accordance with one embodiment. In process 2302 the system determines if a particular advertisement (or different advertisements associated with the same advertiser) has summoned twice at the same website. If the particular advertisement (or different advertisements associated with the same advertiser) has been summoned twice at the same website, in process 2304 the system will reallocate the same phone number for both instances. If the particular advertisement (or different advertisements associated with the same advertiser) has not been summoned twice at the same website, in process 2306 the system may allocate a new phone number.

In addition, in one embodiment, when a caller dials a unique phone number that has been allocated by the system for display, in process 2308 the system checks whether that caller (identified uniquely by their caller ID) has ever dialed that unique phone number before. If so, in process 2310 the system connects the caller with the advertiser that originally was associated with that unique phone number even if the phone number has now been reallocated to a second advertiser. The probability is the greatest that the caller is repeat-calling the original advertiser. The chances are small that the same caller would call two different merchants who both happen to have been allocated the same unique phone number by the system. Therefore, for the increased likelihood of success, the system connects the caller to the advertiser that the caller has called previously, even if the phone number has since been reallocated.

Figure 24:
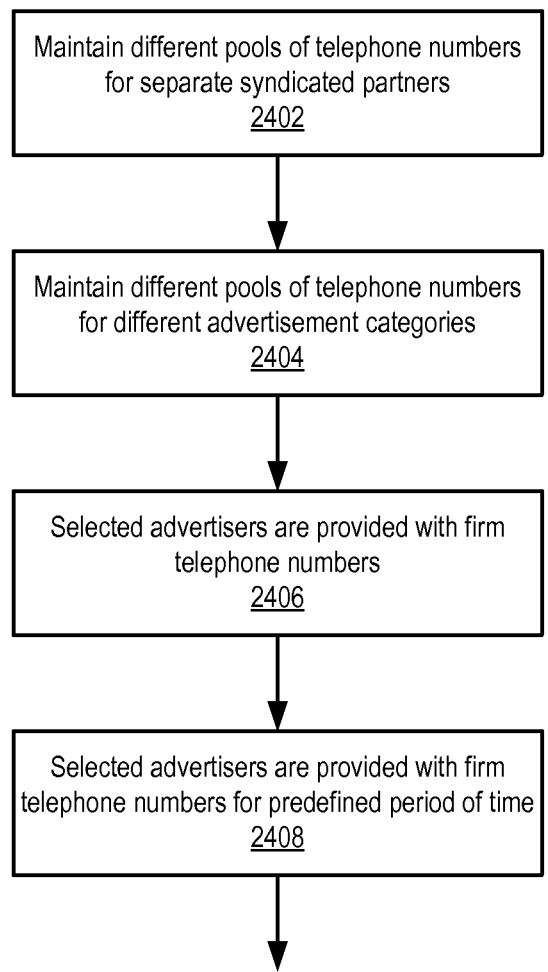
FIG. 24 presents a flow diagram describing the processes of maintaining the separate pools of unique telephone numbers in accordance with one embodiment.

In one embodiment, the system is also able to maintain separate pools of unique numbers based on a variety of factors. FIG. 24 presents a flow diagram describing the processes of maintaining the separate pools of unique telephone numbers in accordance with one embodiment. In process 2402, the system maintains different pools of telephone numbers corresponding to different partner syndicates. For instance, one large syndicate may request that none of its numbers ever be recycled to mix with a rival syndicate. In process 2404, the system maintains different pools of telephone numbers corresponding to different categories of advertisers. For example, the system may maintain separate telephone number pools for democratic and republican causes to reduce chances that callers will be connected by mistake to the other party.

In process 2406, in one embodiment, the system provides select advertisers, or groups of advertisers, with firm numbers that do not get recycled. Some advertisers, for instance, do not want their number to ever change or be recycled, and the system can omit these advertisers from the recycling procedures, to provide them with constant telephone numbers.

Similarly, in process 2408, in one embodiment, the system provides selected advertisers or groups of advertisers with specific telephone numbers for a specified duration of time. Afterwards, the telephone numbers may be recycled. For instance, a daily newspaper might publish the trackable phone numbers of the five travel agents who have special "deals of the day." In this case, the phone numbers should not change for the duration of at least one day, after which they could then enter the recycling process.

In one embodiment, the unique telephone numbers assigned to an advertiser and or a demand partner is for a short period of time after the listing of the advertiser containing the unique telephone numbers is presented. After the time period, the telephone numbers can be re-assigned to other advertisers.

Figure 25:
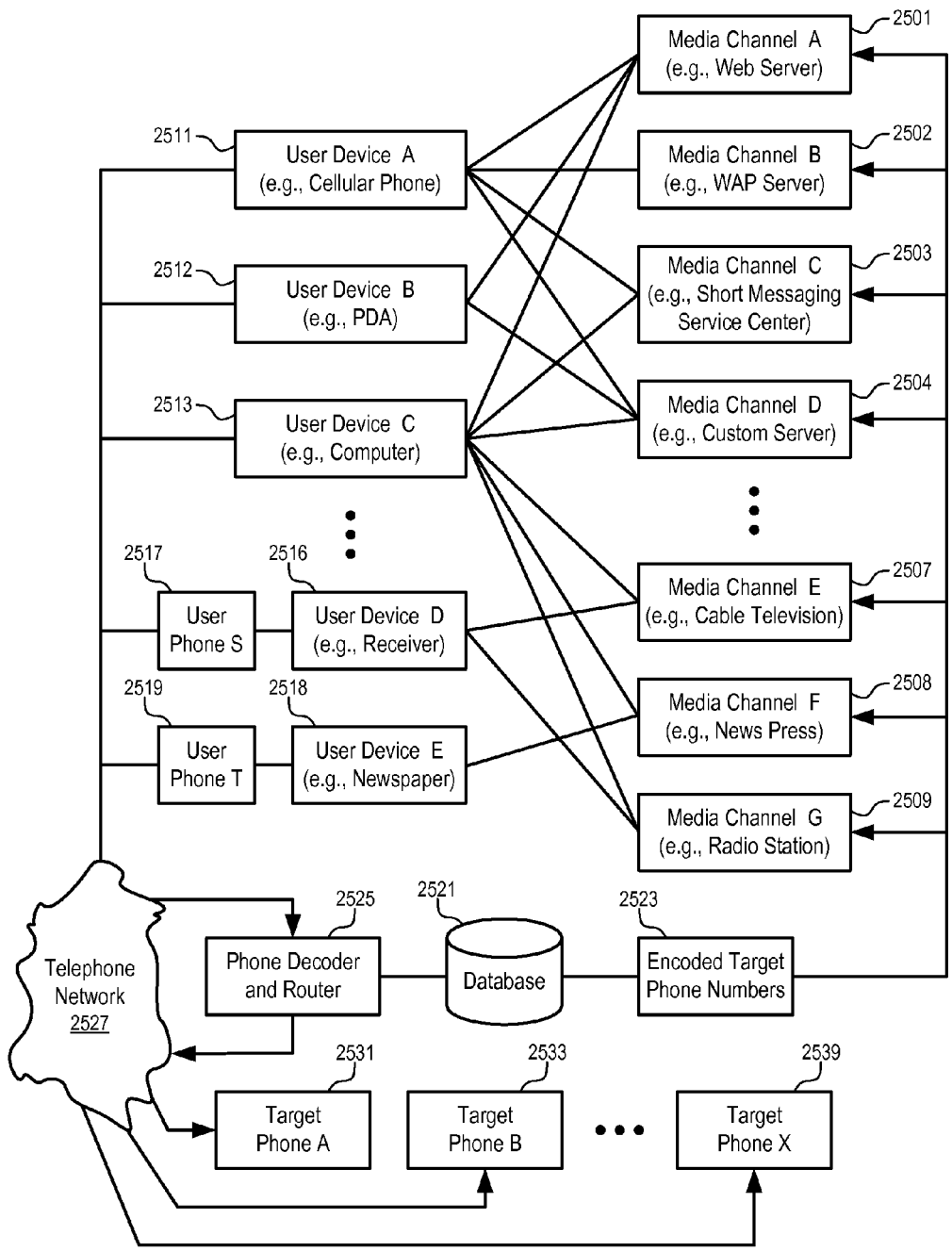
FIG. 25 shows a diagram of a system to make and track phone connections according to one embodiment.

FIG. 25 shows a diagram of a system to make and track phone connections according to one embodiment.

In FIG. 25, a database (2521) may contain the phone numbers of target phone A (2531), target phone B (2533), . . . , target phone X (2539), etc. Typically, the target phones belong to the institutions, businesses, individuals, etc, which seek for publicity through various media channels, such as media channel A (2501) (e.g., web server), media channel B (2502) (e.g., WAP server), media channel C (2503) (e.g., short messaging service center), media channel D (2504) (e.g., custom server), media channel E (2507) (e.g., cable television), media channel E (2508) (e.g., news press), media channel G (2509) (e.g., radio station), etc.

In one embodiment, the phone numbers of the target phones are not directly publicized over the media channels. Instead, encoded target phone numbers (2523) are used. Using the encoded target phone numbers (2523), a user cannot reach target phones directly. The encoded target phone numbers (2523) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (2511) (e.g., cellular phone), user device B (2512) (e.g., personal digital assistant (PDA)), user device C (2513) (e.g., computer), user device D (2516) (e.g., receiver), user device E (2518) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (2517) or user phone T (2519).

In one embodiment, dialing at least a portion of an encoded target phone number connects the phone call to a phone decoder and router (2525) first. According to the encoded target phone number dialed, the phone decoder and router (2525) determines the corresponding target phone number using the database (2521) and connects the phone call to the corresponding target phone (e.g., one of target phones 2531-2539) through the telephone network (2527).

Note the telephone network (2527) may be circuit switched, packet switched, or partially circuit switched and partially packet switched. For example, the telephone network may partially use the Internet to carry the phone call (e.g., through VoIP). For example, the connection between the user phone/device and the phone decoder and router (2525) may be carried using VoIP; and the connection between the phone decoder and router (2525) may be carried using a land-line based, circuit switched telephone network.

In one embodiment, the information associated with the encoded target phone number, such as the media channel used to provide the encoded target phone number to the users, is also decoded/retrieved using the database (2521). Thus, the information associated with the encoded target phone number can be tracked/stored.

In one embodiment, the phone decoder and router (2525) also determines the phone number of the user through Automatic Number Identification (ANI). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (2525). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the phone decoder and router (2525) through the telephone network (2527); and a second portion of the encoded target phone number is to be decoded by the phone decoder and router (2525). For example, the Dual Tone Multi-Frequency (DTMF) decoder can be installed in the phone decoder and router (2525) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment, a single telephone number is used to reach the phone decoder and router (2525) for different target phone numbers; and the portion of the encoded target phone number that is used to reach the phone decoder and router (2525) is not used in determining the information associated with the encoded target phone number.

Alternatively, multiple telephone numbers can be used to reach the phone decoder and router (2525); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (2521) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (2525). When such a mapping scheme is used, a look up table is not necessary. For example, an encoded target phone number may include a first portion that is the phone number of the phone decoder and router (2525), a second portion that is the target phone number appended with a number mapped from an identifier of the media channel. To prevent the user from dialing the target phone number directly, an encryption/scrambling scheme can be used to encode the second portion, which is decoded at the phone decoder and router (2525).

In one embodiment, the phone decoder and router (2525) determines the target phone number from the encoded target phone number dialed by the user and then dials the target phone number for the user and joins the phone calls so that the user can talk to the target phone.

In one embodiment, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of a keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the phone decoder and router (2525), pauses for a short period of time for the phone decoder and router (2525) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 25, the user device initiates the phone call. Alternatively, a phone router may be used to initiate phone calls both to the user device (or a separate user phone) and the target phone and then join the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment, an advertisement is presented to end users around the globe without geographical area limitations. For example, an advertiser may provide services and/or products to customers around the globe. The advertisement may be delivered to the worldwide users of the Internet.

In one embodiment, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment, an advertisement presented in a media channel is for a single advertiser. The end user selects an advertiser according to the advertisements presented on behalf of individual advertisers; and the phone decoder and router connects the end user and the selected advertiser according to the encoded target phone number individually publicized in the advertisement for the advertiser. When the user views the online advertisements, the selection of the advertiser is based on the online information.

In one embodiment, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the phone decoder and router.

For example, a toll-free number is published to advertise mortgage brokers in a particular geographic area. When a consumer dials the toll-free number, the call is routed to the highest bidding mortgage broker who is available in that market.

The phone decoder and router may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

In one embodiment, a communication reference, such as a phone number with or without an extension, a click-to-call reference, a SIP address for VoIP call, a click-to-reveal reference, etc., is embedded into an advertisement to count the communication leads generated from advertisements, to track the contributions of demand partners who operate media channels to present the advertisements to customers, and/or to track other aspects of advertising, such as partners who bring the advertisers/sellers to the system.

In one embodiment, the tracking mechanism used for a particular version of a particular advertisement is selected from a number of available mechanisms, based on one or more considerations such as the volume or frequency of calls generated from the advertisement, the conversion rate of the advertisement (e.g., the ratio between a count of presentations of the advertisement and a count of communication leads generated from the presentations), the price per communication lead that the advertiser is will to pay for the advertisement according to a price bid specified by the advertiser, a potential revenue for a particular party in the advertising activity, a classification or category of the advertisement (e.g., the category of service or product advertised in the advertisement), a geographical area served by the advertisement, the demand partner who is going to present the advertisement (e.g., the success rate of the demand partner in reaching viable customers in comparison with other demand partners), etc.

In one embodiment, based on such considerations, tracking mechanisms are selected for the tracking of particular versions of particular advertisements to improve the cost effectiveness of the system in advertising.

In one embodiment, a communication reference that is specific to a selected tracking mechanism is allocated or selected or generated for a particular advertisement. The communication reference is embedded into the advertisement to generate a particular version of the advertisement.

In one embodiment, the tracking mechanism is selected at a time when the particular version of the advertisement is needed for presentation (e.g., when the version of the advertisement is to be delivered to a demand partner, or to a web browser of a customer). The corresponding communication reference is allocated or selected or generated when the tracking mechanism is selected.

In one embodiment, the selected tracking mechanism can be dynamically changed at a time when the particular version of the advertisement is needed for presentation (e.g., when the version of the advertisement is to be delivered to a demand partner, or to a web browser of a customer). For example, the tracking mechanism used in an advertisement that is to be presented via a particular demand partner can be upgraded or downgraded based on the statistical data collected from the past activities related to the advertisement.

FIGS. 26-30 illustrate examples of telephone call tracking mechanisms which can be selected according to some embodiments.

Figure 26:
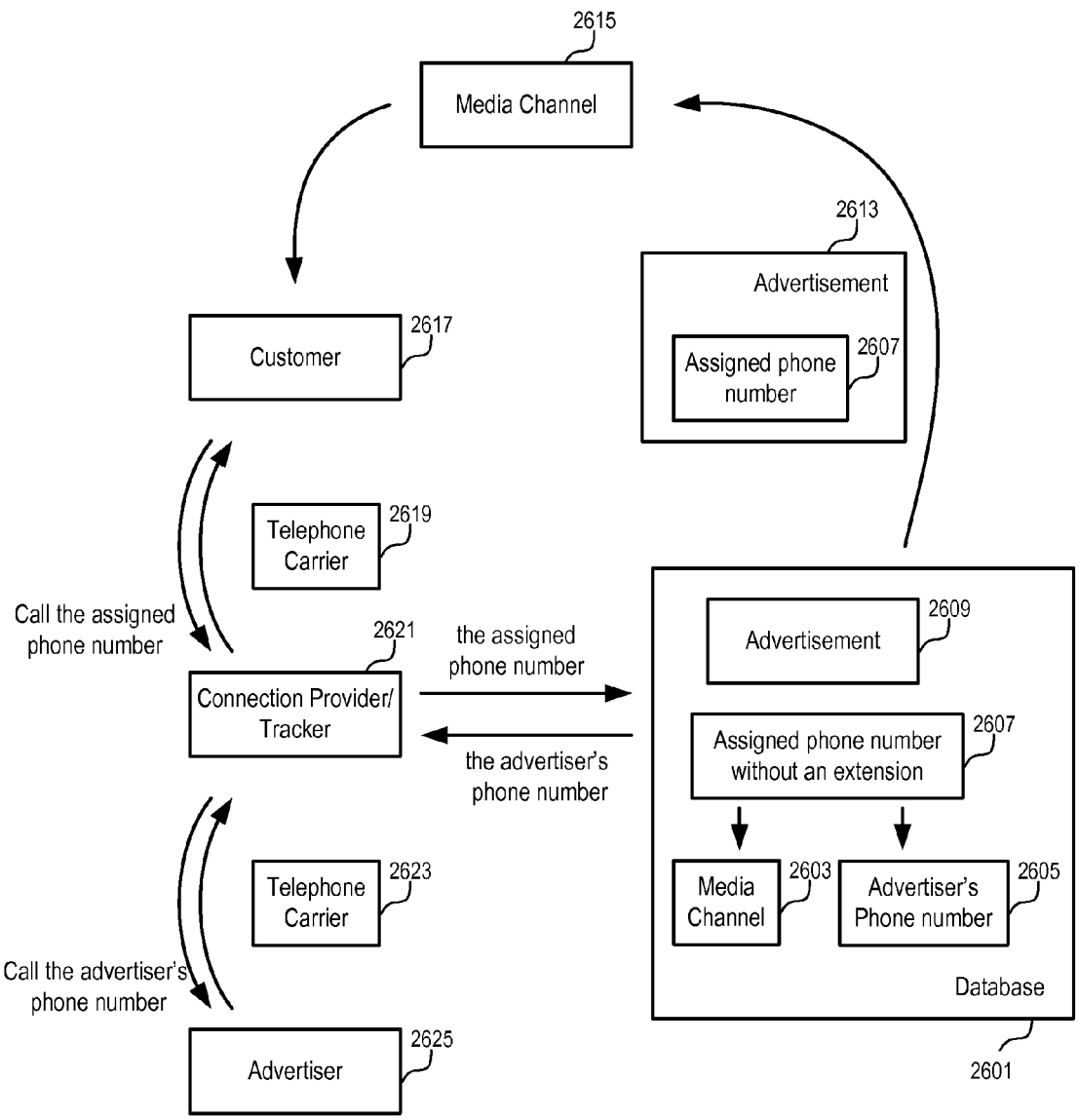
FIGS. 26-30 illustrate examples of telephone call tracking mechanisms which can be selected according to embodiments.

In FIG. 26, a phone number (2607) without an extension is assigned for the generation a particular version (2613) of an advertisement (2609). In the database (2601), the assigned phone number (2607) is associated with the media channel (2603) and the advertiser's phone number (2605) (and/or other parameters to be tracked). Thus, the parameters to be tracked can be identified based at least partially on the assigned phone number (2607). The particular version (2613) of the advertisement (2609) that has the assigned phone number (2607) is provided to the customer (2617) via the media channel (2615). The advertisement may instruct or suggest the customer to call the assigned phone number (2607) to reach the advertiser. In response to the advertisement, the customer may call the assigned phone number (2607). When the connection provider/tracker (2621) is called at the assigned phone number via the telephone carrier (2619), the connection provider/tracker (2621) can identify the assigned phone number (e.g., via a Dialed Number Identification Service (DNIS)) and determine the advertiser's phone number (2605) based at least partially on the assigned phone number (2607). Further, using the assigned phone number, it can also be determined that the phone call from the customer is a response to an advertisement that is delivered via the media channel (2615) based on the association between the assigned phone number (2607) and the media channel (2603) in the database (2601).

In one embodiment, after determining the advertiser's phone number from the assigned phone number that is dialed by the customer (2617), the connection provider/tracker (2621) makes a separate call to the advertiser (2625) via a telephone carrier (2623) which may be the same as the telephone carrier (2619). When both the customer (2617) and the advertiser (2625) are on the line with the connection provider/tracker (2621), the connection provider/tracker (2621) can bridge or conference the calls to connect the customer (2617) and the advertiser (2625). Alternatively, the connection provider/tracker (2621) may forward the calls from the customer (2617) to the advertiser (2625) after determining the advertiser's phone number.

In one embodiment, the assigned phone number can be a phone number that is local to the area to be served by the advertisement. Alternatively, the assigned phone number can be a toll free phone number, such as an 800-(888-, 877, or 866-) number. In one embodiment, the assigned phone number is a vanity number that spells one or more words on a dial pad on a phone, such as 1-800-PLUMBER for the advertisement of a plumber. Alternatively, the assigned phone number can be a plain phone number.

It is recognized that a local phone number is easy to dial manually, a vanity number is easy to remember, and an 800-number is easier to remember than other toll free numbers. Thus, there are different values in advertising in the different types of assigned phone numbers.

Figure 27:
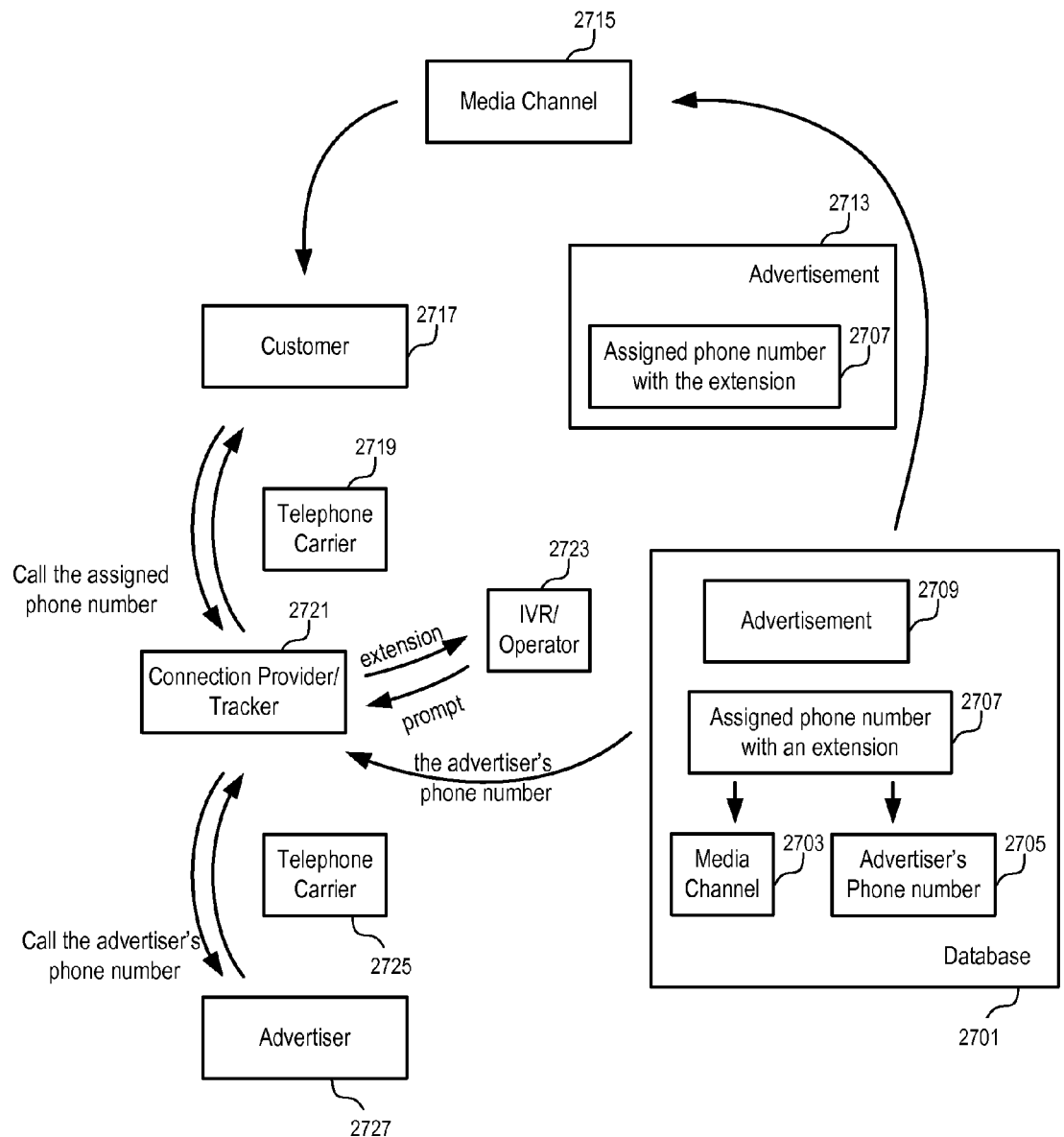

Since maintaining different phone numbers may increase the tracking cost, another type of tracking mechanism that uses different extensions to differentiate tracked parameters is illustrated in FIG. 27.

In FIG. 27, a phone number (2707) with an extension is assigned to generate a particular version (2713) of an advertisement (2709). In the database (2701), the assigned phone number (2707) with the extension is associated with the media channel (2703) and the advertiser's phone number (2705) (and/or other parameters to be tracked). For example, different root phone numbers can be used to represent different media channels; and different extensions can be used to represent different advertisers. In another example, different root phone numbers are used to represent different advertisers; and different extensions are used to represent different media channels. In another example, the entire assigned phone number, including the root phone number and the extension, is used as a key to look up the media channel and the advertiser's phone number. In a further example, the root phone numbers are not used to differentiate tracked parameters; and the tracked parameters are represented by the extensions, which may be implemented as keys to look up the parameters or as encoded/encrypted version of the parameters.

The particular version (2713) of the advertisement (2709) that has the assigned phone number (2707) with the extension is provided to the customer (2717) via the media channel (2715). In response to the advertisement, the customer may call the assigned phone number (2707). In one embodiment, the connection provider/tracker (2721) is called at the root number of the assigned phone number via the telephone carrier (2719). Once the customer is connected to the connection provider/tracker (2721), the customer can further provide the extension to the connection provider/tracker (2721). For example, the customer (2717) can provide the extension to an IVR system or a human operator of the connection provider/tracker (2721). The extension can be provided as voice input, or as dial pad input.

In one embodiment, the IVR system or the human operator (2723) can prompt the customer (2717) for the extension that is provided in the advertisement. In one example, when the dialed root number is sufficient to identify information about the media channel, the IVR system or the human operator (2723) may customize the prompt to include the information of the media channel and ask the customer (2717) to further provide the extension to reach the desired advertiser (2727). In another example, when the dialed root number is sufficient to identify information about the advertiser, the IVR system or the human operator (2723) may customize the prompt to include the information of the advertiser and ask the customer (2717) to further provide the extension to reach the desired advertiser (2727).

In one embodiment, based on the assigned phone number with the extension, the connection provider/tracker (2721) associates the call with the corresponding parameters stored in the database (2701), including the advertiser's phone number, and connect the customer (2717) to the advertiser (2727). The connection provider/tracker (2721) can call the advertiser (2727) at the advertiser's phone number via the telephone carrier (2725) which may or may not be the same as the telephone carrier (2719).

In one embodiment, the extension can be a plain extension or a vanity extension that spells one or more words on a dial pad on a phone, such as extension PLUMBER for the advertisement of a plumber. In one embodiment, extensions used in the system can have different lengths. A shorter extension is easy to dial; and a vanity extension is easy to remember. In one embodiment, the extension includes an encoded/encrypted version of the associated parameter to allow an authorized data system to decode/decrypt at least some of the parameters without having to query the database (2701). Thus, different types of extensions can have different values in advertising.

The tracking methods described can have different costs. A toll-free number with many extensions, for instance, is much cheaper than many vanity toll-free numbers. Therefore, the system uses the more expensive methods when it's worthwhile to do so. For instance, if an advertisement receives many calls, it may be selected for a more expensive method of tracking. An advertisement with an extension may in the future be upgraded to a local phone number without an extension, or even a vanity toll-free number. Similarly, an advertisement may qualify for a more expensive method of tracking if its conversion rate is high (e.g., if it has a high ratio of the number of calls it receives to the number of times it is displayed). Conversely, advertisements that perform poorly may be downgraded in tracking methods used. For example, an advertisement tracked by a toll-free number may be downgraded to have a less expensive, click-to-call connection mechanism.

In one embodiment, when the advertiser (2725) is currently not available to take the call at the time the customer (2717) calls, the customer (2717) is provided with the option to be called back within a time window, if the customer (2717) is willing to provide a phone number at which the customer (2717) can be reached. The system can then schedule the callback to connect the customer (2717) and the advertiser (2727) accordingly.

Figure 28:
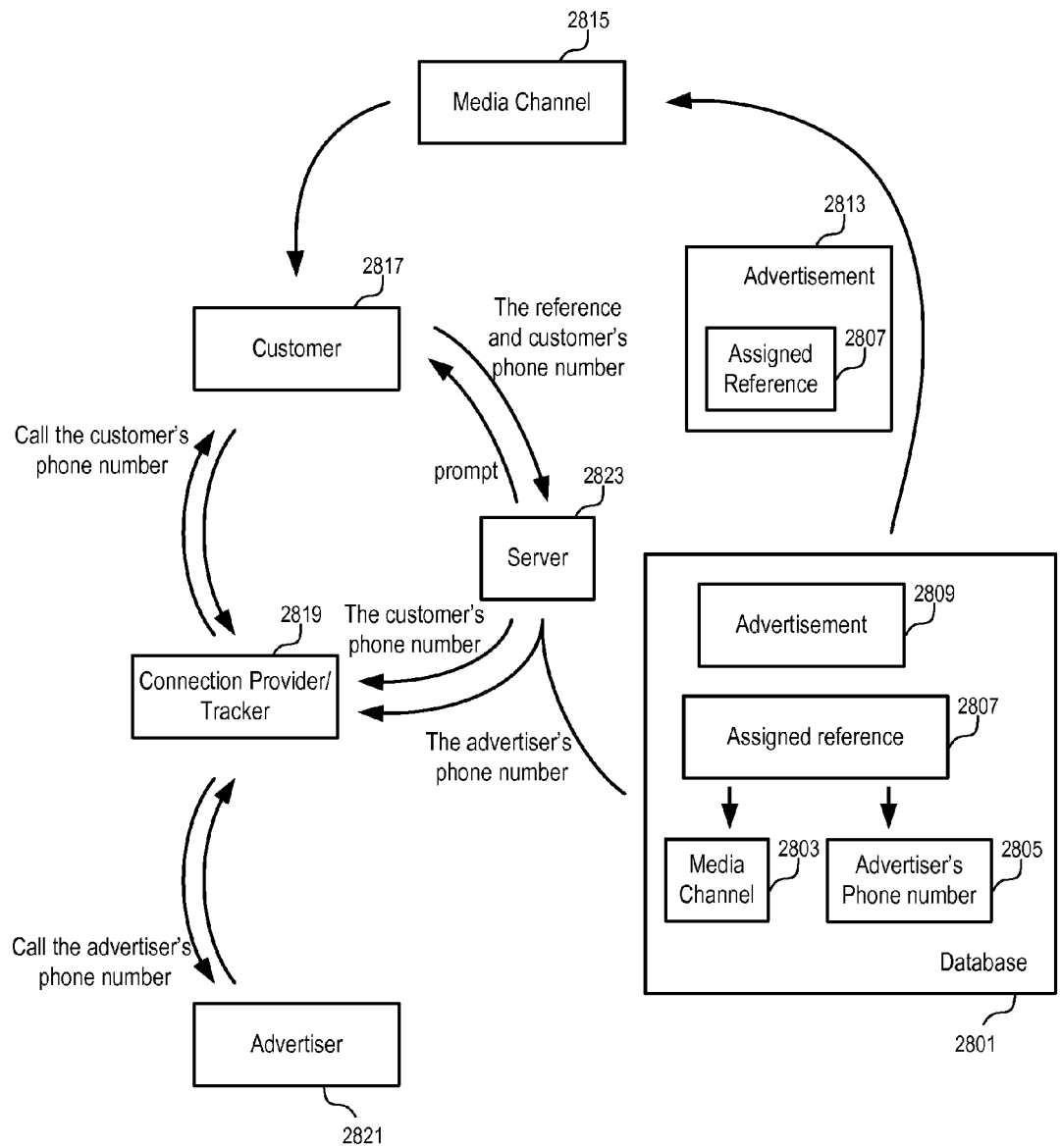

In one embodiment, the connection provider/tracker calls the customer instead of providing a phone number to receive a phone call from the customer, as illustrated in FIG. 28. In FIG. 28, a reference (2807) is assigned for the generation a particular version (2813) of an advertisement (2809). In the database (2801), the assigned reference (2807) is associated with the media channel (2803) and the advertiser's phone number (2805) (and/or other parameters to be tracked). In one embodiment, the reference (2807) cannot be used to make a call via a traditional telephone carrier. In one embodiment, the reference (2807) is a key used in the database (2801) to look up the associated parameters, such as the media channel (2803) and the advertiser's phone number (2805). In one embodiment, the reference (2807) is an encoded/encrypted version of the associated parameters, such that an authorized data system (e.g., server 2823) can decode/decrypt the information without having to look up from the database.

In FIG. 28, the particular version (2813) of the advertisement (2809) that has the assigned reference (2807) is provided to the customer (2817) via the media channel (2815). In response to the advertisement, the customer may use the assigned reference (2807) to request a connection with the advertiser.

In one embodiment, the reference (2807) is embedded in the advertisement as a parameter of a link or a parameter of a button, which when selected by the customer (2817) causes the server (2823) to provide a prompt to ask for a telephone number at which the customer can be reached. Alternatively, the advertisement may include a form to accept collect the callback phone number, which is transmitted to the server with the parameter when the link or button is selected. The server (2823) uses the reference (2807) received from the customer (2817) to identify the parameters that are associated with the particular version (2813) of the advertisement (2809). Alternatively, the customer may request the connection via a web page, an email, an instant message, a phone call to a gateway system, an SMS message, etc.

In FIG. 28, after the server (2823) determines the advertiser's phone number from the assigned reference and receives the customer's phone number, the connection provider/tracker (2819) makes separate calls to the customer's phone number and the advertiser's phone number and bridges/conferences the calls to connect the customer (2817) and the advertiser (2821).

Figure 29:
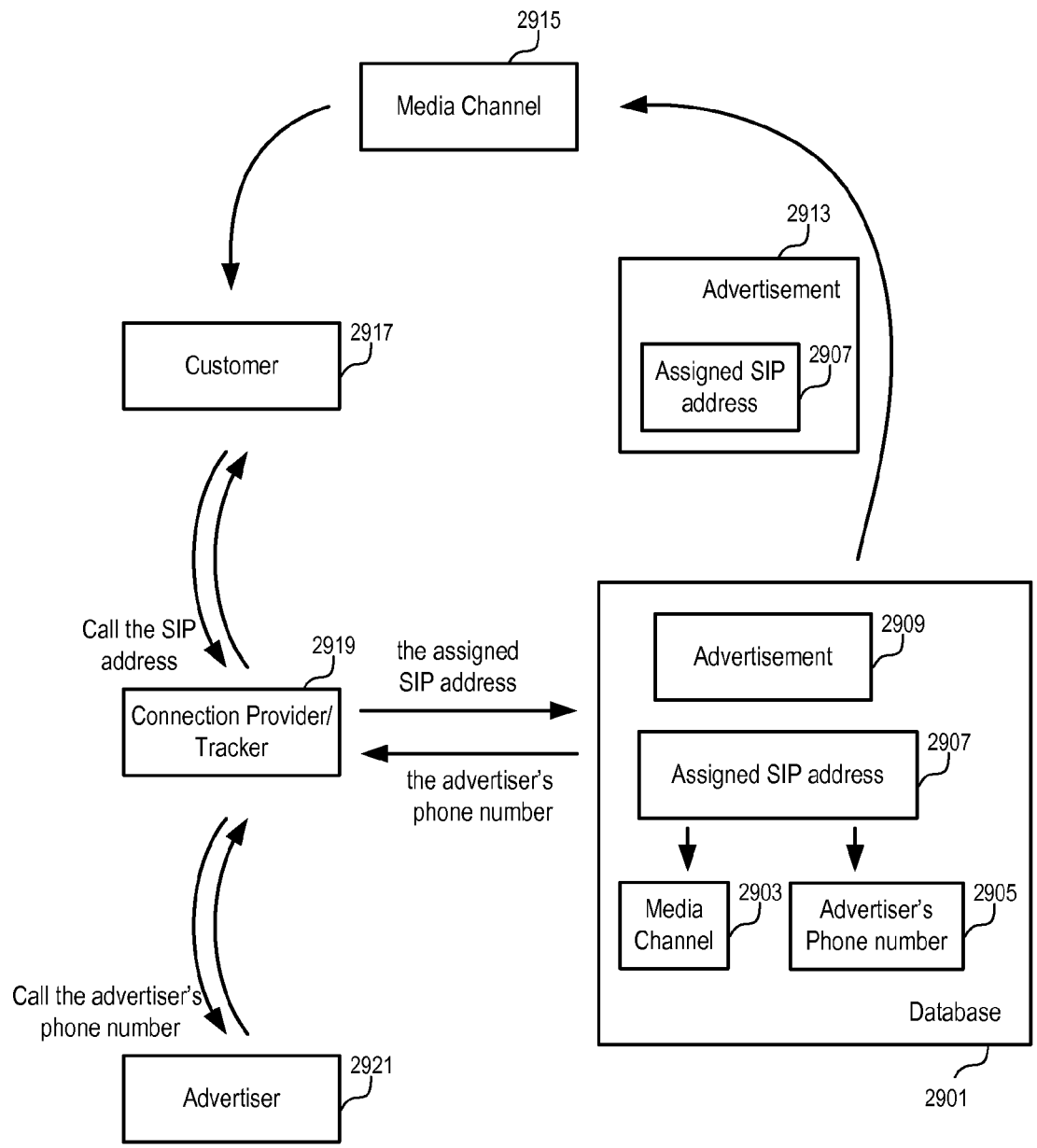

In one embodiment, a telephone number assigned to a version of an advertisement includes a SIP address for the initiation of a VoIP-based telephone call, as illustrated in FIG. 29. In one embodiment, the assigned SIP address (2907) is used as a key in the database (2901) to look up the associated parameters, such as media channel (2903), the advertiser's phone number (2905), etc. In one embodiment, the assigned SIP address (2907) includes an encoded/encrypted version of at least some of the associated parameters such that an authorized data system can decode/decrypt the information without having to query the database (2901).

In FIG. 29, the assigned SIP address (2911) is embedded into the advertisement (2909) to generate a version (2913) for the media channel (2915), which delivers the advertisement to the customer (2917) (e.g., via an audio channel, a visual channel, a data channel, or a multi-media channel). In response to the advertisement, the customer can call the connection provider/tracker (2919) at the SIP address (e.g., using a VoIP application/phone). Based on the SIP address used in initiating the VoIP call, the advertiser's phone number is determined. The connection provider/tracker (2919) then connections the customer (2917) and the advertiser (2921).

In one embodiment, when the customer (2917) is already in a phone connection with the media channel (2915), such as when the media channel (2915) is a telephone based directory service, the media channel (2915) may forward the call to the assigned IP address. Alternatively, the media channel (2915) may conference/bridge the customer's call with a call to the connection provider/tracker (2919) at the assigned SIP address. Such an arrangement of having the media channel to connect the existing call to the connection provider/tracker (2919) (e.g., through forwarding or conferencing) can also be used in connection with other types of tracking mechanisms (e.g., tracking using a phone number, with or without an extension).

Figure 30:
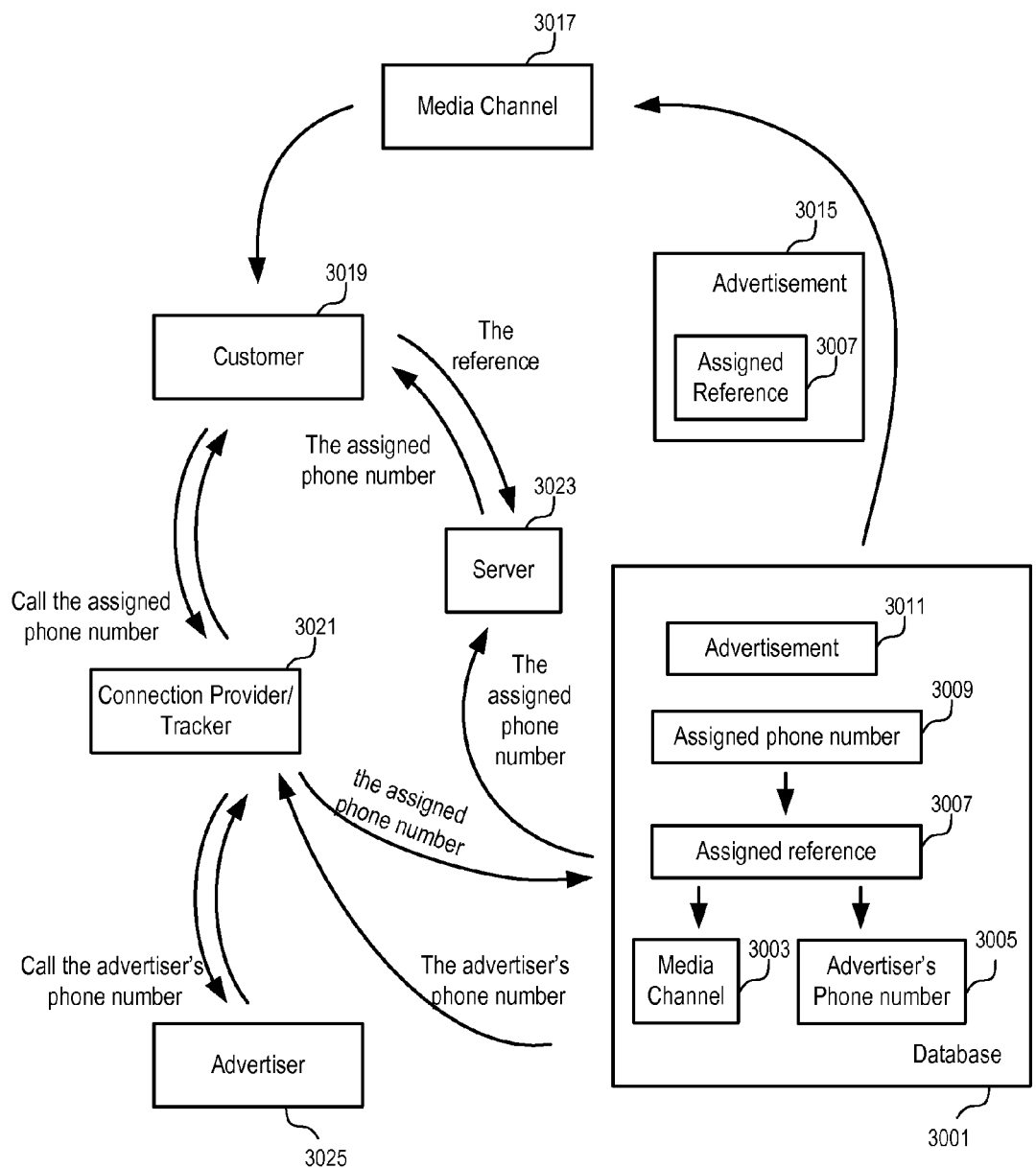

In one embodiment, the allocation of a telephone number to an advertisement is deferred to a stage when a customer is interested in the advertisement and ready to make a phone call, as illustrated in FIG. 30. In FIG. 30, an assigned reference (3007) is used to represent the set of parameters of a version of an advertisement, such as the media channel (3003), advertiser's phone number (3005), etc. The reference can be used as a key to look up the parameters in the database (3001), and/or decoded/decrypted to obtain at least some of the parameters without having to query the database (3001). The assigned reference (3007) is embedded in the version (3015) of the advertisement (3011) for distribution by the medial channel (3017).

In FIG. 30, the advertisement is presented in a way to allow the customer (3019) to request an assigned phone number for the version of the advertisement. The assigned phone number may be a phone number without an extension, or a phone number with an extension, or a SIP address. If the customer is not interested in the advertisement, the customer may not request the assigned phone number.

In one embodiment, the reference is implemented as a parameter of a link or a button. When the button or the link is selected by the customer, the server (3023) receives the request together with the reference from the customer; and the server (3023) causes a phone number (3009) to be associated with the set of parameters of the version (3015) of the advertisement (3011). The server (3023) then provides the assigned phone number to the customer.

For example, when the button is clicked, the web page showing the version of the advertisement may submit the reference to the server to obtain the assigned phone number and display the assigned phone number (e.g., in a pop up window, on a separate layer of the web page, or in a modified element of the web page). In one embodiment, the phone number is displayed in the current web page without reloading or refreshing the web page or loading a separate web page. In one embodiment, the customer (3019) can request for the assigned phone number via a web page, an email, an instant message, an SMS message, a phone call, a voice mail, etc.

After the customer (3019) obtains the assigned phone number, the customer (3019) can call the connection provider/tracker (3021) at the assigned phone number (3009), based on which the connection provider/tracker (3021) can further connect the customer (3019) to the advertiser (3025).

In one embodiment, a version of an advertisement can have multiple assigned references corresponding to different types of tracking mechanisms. For example, a version of an advertisement may include a SIP address, a reference to arrange a callback and a reference to request an assigned phone number.

The SIP address may be presented in a click-to-call format via a VoIP application. When the customer has a VoIP application readily available, the customer may choose to make the phone call via the SIP address without requesting for a traditional telephone number.

The reference to arrange a callback can be implemented as a link or a button labeled as "Request a phone connection through calling me back". In one embodiment, a form to take the callback number is presented with the link or button. Alternatively, when the link or the button is selected, a further web page is displayed to guide the customer through the process of connecting the customer to the advertiser through calling back the customer.

The reference to request an assigned phone number can be implemented as a link or a button labeled as "Show me a phone number", which when selected, causes a phone number to be assigned to the version of the advertisement. After a phone number is assigned to the version of the advertisement, the advertisement can be subsequently displayed with the assigned phone number without showing the reference to request an assigned phone number.

Alternatively, when the "Show me a phone number" link or button is selected, the complete phone number of the advertiser can be shown to allow the customer to call the advertiser directly. In such an implementation, the number of times that the advertiser's phone number is clicked to reveal can be used as a performance indicator, based on which the advertisement is charged for.

In one embodiment, after a period of time of serving the advertisement, statistical data related to consumer responses to the advertisement can be collected and used to adjust the tracking mechanisms for the advertisement. For example, if it is determined that the majority of the phone calls in response to the advertisement is via the SIP address, other tracking mechanisms may be de-allocated from the advertisement, or re-allocated for a different advertisement. Alternatively, the reference may be phased out from the advertisement while the reference is allocated to a different advertisement.

For instance, if an advertisement has a high call volume (e.g., receives many calls), it may be upgraded for a more expensive method of tracking. An advertisement with an extension may be upgraded to a local phone number without an extension, or even a vanity toll-free number, if the performance of the advertisement is above a threshold (e.g., when its conversion rate or call volume is high). Conversely, advertisements that perform poorly may be downgraded in tracking methods used. For example, an advertisement tracked by a toll-free number without an extension may be downgraded to have a number with an extension, a click-to-call connection mechanism.

The tracking mechanism of an advertisement can be determined not only by the performance of an advertisement, but also by the quality of the demand partner or the quality of the customer viewing the advertisement. For example, one advertisement may use an expensive tracking mechanism on one demand partner but may be assigned a different, inexpensive tracking mechanism on a second demand partner who tends to have lower quality customers (e.g., customers who response less frequently to advertisements). The quality of a demand partner may be reflected upon on the difference in the conversion rate of a same advertisement presented via different demand partners, in the numbers of the potential customers the demand partners can reach, the quality of the customers of the demand partners, etc. In another embodiment, the tracking mechanism is directly determined by the quality of the customer himself/herself. If, for instance, information can be collected about the customer interacting with the advertisements; if the customer is a frequent buyer, an expensive tracking mechanism can be used for the customer. The quality of a customer may also reflected upon the preferences of the customer, the spending habit of the customer, the response rate of the customer to advertisements, the need of the customer, etc. In this case, different customers of different buying tendencies may see the advertisement using different tracking mechanisms at the same demand partners.

In one embodiment, the likelihood of an advertisement being called is estimated based on the type of media channels used to present the advertisement, the demand partner responsible to deliver the advertisement, and/or the customer who views the advertisement. Any characteristics in advertising that have an impact on the likelihood of an advertisement being called and thus the expected revenue/profit generated from the presentation of the advertisement can be used in selecting a tracking mechanism for the particular instance of the advertisement.

In one example, if it is determined that the number of communication leads generated from the assigned phone number is lower than a threshold, the assigned phone number may be reallocated to another advertisement. If the number of communication leads generated from the advertisement is higher than a threshold, the tracking mechanism used for the advertisement may be promoted to a phone number with a short or vanity extension, a phone number without an extension, a vanity phone number, a toll free phone number, a vanity toll free number, a local phone number, or a vanity local phone number. If the number of communication leads generated from the advertisement is lower than a threshold, the tracking mechanism may be downgraded, freeing up tracking resources for other advertisements.

In one example, when advertisements are provided to a demand partner that has a lower success rate in reaching viable customers than other demand partners, this demand partner may be represented using a long extension, leaving short extensions for other demand partners. Alternatively, the advertisements for presentation by the demand partner may be tracked using references for callback or SIP addresses.

In one example, the system may promote the advertisement activities in one geographic area; and the advertisements served in that geographic area receive upgrades in tracking mechanism.

In one example, the advertisements in certain categories of products and services use upgraded tracking mechanisms.

In one embodiment, the advertisements with a pay per communication lead price bid higher than a threshold receives an upgrade in tracking mechanism.

In one embodiment, the system determines weighting factors in various types of communication references (e.g., in terms of cost and benefit in promoting the advertisement), the success rate of the advertisement in various communication channel/demand partner, and the price bids of the advertisers. Based on the collected information, the system can select tracking mechanisms to optimize the potential revenue that can be generated from advertising. In one embodiment, the potential revenue includes the advertisement revenue and/or other revenue that can be generated from the advertisement. For example, when the system takes a commission from the transaction resulted from the advertisement, the potential revenue can include the expected commission from the presentation of the advertisement; and in such a case the system may further use the statistical data related to the successful rate of a call converting into a transaction, an average value of a transaction, the possibility of a repeated call, the average value of a repeated call, etc., in the determination of the potential revenue. In one embodiment, advertisements may qualify for better tracking mechanisms when their pay-per-call bid price reaches a certain value. Similarly, advertisements may qualify for better tracking mechanisms when their overall value reaches a certain threshold. Their overall value can be a function of their bid price, ordinal position, conversion rate, demand source, customer quality, etc.

Figure 31:
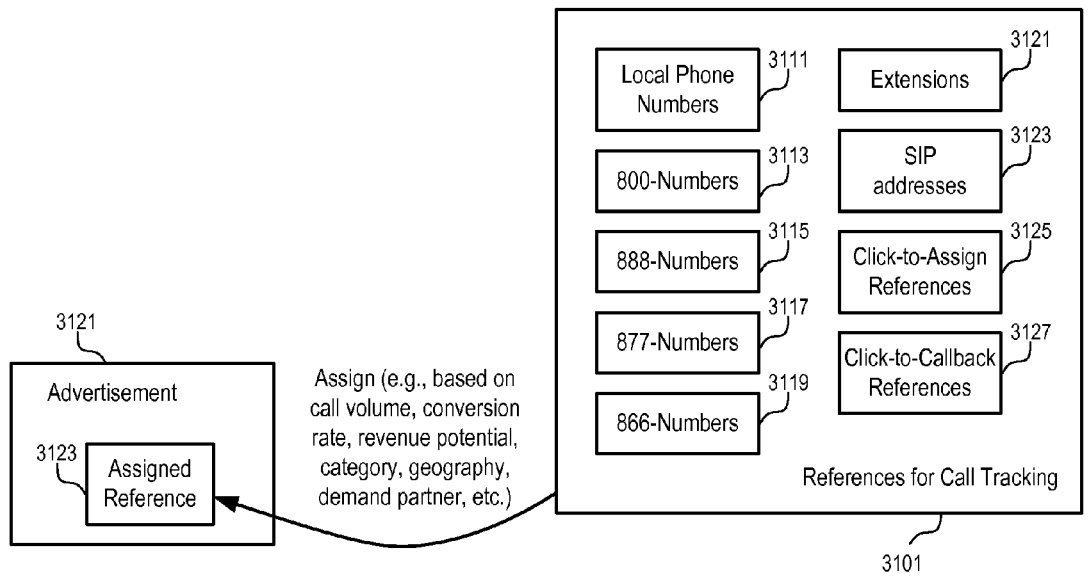
FIG. 31 shows a diagram illustrating a method to select a type of tracking mechanism with a corresponding reference for embedding in an advertisement according to one embodiment.

FIG. 31 shows a diagram illustrating a method to select a type of tracking mechanism with a corresponding reference for embedding in an advertisement according to one embodiment. In FIG. 31, multiple types of tracking mechanisms are used in the system. The tracking mechanism used for an advertisement or a version of the advertisement can be dynamically selected and changed. For example, different versions of an advertisement can be generated for delivery by different demand partners.

In FIG. 31, a pool of different types of references (3101) are maintained, such as local phone numbers (3111), 800-numbers (3113), 888-numbers (3115), 877-numbers (3117), 866-numbers (3119). Some of the references can be dynamically generated and used, such as extensions (3121), SIP addresses (3123), click-to-assign references (3125) and click-to-callback references (3127). In one embodiment, one or more of the references are selected and used as the assigned reference (3123) that is embedded in the advertisement (3121). In one embodiment, the assignment is based at least partially on factors related to the advertisement, such as call volume, conversion rate, revenue potential, category, geography, demand partner, etc.

In one embodiment, the reference of a particular type is selected and assigned to the advertisement when the advertisement is being requested for delivery. When the advertisement is subsequently requested, the previously assigned reference can be used. Alternatively, when the advertisement is subsequently requested, a different reference of a re-selected type can be selected and assigned to the advertisement, based on the considerations such as the call volume in a past time period, conversion rate, price bid, etc. After the new reference is assigned to the advertisement, the previous reference can be assigned to a different advertisement.

In one embodiment, before the expiration of the previously assigned reference for an advertisement delivered by a demand partner, a new reference can be assigned to the advertisement for delivery by the same demand partner. Thus, multiple references can be associated with a same set of parameters in a time period. Further, since some of the references can be re-assigned to a different advertisement, one reference may be associated with multiple sets of parameters (e.g., for different advertisements). In one embodiment, when a reference is associated multiple sets of parameters, the parameter set that is most recently assigned to and associated with an advertisement has the highest priority; and when the reference is used to request a communication connection with an advertiser, the customer can be prompted to confirm the set of parameters (directly or indirectly) before the set of parameters are used to connect the customer to the advertiser.

Figure 32:
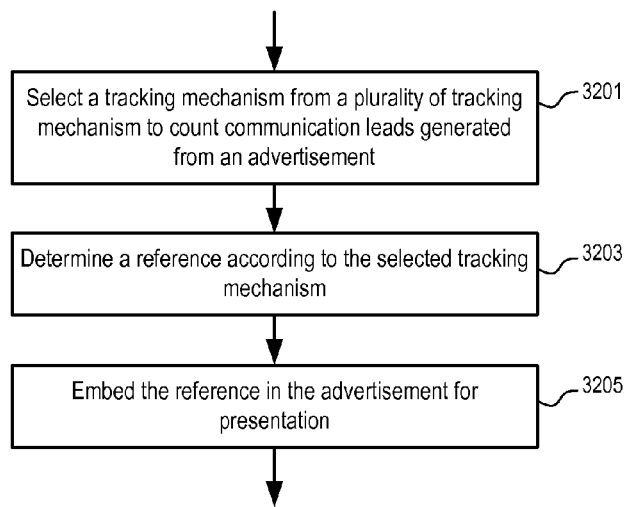
FIG. 32 shows a flow diagram of a method to provide an advertisement according to one embodiment.

FIG. 32 shows a flow diagram of a method to provide an advertisement according to one embodiment. In FIG. 32, a tracking mechanism is selected (3201) from a plurality of tracking mechanism to count communication leads generated from an advertisement. In one embodiment, the communication leads generated from the advertisement are used to measure the performance of the advertisement; and the advertisement is paid based on the performance of the advertisement. For example, the advertisement may be charged based on the number of communication leads generated by the advertisement; and the price per communication lead can be specified by the advertiser. Alternatively, other measurements based on counting the communication leads generated from the advertisements can also be used.

In FIG. 32, a reference is determined (3203) according to the selected tracking mechanism. For example, if the selected tracking mechanism uses a toll free telephone number without an extension, a toll free telephone number is selected from a pool of toll free telephone numbers for the advertisement. Data indicating the association between the toll free telephone number and the particular version of the advertisement is stored. For example, if the selected tracking mechanism using a telephone number with an extension, an extension is selected such that the phone number and the extension as a whole can be used to identify the particular version of the advertisement, which may include a number of parameters to be tracked, such as the demand partner responsible to deliver the advertisement to the customer, a media channel used by the demand partner to deliver the advertisement to the customer, the advertiser's phone number, a partner who is responsible for getting the advertiser/advertisement, etc.

In FIG. 32, the reference is embedded (3205) in the advertisement for presentation. References for different tracking mechanisms may be presented differently. For example, an assigned phone number may be displayed or read out to the customer; a SIP address may be presented as a button for VoIP call; and a reference to request a callback may be presented as an icon or a link, etc.

Figure 33:
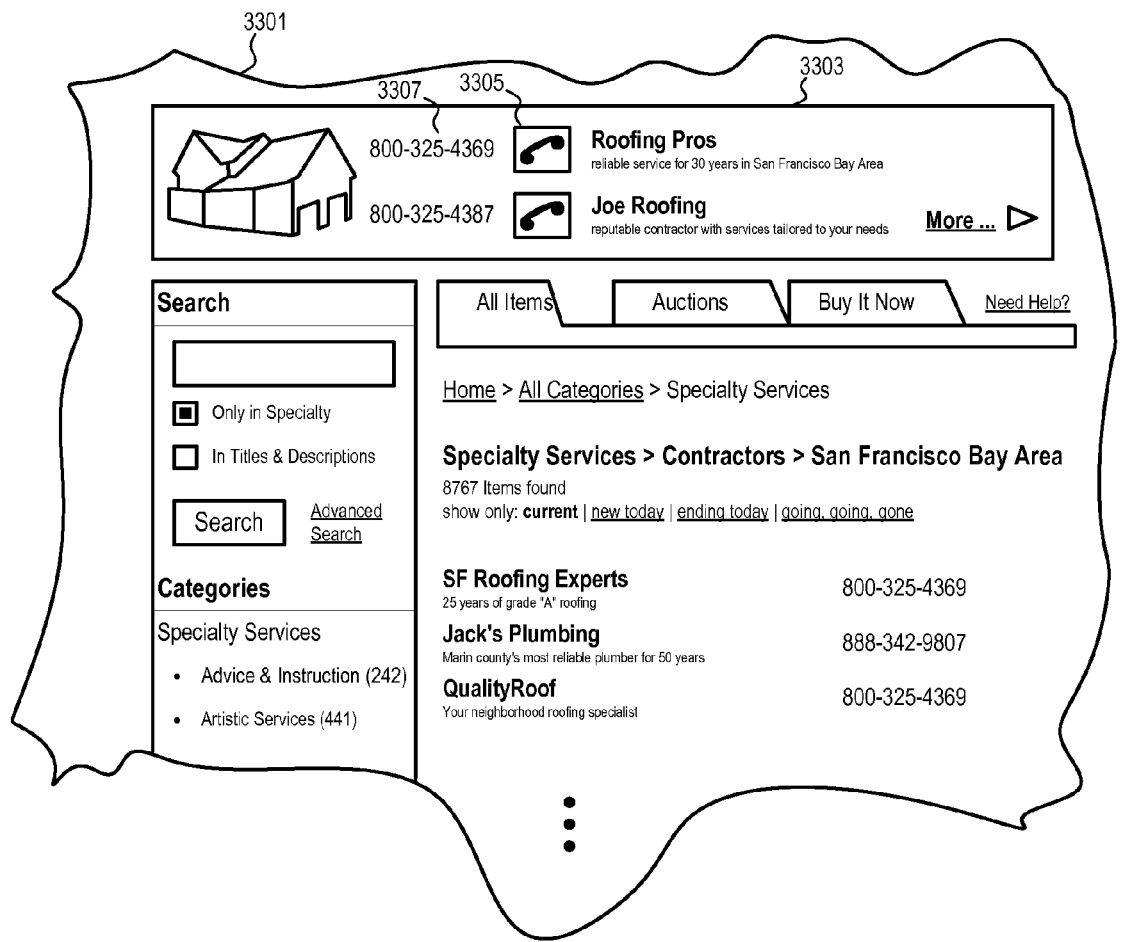
FIG. 33 illustrates an example of displaying advertisement listings in a banner according to one embodiment.

FIG. 33 illustrates an example of displaying advertisement listings in a banner according to one embodiment. In FIG. 33, a banner advertisement (3303) is displayed within a web page (3301). The web page (3301) may be rendered for display from one or more files, one of which may be a main file in a markup language (e.g., HyperText Markup Language (HTML) or an EXtensible Markup Language (XML)) or in other formats such as a custom designed format. The main file may contain references to other files such that when the main file is rendered in a browser, the one or more files are processed to generate the display of the web page (3301).

The banner advertisement (3303) includes one or more listings. Each of the listings contains one or more references for requesting a two-way real-time communication connection with the corresponding advertiser, such as a telephone number that can be called to reach the advertiser (e.g., through a connection system), or a call button which can be selected to request a VoIP call to the advertiser. The telephone number may or may not include an extension. The telephone number may include a vanity number which spells a word or phrase on the phone keypad. The request may be made through initiating the real-time communication connection from the user of the web page (3301) to a connection system using the reference, or through sending a message to the connection system which can initiate the real-time communication connections to the user of the web page (3301) and the advertiser selected by the user and join the connections to connect the user and the advertiser. Alternatively, or in combination, the listings can contain links which when selected (e.g., clicked) reveal the contact information of the advertisers, such as the telephone numbers of the advertisers and/or address information (e.g., email address, instant messaging user ID). In one embodiment, when the contact information is revealed through dynamically modifying the web page that contains the listing. Alternatively, a new web page, or a popup window, or a layer over the existing web page can be displayed to show the contact information. In one embodiment, the listings include links which when selected (e.g., clicked) cause the system to initiate a VoIP call to the advertiser.

In one embodiment, the two-way real-time communication connection can be made through a monitoring/tracking system to determine the number of two-way real-time communication connections established based on the banner and/or determine the time period of the real-time communication between the user and the advertiser.

The advertiser may sell products or services. For example, the advertiser may provide services, such as advice, information, entertainment and/or amusement, over the real-time communication connection, which may be a telephonic connection, an instant messaging connection, a video conferencing connection, a text chat connection, a common whiteboarding connection, etc.

In one embodiment, the banner advertisement (3303) may include multiple listings. At a given time, a portion of multiple listings is displayed. The listings are animated or rotated to show the multiple listings over a period of time.

In one embodiment, at least a portion of banner advertisement can be selected by the user to request a telephonic connection via a VoIP system. The telephonic connection may be initiated from a VoIP client application running on a computer on which the web page (3301) is rendered and displayed. Alternatively, the request may be sent to a server remote to the computer which renders and displays the web page (3301); and the server then initiates the telephonic connection.

In one embodiment, the user may manually dial the phone number (e.g., 3307) displayed in the banner to request the telephone connection. A server at the phone number (e.g., 3307) can receive the phone call and determine the corresponding advertiser (e.g., based on the phone number dialed by the caller to reach the server and/or an extension dialed after the server picks up the call) and connect the telephone call to the advertiser. In one embodiment, the advertisement is presented on behalf of more than one advertiser (or an advertiser that has different offices, branches, extensions, etc.). When the phone call is received as a result of the advertisement, a live operator or an IVR system can interact with the caller to route the call to a selected one of the advertisers (or a selected office, branch, or extension of the advertiser). Alternatively, the system may make the selection automatically based on considerations such as the availability of the advertisers, the current bids of the advertisers for phone leads generated from the advertisement, the geographical locations of the caller and the advertisers, and/or one or more specific requests/selection criteria received from the caller over the phone, etc.

Traditionally, banner advertisements are designed to direct the web traffic to the web site of the advertiser, from the site that provides the web page and/or the banner advertisements. The banner advertisement may be paid based on impression or click through. An impression of the banner advertisement occurs when the banner advertisement is loaded from the web site into a web browser for display. A click through of the banner advertisement occurs when the user of the web browser selects the banner to cause the web browser to load the web page of the advertiser.

In one embodiment, the banner is designed be selected to "call through" to the advertiser, instead of "click through" to the web site of the advertiser. For example, in FIG. 33, when the icon (3305) is clicked, a telephone call may be initiated to the advertiser. The click may lead the web browser to load the web page of a service agent which provides the services of connecting the advertiser and the user for real-time communication and tracking the real-time communication connections. For example, the web site of the service agent may provide detailed information on how to go through the process of connecting to the advertiser. The web page of the service agent may provide services to schedule/arrange the call when the advertiser is currently available for the real-time communication or will be available for the real-time communication in a period of time. When the advertise is not available for the real-time communication with the user for a longer period of time, the web site of the service agent may present an option to schedule an appointment with the advertiser for the user. The web page of the service agent may request a communication reference to call back to the user of the web page (3301) and/or a time period within which the user would be available for the real-time communication.

Alternatively, the selection of the icon (e.g., 3305) may cause the web browser to initiate a telephonic call (e.g., through loading a VoIP module such as a plug-in to the web browser, or a VoIP helper application which is an application separate from the web browser and which can make a VoIP based phone call based on parameters passed from the web browser).

The banner advertisement (3303) can may be rendered from one or more components, such as an image (e.g., in a GIF or JPEG format), a JavaScript program and/or a multimedia object with a scripting language such as Java, or a file/data for other application modules such, Shockwave or Flash. These components may be in separate files or in one file.

The banner advertisement (3303) may animate one or more listings and/or provide sound to improve user experiences. The banner advertisement (3303) may include the indication of the current availability status of the advertiser to perform the real-time communication (e.g., using the icon (3305)). The banner advertisement (3303) may further include a brief description of the advertiser and/or other information about the advertiser, such as the qualification as an advisor in a field, a quality rating based on prior customer feedback, language capability, etc.

In one embodiment, the layout of at least a portion of the listing presented in the banner is designed and provided by the advertiser. Alternatively, the advertiser may provide a portion of the content; and the listing is automatically formatted to include the content provided by the advertiser.

The banner may be wide and short, suitable for being placed on the top (or bottom) of the web page (or a section of the web page). The banner may be tall and narrow, suitable for being placed on the side (e.g., left or right) of the web page (or a section of the web page). A banner may also be so big that it takes up most of the page. In general, a banner can be generated for presentation in any size and shape. In one embodiment, a banner has a dynamically changeable size. For example, a banner shows an initial set of listings with a link or button. When the link or button is selected, the banner shows additional listings by dynamically changing the banner in the web page, without reloading a separate web page or refreshing the entire web page; and the size of the banner is dynamically changed to accommodate the additional listings. Alternatively, the banner may have a fixed size; and the additional listings replace the previously displayed listings. Alternatively, more listings may be displayed in a separate banner, or in a separate web page, or in a popup window, or in a layer over the current web page, when the link or button is selected for more listings. The additional listings may be pre-fetched from the web site together with the web page. Alternatively, the additional listings may be obtained from the web site in response to the selection of the link or button (e.g., after the display of the web page).

The one or more listings presented in the banner may be selected dynamically from a database of listings, based on the content of the web page so that the listings may be of interest to a typical reader of the web page. Further, the selection of listings for inclusion in the banner may be based on the prices specified by the advertisers. The prices may be charged by the advertiser to the caller when the caller calls the advertiser for advice, for information, or for entertainment (e.g., on a per minute basis). The prices may be charged to the advertiser for the advertisements based on the number of calls the advertisers receive from the advertisements (e.g., on a per call basis). In one embodiment, a banner has dynamic content based on the page in which the banner is located. For example, the content of the banner in a web page can be determined dynamically based on one or more search parameters presented in a search box of the web page. For example, Bob's Plumbing site can have a search box which allows a customer to search for plumbing resources in Boston, Mass. The search results on the page may have many resources on plumbing in Boston, Mass.; and the banner can dynamically present advertisers in Plumbing for Boston based on the search parameters. The banner may also provide advertisements for service, information or entertainment in Boston, Mass. Alternatively, the web page owner can select to have banners display certain types of listings when setting up the banner advertisement relationship with an advertisement agency, who provides the content of the banners. For example, Joe's Seattle Electrician Help Site can choose to have static banners of electricians in Seattle from the list of advertisers of the advertisement agency, or dynamic banners of electricians that are selected randomly (or selected based on a set of rules). In one embodiment, the banner can determine the content of the web page in which the banner is located (e.g., through analyzing the HTML document of the web page) and select advertisements based on the content of the web page. In one embodiment, a banner may utilize data storage mechanism in the web browser (e.g., cookies) to collect information about the identity of the user of the web browser and/or the preference of the user to customize the selection of advertisements for the user. In one embodiment, statistical data related to the presentation of advertisements to the user and the user interaction with advertisements is collected (e.g., using the information that identifies the user); based on the statistical data the preference of the user can be identified, which can be used in selecting advertisements of interest to the user.

In one embodiment, a service agent can provide the services of arranging advertisements (e.g., service listings, product listings, advertisements for services, products, entities, individuals, etc.) on one or more media channel for advertisers. The service agent purchases/pays for banner advertisement placements from operators of media channels, such as search engine operators, or operators of frequently visited web sites (e.g., such as newspaper or entertainment sites). The service agent may pay for the placements of banner advertisement on the media channels, based on a conventional scheme, such as based on the number of impressions of banner advertisements or based on the number of click through from the banner advertisements (e.g., click through to the site of the service agent to initiate the communication connection between the user and the advertiser). The service agent can use the placements of banner advertisements to present advertisement listings for which the advertisers (e.g., sellers or advisors) pay based on the establishment of real-time communication connections, such as the telephone connections.

For example, the service agent may present the pay per call advertisement listings for one or more advertisers in a banner advertisement at a web site. The service agent pays the operator of the web site for the banner advertisement on a per impression basis or on a per click through basis. The service agent charges the one or more advertisers for the advertisement listings based on the number of telephone calls generated from advertising on behalf of them.

Alternatively, or in combination, the service agent may pay the operators of the media channels a percentage of the advertisement fees collected from the advertisers for the placements of the banner advertisements in the media channels. The service agent may track the establishment of telephone calls to determine the media channels who are responsible for presenting the banner advertisements that result in the telephone calls to the advertisers. The service agent may determine the number of telephone calls generated from the banner advertisements on the respective media channels and to compensate the operators of the media channels according to the number of telephone calls initiated from the banner advertisements presented by the respective media channels. Alternatively, or in combination, the service agent may pay the media operators a pre-determined fee (e.g., a monthly fee) for the placements of the banner advertisements. Alternatively, or in combination, the service agent may pay the media operators according to a price bid specified by service agent for click through or for impression. The price bid may not be proportional to any pay per call price bids by the advertisers. The service agent may determine a price bid based on statistic data to improve profits.

In another example, the service agent may use the banner advertisements in the media channels to present the listings for providers who provide services (e.g., advice, information, entertainment) over real-time communication connections, such as telephone connections, instant messaging connections, video conferencing connections, text and/or voice chatting connections, common white-boarding connections, etc. The connections may be used to provide live voice communications, live video communications, live text communications, or recorded communications, such as video/audio clips, television programs, or a combination of these. The service agent may determine the duration of the real-time communications. The customers who request the real-time communication connections with the information/service providers can be charged based at least on the duration of the real-time communications and/or prices (rates) specified by the information/service providers. The prices (rates) specified by the information/service providers may be presented as part of the advertisement listings or provided when the user clicks through the banner, or when the user starts the real-time communication connection using the reference provided in the banner (e.g., by calling the phone number presented in the listing).

The banner advertisement may statically show one or more listings in the banner. The banner advertisement may rotate multiple listings in the banner periodically so that the banner can display more listings over a period of time than that can be display at a given time instance within the display area of the banner advertisement. The banner may further interact with the user to selectively display one from multiple listings.

Figure 34:
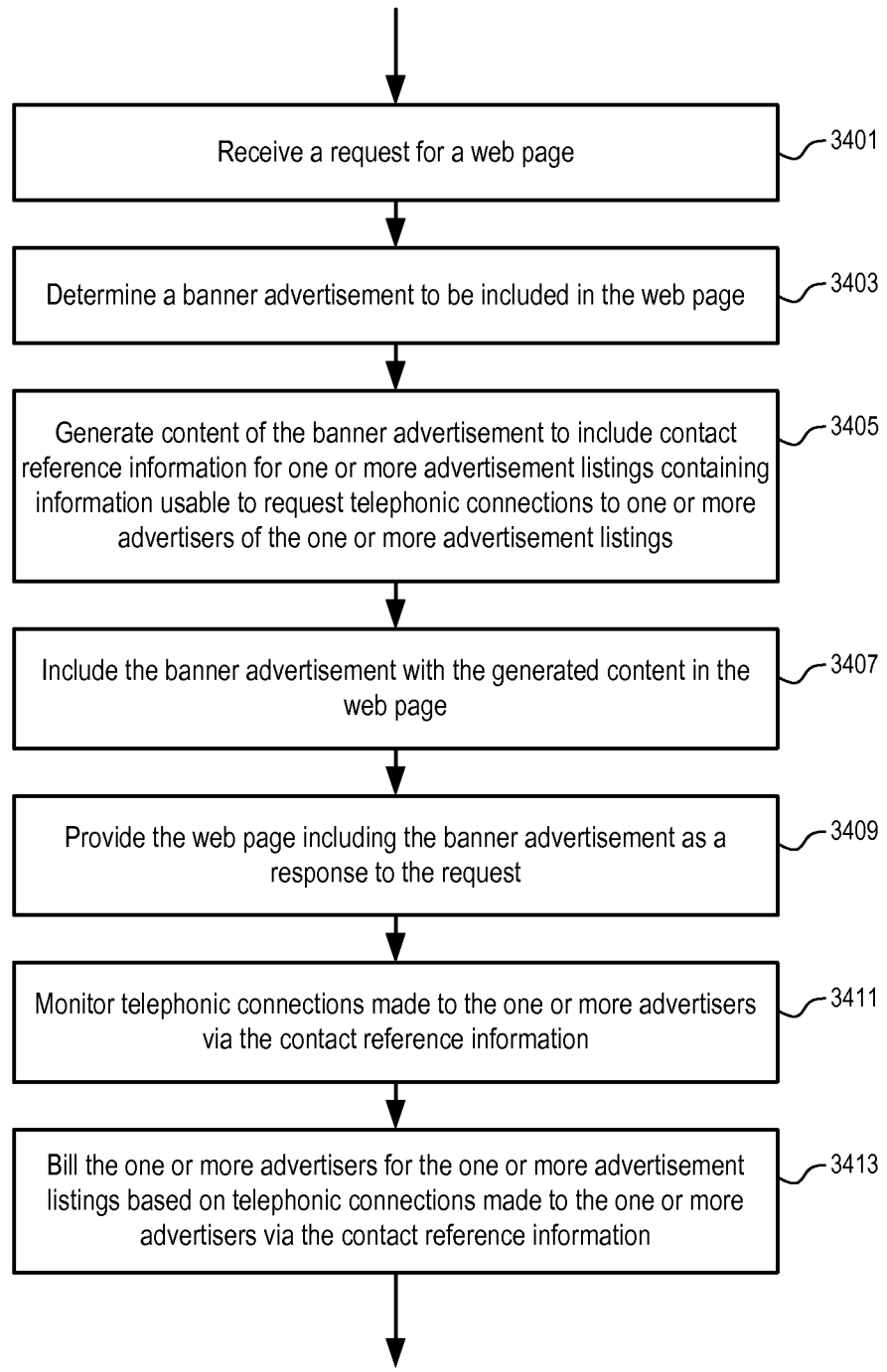
FIG. 34 shows a method to present advertisements according to one embodiment.

FIG. 34 shows a method to present advertisements according to one embodiment. In FIG. 34, after a request for a web page is received (3401), a banner advertisement to be included in the web page is determined (3403). The web page may be in a HyperText Markup Language (HTML) format, with or without references to one or more components which can be in other formats, such as graphics, scripting code, data for application modules or external applications, etc. The web page may be in other markup languages, such as an EXtensible Markup Language (XML) format. The web page may be provided to a browser through a HyperText Transfer Protocol (HTTP) server or other types of servers, such as a File Transfer Protocol (FTP) server, a Wireless Application Protocol (WAP) server, etc.

Operation 3405 generates content of the banner advertisement to include contact reference information for one or more advertisement listings, containing information usable to request telephonic connections to one or more advertisers of the one or more advertisement listings.

The banner advertisement with the generated content is included (3407) in the web page. The banner advertisement with the generated content may be provided partially or entirely in an HTML format in the main file of the web page. The banner advertisement with the generated content may be partially provided in a file separate from the main file of the web page, which contains a reference to the separate file such that when the web page is downloaded, the separate file is also downloaded as part of the web page that is rendered as one page in the browser. When the view port of the browser is sufficiently large, the entire page can be displayed. When the view port of the browser is not sufficiently large, a portion of the entire page is displayed; and the view port can be adjust to show any portion of the page. The web page including the banner advertisement is provided (3409) as a response to the request.

Operation 3411 monitors telephonic connections made to the one or more advertisers via the contact reference information. In one embodiment, the telephonic connections are made through a server which tracks the telephone calls to determine one or more of: the number of phone calls to a particular advertiser that are generated from the advertisements, the number of phone calls to an advertiser that are generated from banner advertisements presented by a particular media channel, the durations of the phone calls, etc. The one or more advertisers for the one or more advertisement listings can be billed (3413) based on telephonic connections made to the one or more advertisers via the contact reference information, such as based on the number of calls and/or the duration of the calls.

FIG. 34 show an example of generating telephonic connections from banner advertisements. Other types of communication connections, such as video conferencing, instant messaging, common white-boarding, text/voice chatting, or a combination of different communication types, can be generated in a similar way.

Advertisement listings designed to generate two-way real-time communication connections, not just links to the web sites of the advertisers, can also be presented in other components of a web page, such as a table in a side area of a web page, or in a table on a top (bottom) area of a web page. Further, the advertisement may be partially or entirely hidden in the web page until an element of the web page is selected. For example, an icon, a button or a hyperlink may be included in the web page; when the icon, button or hyperlink is selected (e.g., through positioning a display of a cursor over it for a period of time or activating a selection device while the cursor is displayed over it), the advertisement is displayed in a popup window (or the icon, button or hyperlink is expanded into a full version of the advertisement). The popup window of the advertisement may be dismissed after the cursor is moved away from the icon. The expanded version of the advertisement may be reversed back to a reduced version of the advertisement when the cursor is moved away from the advertisement. Alternatively, the advertisement can be presented in a separate layer of the web page; when the cursor is on the icon, button, or hyperlink, the layer including the expanded version of the advertisement is shown within the existing browser window; when the cursor is moved away from the advertisement, the expanded version of the advertisement is dismissed into the hidden layer. Alternatively, the layout of the current web page can be dynamically changed to show the expanded version of the advertisement.

Further, the expanded version of previously downloaded advertisement listings may be displayed while the current web page is being downloaded to the web browser. A version of the advertisement listings may be presented as floating over the web page (e.g., during the web page is being loaded and/or within a period of time after the web page is loaded and displayed).

FIGS. 35-38 shows further examples of displaying advertisement listings according to some embodiments.

Figure 35:
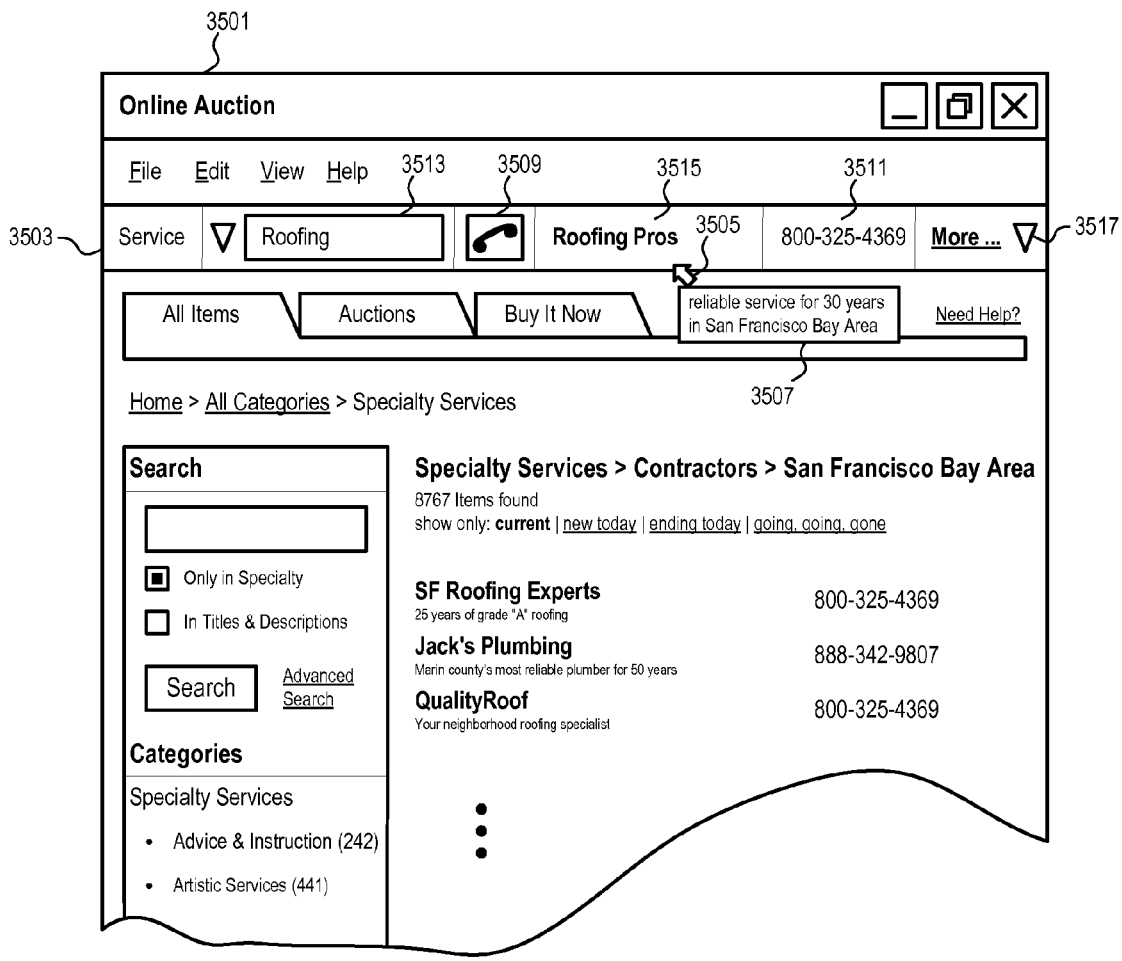
FIGS. 35-38 shows further examples of displaying advertisement listings according to embodiments.

In FIG. 35, one or more advertisement listings can be provided in a tool bar (3503) of an application (3501), such as a browser, a contact manager, a text/graphics/program editor, a spreadsheet program, etc. The tool bar (3503) can be displayed (docked) horizontally near a top (or bottom) boundary of the application (or vertically near a left or right boundary of the application).

The tool bar may also be displayed in a separate window (e.g., floating over the main window of the application). The tool bar displayed in the separated window can be moved to the boundary of the main window and then be docked near the boundary of the main window of the application.

The tool bar (3503) can include an input area (3513) to receive one or more search terms to search for advertisement listings (e.g., based on service/product categories, geographic location, qualifications of the providers, customer ratings of the providers, etc.) In one embodiment, the tool bar can access/retrieve/read the web page, or other information in an application that is under the control of the tool bar, to determine an advertisement that is relevant to the web page or the current status of the application. For example, a tool bar on a window of an instant messaging application can select advertisements based on the instant messages that are received and displayed in the window. For example, a tool bar of an email application may display advertisements based on the current email that is being displayed.

In the example illustrated in FIG. 35, the tool bar (3503) includes an area (3509) to display an icon (3509) which indicates the current availability of advertiser (e.g., a service/product provider) to talk over a telephonic connection. The icon (3509) can be selected through positioning a display of a cursor over the icon using a cursor positioning device, such as a mouse, a touch pad or a joystick, and activating a signaling device, such as a button of the mouse, the touch pad or joystick or a key on a keyboard or a predefined input event from the touch pad such as a tap or double-tap on the touch pad, while the cursor is displayed over the icon (3509). The icon (3509) may also be selected by pressing one or more keys of a keyboard (e.g., in a predetermined combination and/or sequence). When the icon (3509) is selected, the tool bar (3503) initiates a request for the telephone connection to the corresponding advertiser. The telephone connection may be initiated from the computer/device that runs the application (3501) (e.g., through an embedded VoIP communication module, or a separate VoIP application).

Alternatively, the tool bar (3503) may cause the request to be transmitted to a connection system (e.g., a server remote from the computer/device that runs the application (3501)) which initiates the telephone connection based on a reference to the advertisement list. In response to the request, the connection system may further request a telephonic contact of the user of the application (3501), such as a telephone number of a landline phone or a cellular phone, or a user identification of a VoIP system. Alternatively, the telephonic contact information may be stored (e.g., as a preference or configuration option of the tool bar or the application) and transmitted to the connection system with the request. Alternatively, the telephonic contact information may be pre-stored on a database accessible to the connection system, which retrieves the contact information based on an identification of the user of the application (3501).

In FIG. 35, the tool bar also displays the phone number (3511) assigned to the advertiser. In one embodiment, when the phone number (3511) is called, the call is connected to a connection system first. The connection system identifies the advertiser based on the phone number dialed to reach the connection system and/or an extension dialed after the call reaches the connection system. The connection system then further connects the call to the advertiser (e.g., through dialing a separate call to the advertiser and joining the calls to connect the caller to the advertiser or forwarding the call to the advertiser).

In FIG. 35, the tool bar provides an area (3515) to display an identification of the advertiser, which may include one or more of: the name of the advertiser, a logo or icon or photo picture of the advertiser, a short description, etc. When the cursor (3505) is positioned over the area (3505) for a predetermined period of time (and/or selected through activating a signaling device), a popup window (3507) is shown to provide further details about the advertiser. The popup window may automatically disappear after a predetermined period of display, or be dismissed after the cursor (3505) leaves the area (3515) or be dismissed through selecting the popup window. Alternatively, a layer of advertisement, or advertisement information presented on top of the current web page or application can be presented without spawning a new window.

In FIG. 35, the tool bar (3503) further includes an element (3517) which can be selected to request the display of other advertisement listings that are retrieved as a result of the search.

In one embodiment, the tool bar (3503) may perform a search automatically based on the content that is currently loaded into the application (3501). The search may be performed in a background process (e.g., using the idle network connection when the CPU usage is low) such that the performance of the application (3501) is not affected. The automatic search allows the user to see advertisements listings that are in the similar area of the content currently displayed to the user of the application (3501).

Figure 36:
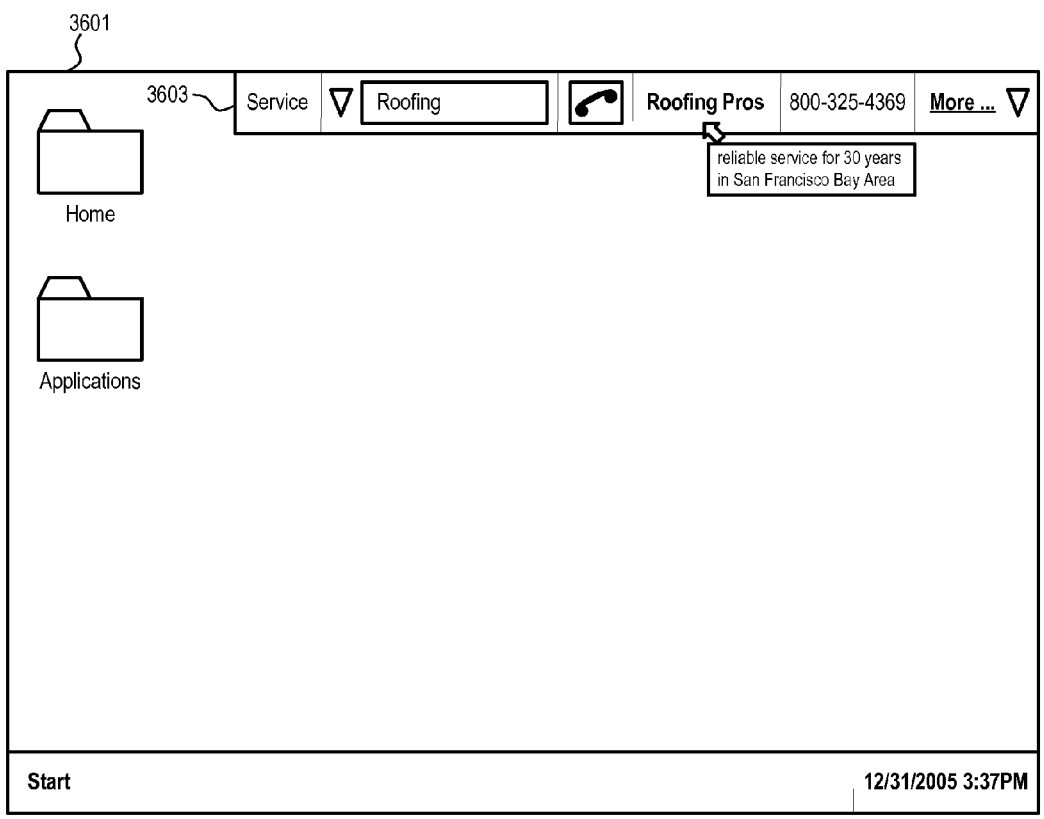
Figure 37:
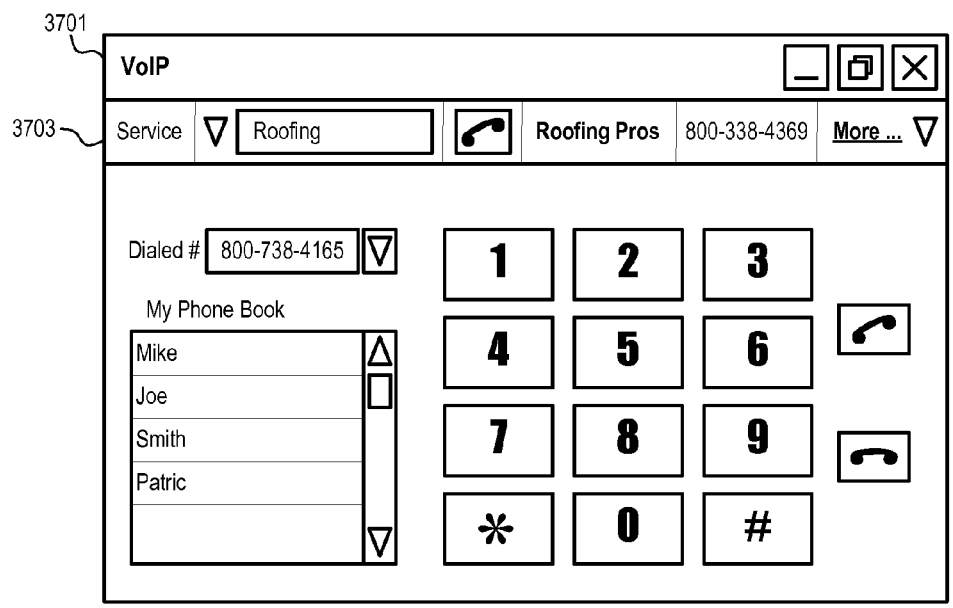
Figure 38:
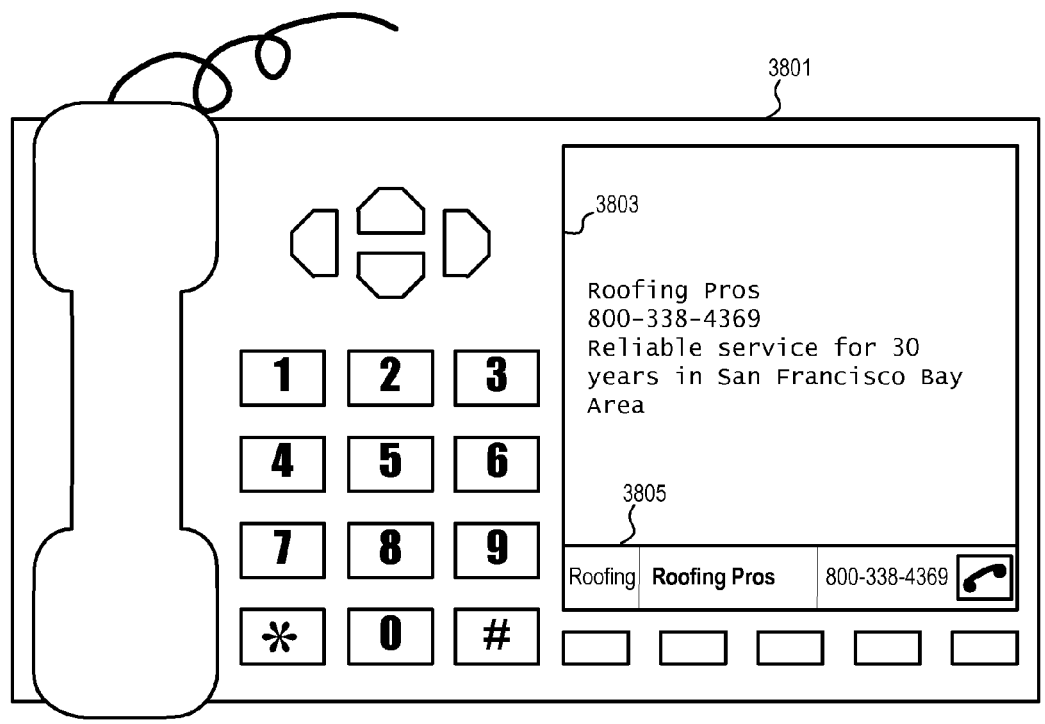

In one embodiment, a tool bar may not be associated with a particular application. As illustrated in FIG. 36, a tool bar (3603) may be docked to a boundary of the desktop (3601) of the graphical user interface. The tool bar may be relocated to different part of the boundary of the desktop (3601) or be moved to float over the desktop.

In one embodiment, a tool bar (3703) is provided in a VoIP application (3701). A user of the VoIP application can use the application to initiate and/or receive telephone calls via a VoIP system, and thus, the VoIP application (3701) can be considered as a VoIP user terminal.

In one embodiment, the display of advertisement listings is provided on a telephone set (3801) which has data communication capability. For example, the telephone set (3801) may support VoIP; a user of the telephone set (3801) can use it to initiate and/or receive telephone calls via a VoIP system, and thus, the telephone set (3801) can be considered as a VoIP user terminal.

The telephone set (3801) has a display device (3803) which can be used display an advertisement listing (3805). The advertisement listing (3805) may be displayed based on a search formed according to input received at the telephone set (3801) through the key pad of the telephone set. Alternatively, the search request may be provided to a remote system, via voice or via the key pad, over a telephonic connection after dialing a phone number of the remote system. The search result obtained at the remote system is provided to the telephone set (3801) for display. Alternatively, the search may be formed automatically on the telephone set (3801) based on one or more telephone numbers dialed by the user; the search is formed to find providers similar to the phone numbers dialed. For example, the telephone set (3801) may submits the one or more telephone numbers dialed by the user to the remote system to search for advertisers who provide services and/or products in the same category of the callees of the telephone numbers dialed. Thus, the user has the opportunity to dial the advertisers of the listings (e.g., if the call to the dialed telephone numbers is not answered, or the previous call does not provide results to the satisfaction of the user of the telephone set (3801)).

Further, the advertisement listings paid by advertisers according to the establishment of real-time communication connections can also be presented in other types of media channels, such as newspapers, magazines, displayed surfaces of items that have a surface designed to be attached to another surface (such as refrigerator magnets, posters, or stickers), television programs (e.g., interactive TV, cable TV, satellite TV, or web TV), radio programs, billboards, etc. When the media channel is not real-time or interactive, a reference for a real-time communication connection to a connection system (e.g., a telephone number, an internet address, VoIP ID, etc.) can be provided to request the connection system to connect real-time communications to the advertiser (e.g., through identifying the advertiser based on the reference used to connect to the connection system).

In one embodiment, presentation of listings/advertisements is optimized based on the value/revenue to supply affiliates, demand affiliates, or the operator of the seller network, etc. Different types of channels used to deliver the advertisements may have different impact on the revenue generated from advertising. Different categories of advertisements may have different success rates in converting impression of advertisements into chargeable events to bring income. Further, individual performance-based advertisements may have different conversion rates which represent the ratio between the number of measurable events, which are generated from the advertisement and charged for the advertisements, and the number of presentations of the advertisements. Further, an advertisement may have different conversion rate on different media channels (e.g., text messaging, web, SMS, audio, video, newspaper, television, etc.) Further, in some embodiments, the measurable events may lead to commercial transactions, for which the seller network, the supplier affiliates and/or the demand affiliates may further charge service fees. Thus, in one embodiment, an indicator of potential revenue that is expected to be generated from presenting the advertisements is computed from the prices for the advertisements, the statistical data representing the performance of the advertisements, and/or the revenue sharing scheme of the seller network, etc. The indicator of potential revenue can be used to improve or optimize the presentation of advertisements.

Figure 39:
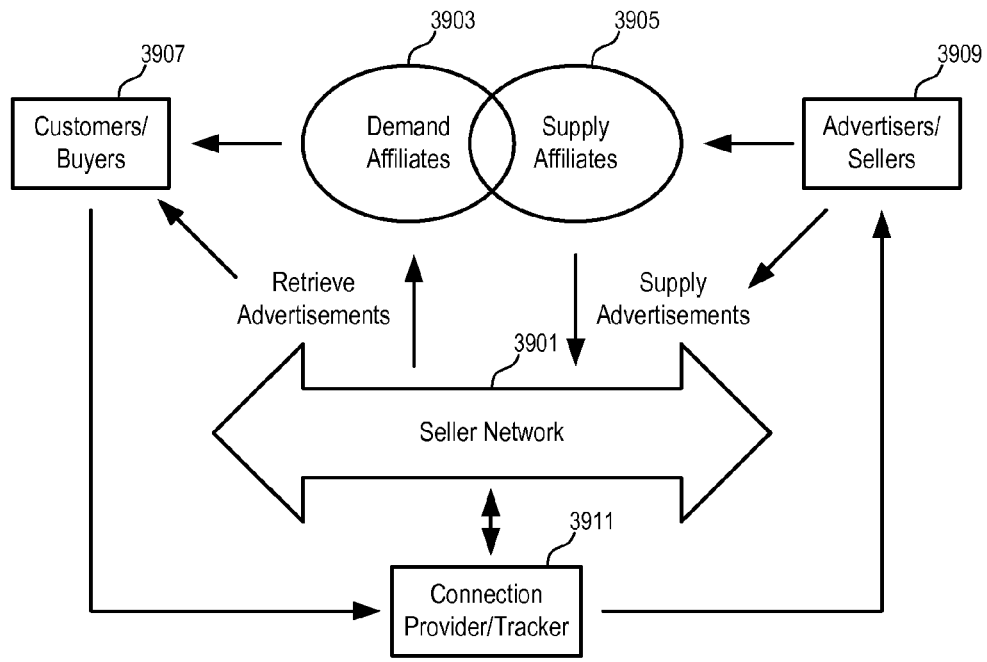
FIG. 39 shows a seller network according to one embodiment.

FIG. 39 shows a seller network according to one embodiment. In FIG. 39, a seller network (3901) may have supply affiliates (3905) and demand affiliates (3903). The supply affiliates (3905) provide advertisements of the advertisers/sellers (3909) to the seller network (3901). The demand affiliates (3903) operate media channels to provide the advertisements to the customers/buyers (3907). Some affiliates may be both supply affiliates and demand affiliates. Supply affiliates earn their shares of the advertisement revenue for bringing the advertisers/sellers (3909) to the seller network (3901); and the demand affiliates earn their shares of the advertisement revenue for bringing the customers/buyers (3907) to the seller network (3901).

In one embodiment, at least some of the advertisers/sellers (3909) join the seller network (3901) directly; and at least some of the customers/buyers (3907) obtain the advertisements from the seller network (3901) directly. An operator of the seller network (3901) earns its shares of the advertisement revenue for maintaining the network, for presenting the advertisements to the customers/buyers (3907) directly, or indirectly via the demand affiliates, and for getting the advertisements from the advertisers/sellers (3909) directly, or indirectly via the supply affiliates.

In one embodiment, the advertisements are charged based on the communication leads generated from the advertisements. A connection provider/tracker (3911) tracks and/or connects the communication leads to the corresponding advertisers/sellers. For example, the advertisements may be charged based on telephone leads generated from the advertisements; and the connection provider/tracker (3911) tracks the telephone calls from the customer to the advertiser through connecting the telephone calls to the advertiser for the customer. The connection provider/tracker (3911) may also charge a portion of the communication cost to the customer and/or the advertiser (e.g., when the communication time for a connection exceeds a predetermined period, the advertiser may be charged for the remaining period of the communication).

In one embodiment, the connection provider/tracker and the operator of the seller network are the same entity. Alternatively, connection provider/tracker and the operator of the seller network can be different entities.

In one embodiment, the price for the advertisement is specified by the advertiser/seller (3909). Alternatively, the price for the advertisement can be specified by the seller network, or the demand affiliates, or the supply affiliates, or the connection providers/tracker. In one embodiment, the price of the advertisement is performance-based; and the advertisers are charged based on measurable events of interest to the advertisers, which events are generated as the result of the advertisements. Alternatively, the advertisement fees may be based on the presentation of the advertisement and/or the placement location of the advertisement.

In one embodiment, a demand affiliate may collect advertisement fees from the seller network based on events different from the events the seller network and/or the supplier affiliates charge the advertiser.

For example, a demand affiliate may collect an advertisement fee for each presentation of an advertisement and/or a premium for placing the advertisement at a specific location (e.g., on the top of a web page or list), or the demand affiliate may collect an advertisement fee for each user selection of a link embedded in the advertisement (e.g., pay per click). The seller network and/or the supplier affiliates may charge the advertiser for the advertisement based on a telephone connection (or other communication leads, such as an instant messaging connection, a video conferencing connection, an email lead, etc.) that is established as a result of the advertisement (e.g., pay per call). The demand affiliates may charge for the advertisements based on the type of the channels used to deliver the advertisements. For example, a text/web channel may be less expensive than an audio channel, which may be less expensive than a video channel. The seller network and/or the supplier affiliates may charge the advertiser for the leads regardless of the media channel used to generate the leads. The seller network and/or the supplier affiliates may charge the advertiser differently for different types of leads (e.g., phone call, email, instant messaging, video conferencing, etc.). In one embodiment, an advertisement may be presented in a combination of different channels; and a lead generated from an advertisement may include connections for a combination of different types of media (e.g., text, audio, video, etc.). Thus, the revenue sharing between different parties in the system may not be proportional a particular type of price that the advertiser is charged for the advertisement.

In one embodiment, the potential revenue that is expected to be generated from presenting an advertisement is a function of a number of parameters, such as the price the advertiser is being charged to, the cost for presenting the advertisement, the likelihood of generating an event for which the price can be charged (e.g., a call through rate), and/or other related potential benefits that can be generated from the success of the advertisement, such as the value of a first phone call generated from the advertisement, the likelihood of repeated phone calls following the first phone call, the value of repeated phone calls, etc. In one embodiment, the potential revenue includes the advertisement revenue and/or other types of revenues that are generated as a result of a successful advertisement. For example, as a result of a phone call from the customer in response to the advertisement, the customer may purchase services and/or products from the advertiser (seller); and the system may obtain a commission fee from the transaction performed while the customer and the advertiser (seller) are connected to each other via the system. For example, the seller may provide information, advise, entertainment, etc., over the phone connection provided by the system; the customer is charged based on the service time of the seller; and the service fee charged to the customer may be distributed among the seller, the connection system, a supply partner who bring the seller to the network, and/or a demand partner who brings the customer to the network. Statistic data on the call through rate, the average amount of purchases resulted from a phone call and/or the subsequent repeated calls, the likelihood of repeated calls, etc. can be used to estimate the potential revenue. In general, the potential revenue can be estimated using more or less parameters.

Figure 40:
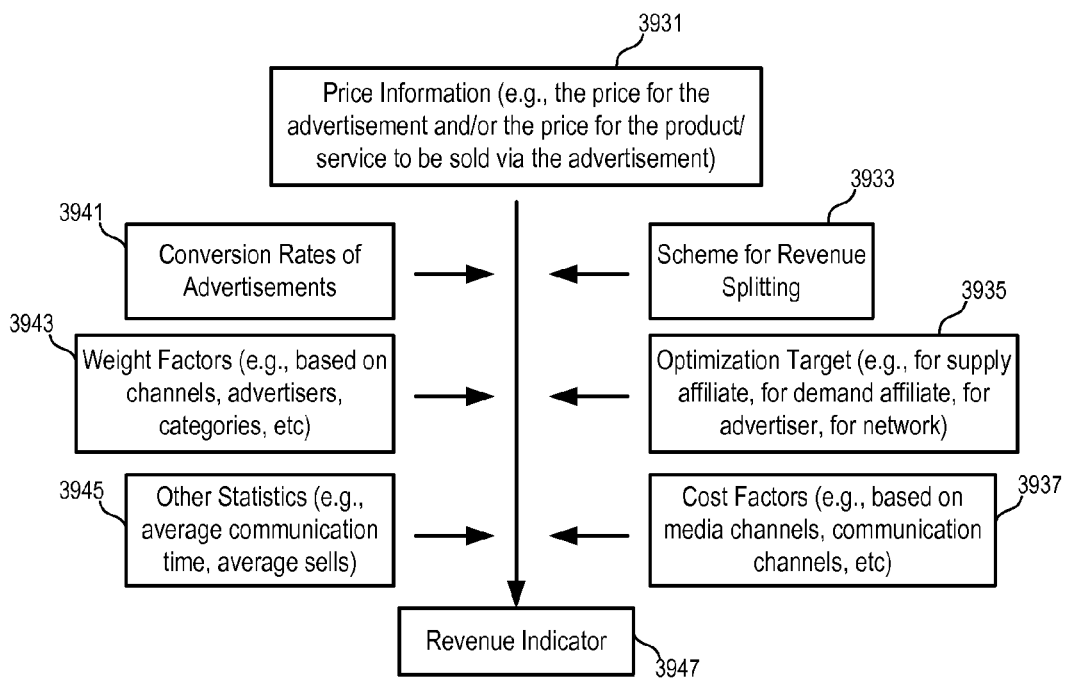
FIG. 40 illustrate a way to generate a revenue indicator according to one embodiment.

FIG. 40 illustrate a way to generate a revenue indicator according to one embodiment. In FIG. 40, the price information (3931) is used to generate a revenue indicator (3947), based on one or more additional considerations. The price information (3931) may include the price the advertiser will pay for the advertisement, and/or the price for the product/service to be sold via the advertisement.

For example, an adviser may advertise to sell advice over telephone connections established via the advertisement (or over other types of communication connections). The adviser may charge the customer based on a per-minute price for the communication time with the adviser. The seller network, the demand affiliate and/or the supply affiliate may deduct a portion of the advice fees as service charge. The likelihood of a sell resulting from a telephone lead generated from the advertisement can be used to estimate the portion of revenue that is a result of a purchase. Thus, the statistical data (3945), such as average communication time, average sells, etc., can be used to estimate the revenue indicator (3947).

In one embodiment, weight factors (3943) can also be used in the estimation of the revenue indicator. For example, different channels used for delivering advertisements, advertisers, categories of advertisements, and/or the type of communication connections required to connect the customer to the advertiser, etc. may have different costs or benefits. The weight factors can be used to approximately represent the costs and/or benefits in a statistical sense. For example, one media channel is more successful in generating chargeable events than another; and weight factors based on the media channels can be used to represent the differences in conversion rates based on the media channels. Weight factors can also be used to approximately represent the differences in conversion rates based on the advertisers, the categories of advertisements, etc.

In one embodiment, the conversion rates of the advertisements (3941) are tracked and used to determine the revenue indicator (3947). The conversion rates can be measured/traced for individual advertisements delivered through different types of media channels. Alternatively, the conversion rates may be tracked for categories of advertisements. In one embodiment, when the conversion rate for an individual advertisement is not available, the conversion rate for similar advertisements (e.g., similar based on geographic area, service/product type, etc.) can be used in estimating the revenue indicator (3947).

In one embodiment, the scheme (3933) for revenue splitting between or among cooperative parties in the advertising system is used to determine the share of revenue for a particular party (e.g., the operator of the seller network, a demand affiliate), or a type of parties (e.g., the seller affiliates). The revenue indicator (3947) can be determined for a particular optimization target (3935), such as for the supply affiliates, or for a demand affiliate, or for the seller network, etc.

In one embodiment, cost factors (3937) can be explicitly considered in determining the revenue indicator (3947). For example, the cost can be determined based on the media channels used to deliver the advertisements. For example, different media channels may charge the seller network different fees for presenting advertisements. Different types of communication channels provided to connect the customers and the advertisers may have different communication costs. The costs can be deducted from the revenue to compute the revenue indicator (3947).

Figure 41:
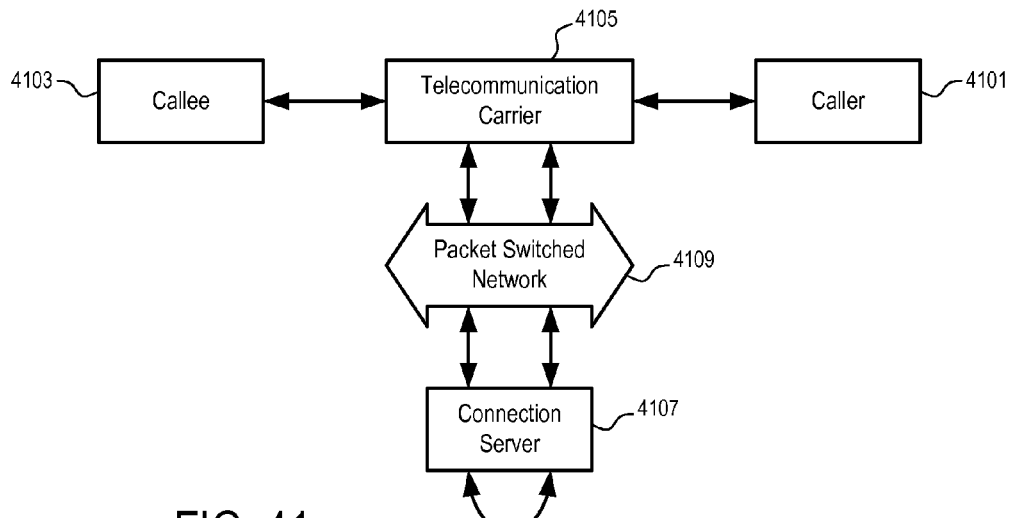
FIG. 41 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 41. In FIG. 41, the connection server (4107) receives and/or places telephone calls via the telecommunication carrier (4105) over the packet switched network (4109). The telecommunication carrier (4105) further routes the telephone communications towards the caller (4101) and the callee (4103).

Since the telecommunication carrier (4105) can route a call from a packet switched network to a variety of destinations (e.g., a traditional analog telephone set, a mobile phone, a cellular phone, a WiFi phone, a Bluetooth phone, a softphone running on a computer, etc.), the connection sever (4107) can use one type of communication connection with the telephone carrier (4105) to facilitate the communication connections with variety of devices used by the customers (e.g., callers and callees). Thus, the implementation of the connection server (4107) can be simplified. In one embodiment, the connection server (4107) can also place and/or receive direct VoIP calls to/from the caller (or callee).

For example, to make a voice connection in response to a click-to-call request, the connection server can place separate VoIP calls, via the telecommunication carrier (4105), to the caller (4101) (e.g., the requester of the click-to-call) and the callee (4103) (e.g., the destination of the click-to-call request).

If the caller (4101) (or the callee 4103) is on a public switched telephone network (PSTN), the telecommunication carrier (4105) bridges the packet switched the network and the public switched telephone network (PSTN). The telecommunication carrier (4105) routes the call from the packet switched network (4109) to the caller (4101) (or the callee 4103) on the circuit switched network. Thus, the caller (4101) (or the callee 4103) can use a telephone set to receive the call via a Plain Old Telephone Service (POTS). The connection server (4107) joins the separate calls that are placed via the packet switched network (4109) to connect the callee (4103) and the caller (4101).

In one embodiment, call signaling and media content may use different network paths. While call signaling is arranged to go through the packet switched network (4109) and the connection server (4107), the media stream does not have to go through the connection server (4107). For example, when the calls are joined, the media content may be redirected to flow over the communication carrier (4105) without going through the packet switched network (4109) to the connection server (4107) for improved performance and efficiency. The connection server (4107) can release the control over the media stream to allow the media stream to flow through the shortest path, without going through the connection server, while maintaining control to the connection for the call by staying on the path for call signaling.

In another example, when the caller (4101) initiates a call over a PSTN to the connection server (4107), the telecommunication carrier (4105) converts the call for the packet switched network (4109) for the connection server (4107).

In one embodiment, virtual softphones on the telecommunication carrier (4105) are assigned to the caller (4101) and the callee (4103) for interfacing with the connection server (4107) over the packet switched network (4109). The virtual softphones encapsulates the devices and networks used by the caller (4101) and callee (4103) to access the connection server (4107); and the telecommunication carrier (4105) shields the connection server (4107) from the implementation details of the user devices and networks used by the caller (4101) and the callee (4103). The connection server (4107) calls (or receives calls from) and connects the virtual softphones on the telecommunication carrier (4105) to connect the caller (4101) and the callee (4103).

In FIG. 41, the telephone connection between the telecommunication carrier (4105) and the connection server (4107) is facilitated via a packet switched network (4109). Thus, the connection server (4107) can operate efficiently in a digital domain. The connection server (4107) interfaces with the telecommunication carrier (4105) using one type of Internet Telephony systems (e.g., SIP-based Internet telephony).

Alternatively, a connection server may include some or all of the functionality of the telecommunication carrier (4105). For example, the connection server may be configured to bridge a packet switched network and a circuit switched network. The connection server may support multiple, different types of Internet Telephony systems.

In one embodiment, the connection server (4107) and the telecommunication carrier (4105) are operated by different, separate entities. Alternatively, the connection server (4107) and the telecommunication carrier (4105) may be operated by the same entity. In another embodiment, the telecommunication carrier (4105) includes a set of facilities operated by a number of separate entities.

In one embodiment, the caller (4101) and/or the callee (4103) may also place/receive calls via a packet switched network. The telecommunication carrier (4105) may route the calls between the caller (4101) and the callee (4103) without using a PSTN. In one embodiment, caller (4101) and/or the callee (4103) may place calls to or receive calls from the connection server (4107) via Internet.

Figure 42:
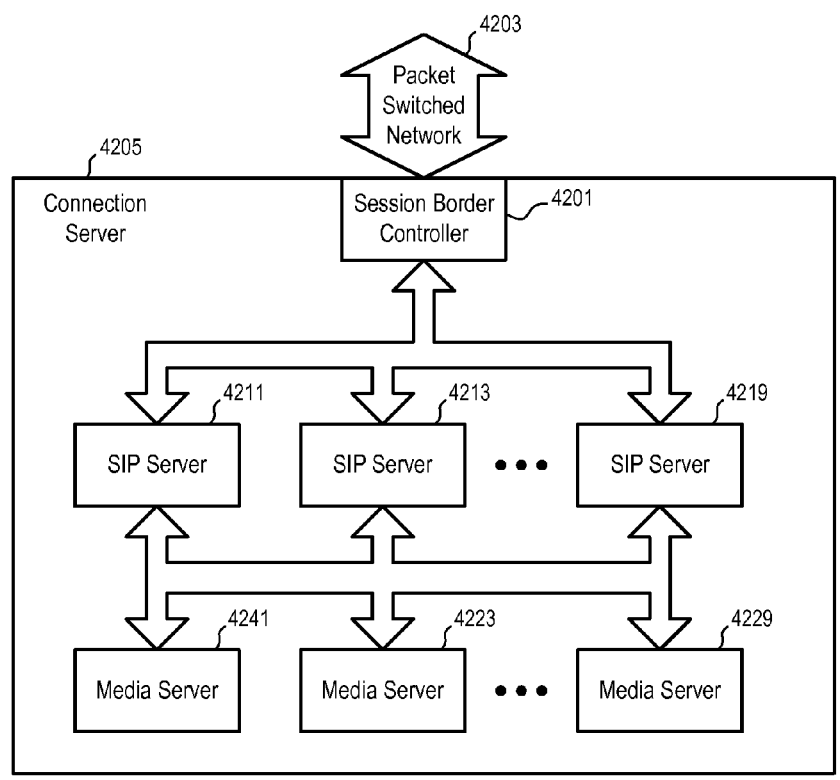
FIG. 42 shows a connection server according to one embodiment.

FIG. 42 shows a connection server according to one embodiment. In FIG. 42, the connection server (4205) is configured to place and/or receive VoIP calls using Session Initiation Protocol (SIP). A session border controller (4201) is used to interface with the packet switched network (4203) and control the types of network traffic related to VoIP calls that might go into the connection server (4205).

In one embodiment, the session border controller (4201) is configured to control the signaling and media stream during the setting up, conducting and tearing down of VoIP calls to or from the connection server (4205). In some embodiments, the session border controller (4201) may pick up the call that comes to the session border controller (4201), places a separate call from the session border controller (4201), and joins the received call and the placed call to control both the signaling and media stream. In some embodiments, the session border controller (4201) may perform signaling/encoding translation to allow the connection server (4205) to process the VoIP calls in one standard, while receiving VoIP calls in a variety of standards (e.g., SIP, H.323, etc.). In one embodiment, the session border controller (4201) is configured to perform one or more firewall functionalities, such as denial of service protection, call filtering, bandwidth management, etc.

In one embodiment, the session border controller (4201) is configured to perform media releasing operation. When the session border controller (4201) determines that the source and destination of a media stream is on the same side of the session border controller (4201) (e.g., both the source and the destination of the media stream is outside the connection server 4205), the session border controller (4201) can release the hairpinning of the media stream and allow the media stream to flow without going through the session border controller (4201).

In FIG. 42, a set of SIP servers (e.g., 4211, 4213, ..., 4219) are networked to the session border controller (4201) to receive messages for incoming calls and to initiate outgoing calls. The session border controller (4201) is configured to evenly distribute the calls for processing by the SIP servers.

For example, when an incoming message for the initiation of a call is received (e.g., a SIP INVITE message from the telecommunication carrier 4105), the session border controller (4201) may route it to a SIP server (e.g., 4211) for processing. The INVITE message includes the phone number dialed by the caller and the contact information about the caller (e.g., the phone number of the caller 4101 and/or the identity of the virtual SIP phone at the telecommunication carrier 4105).

The SIP server may determine whether the phone number dialed by the caller (4103) is sufficient to determine the phone number of the callee (e.g., 4103). If the phone number of the callee (e.g., 4103) can be determined from the phone number dialed by the caller (4103) (e.g., via decoding the phone number dialed by the callee, or looking up the phone number of the callee from a table using the phone number dialed by the caller as a key), the SIP server can place a separate SIP call to the callee via the packet switched network (4203) and then connect the caller and the callee. Alternatively, the SIP server can further route the SIP INVITE message (e.g., to the telecommunication carrier (4105) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identifies a media server (4221) (or a virtual softphone on SIP server) as the initiator for a separate call. The SIP server then connects the calls for the media stream.

In one embodiment, the caller is first connected to a media server (e.g., 4221, 4223, or 4229). For example, the SIP server may forward the SIP INVITE message to one or more of the media servers for answering the call. When a media server (e.g., 4221) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (4203) (e.g., by sending a SIP INVITE message to the telecommunication carrier 4105, which further bridges the call to the callee 4103). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (4201) into the connection server (4205). For example, the media stream can go through the telecommunication carrier (4105) in FIG. 41 without going to the connection server (4107) after the SIP server connects the caller and the callee.

However, the SIP server stays on the signaling path to monitor the progress and termination of the call. The SIP server can also break the connection between the caller and the callee, or force the media stream to come through the connection serve (4205). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (4203) for a connection to the caller. The SIP call may be bridged onto a circuit switched network (e.g., by a telecommunication carrier 4105). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (4211, 4213, ... , 4219) and media servers (4221, 4223, ... , 4229) are implemented on separate computers connected via a local area network (and/or intranet or Internet). Alternatively, at least the some of the servers can be implemented on a same computer. In one embodiment, the SIP servers and the media servers are also integrated with the session border controller (4201) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (4205) may further include a database server (4205) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

Figure 43:
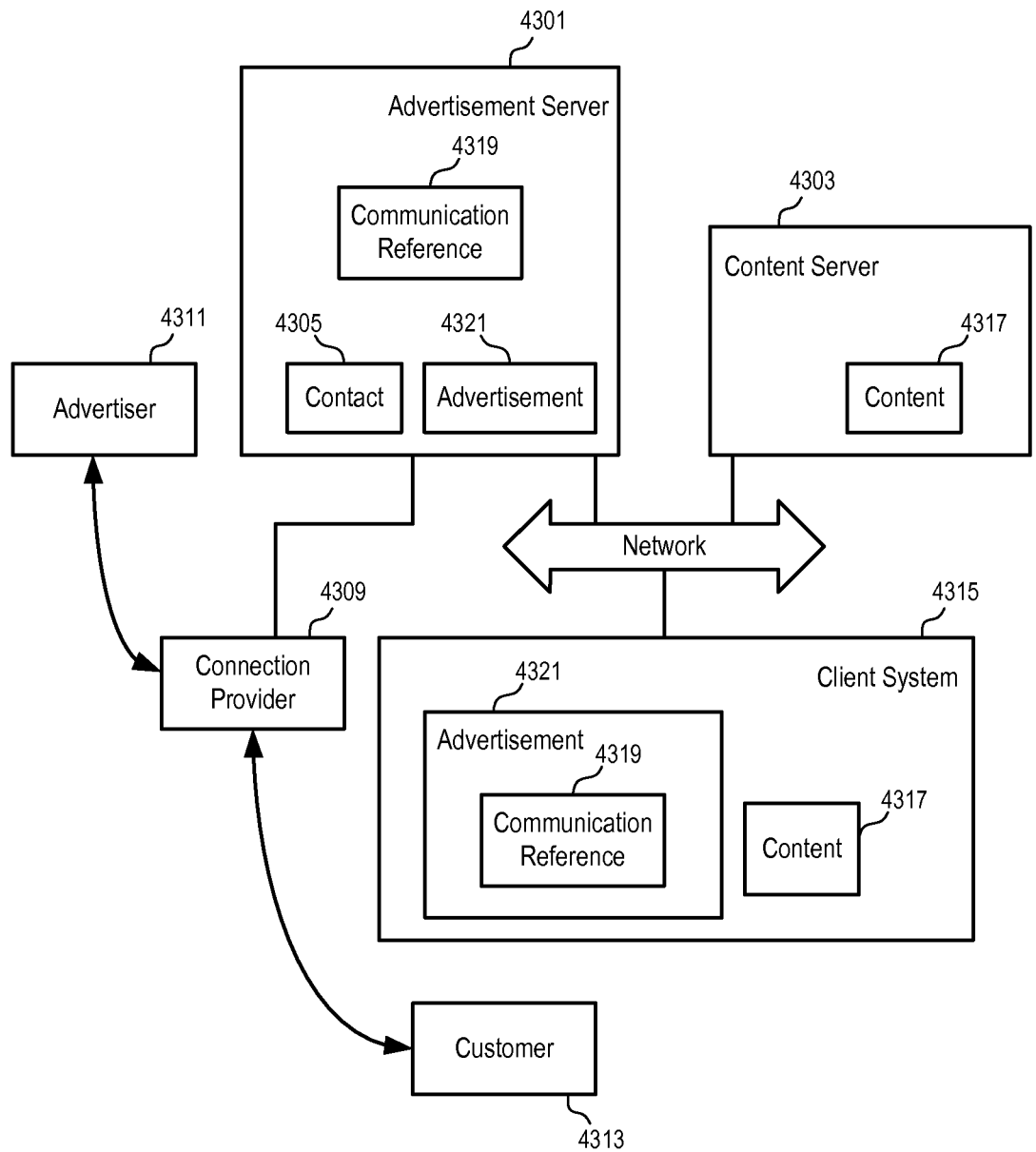
FIG. 43 illustrates a system to add advertisements with communication references to content hosted on a server for connecting a customer to advertisers relevant to the content according to one embodiment.

FIG. 43 illustrates a system to add advertisements with communication references to content hosted on a server for connecting a customer to advertisers relevant to the content according to one embodiment.

In FIG. 43, the content (4317) is hosted on a content server (4303). The content (4317) is to be presented to a customer (4313) by a client system (4315). In one embodiment, the content (4317) is presented together with advertisement (4321) and the communication reference (4319), which can be used to request the connection provider (4309) to provide a communication connection between the customer (4313) and the advertiser (4311). For example, the content (4317) may be a blog, a web site of a business, a profile page of a member of an online social network, an email message, an electronic book or magazine, a news article, etc.

In FIG. 43, the communication reference (4319) is associated, in the advertisement server (4301), with the contact (4305) of the advertiser (4311) and the provider of the content (4317). In one embodiment, a set of communication references is maintained by the advertisement server (4301); and the communication reference (4319) is selected from the set of communication references to represent the combination of the advertisement and the provider of the content (4317). In general, the provider of the content (4317) may or may not be the same as the operator of the content server (4303). In one embodiment, the provider of the content (4317) is a publisher or creator of the content (4317). In another embodiment, the communication reference (4319) includes an encoded or encrypted version of the contact (4305) of the advertiser (4311), which can be decrypted or decoded without using a database.

In one embodiment, the communication reference (4319) is a reference that can be used to establish a communication connection between the connection provider (4309) and the customer (4313), such as a 1-800 toll free number of the connection provider which is temporarily associated with the combination of the advertisement (4321) and the provider of the content (4317). The connection provider (4309) determined the contact (4305) and the provider of the content (4317) based on the communication references (4319) used to reach the connection provider (4309). The connection provider (4309) uses the contact (4305) to connect the customer (4313) to the advertiser (4311). Per the establishing of the connection between the advertiser (4311) and the customer (4313) via the advertisement, the advertiser (4311) is charged an advertisement fee and the provider of the content (4317) can be compensated. For example, the provider of the content (4317) can be credited according to a percentage of the advertisement fee. Alternatively or in combination, the content provider may be compensated based on the number of presentations of advertisements that are presented via the presentation of the content.

In one embodiment, the content (4317) is provided with a link or code pointing to the advertisement server (4301). When the content (4317) is presented on the client system (4315), the link causes the advertisement server (4301) to request the advertisement server (4301) to provide one or more advertisements, or to formulate a search to retrieve one or more advertisements from the advertisement server (4301), based on relevancy to the content (4317). The advertisement server (4301) then provides the client system (4315) with the advertisement (4321) and the communication reference (4319) which can be used to request the connection provider (4309) to establish a connection for real time communications between the advertiser (4311) and the customer (4313).

In one embodiment, the advertisement (4321) is identified after the content (4317) is being requested by the client system (4315) or after the content (4317) is loaded into the client system (4315).

In another embodiment, the client system (4315) is configured to automatically request the advertisement (4321) based on the content (4317). For example, the client system (4315) can be configured to formulate a search based on the content (4317) and submit the search to the advertisement server (4301) for the communication reference (4319). For example, a software module implemented as a toolbar of a web browser can be used to search the advertisement server (4301) for a relevant advertisement (4319).

In a further embodiment, the content server (4303) is configured to formulate a search for advertisements in response to a request from the client system (4315) for the content (4317). The advertisement (4321) and the communication reference (4319) can be provided together with the content (4317) by the content server (4303).

Figure 44:
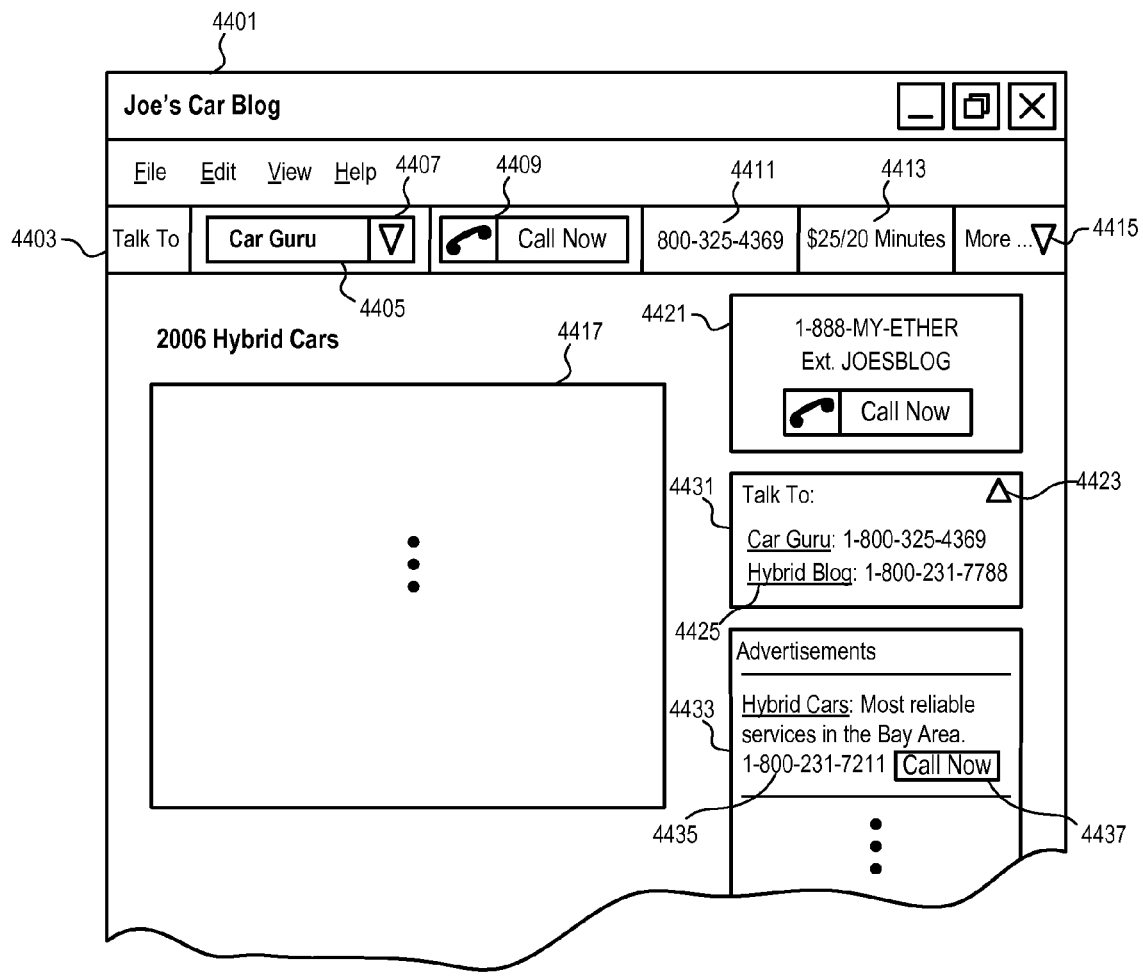
FIG. 44 illustrates an example of a document with added communication references for connecting a customer to people relevant to the content of the document according to one embodiment.

FIG. 44 illustrates an example of a document with added communication references for connecting a customer to people relevant to the content of the document according to one embodiment.

In FIG. 44, a document (4417) is presented in a browser (4401). The document may or may not include references to a number of peoples to whom a user of the browser (4401) may want to talk, after viewing the document (4417). For example, the document (4417) may be a blog of an expert, a profile page of a member of an online social network, a news article, an email message accessed through a web server, an electronic book or magazine.

In FIG. 44, a banner (4433) is used to present one or more pay-per-call advertisements which are selected according to the content of the document (4417). The contact information provided in the advertisement, such as a phone number (4435) and/or the call button (4437), is associated with the advertiser and the provider of the document (e.g., the publisher or the author of the document).

In one embodiment, the publisher or the author of the document is provided with a link or code that is to be embedded in the document. In the process of retrieving and/or rendering the document for display, the advertisements are dynamically identified based on the content of the document for inclusion in the document.

In one embodiment, the link or code includes a reference to an advertisement server (e.g., 4301 in FIG. 43) for a component of the document. When the document is rendered in a browser, the browser sends a request to the advertisement server, which dynamically determines the advertisements based on the content of the document. In one embodiment, the link or code identifies the document and/or the content provider. In another embodiment, the document and/or the content provider are determined based on a referring URL of the request that is generated by the browser for the component.

In one embodiment, the code includes a script for an applet which runs in the browser to formula a search based on the content of the document and to insert the retrieved advertisements into the document.

In one embodiment, the code includes a tag that provides information to the tool bar (4403) for the generation of the content in the banners (4421, 4431 and 4433).

In FIG. 44, the browser includes a tool bar (4403) which can be used to locate the telephonic communication references of peoples relevant to the document (4417). Examples of people relevant to the document (4417) include persons or entities named in the document, persons or entities having similar interest in the document, persons or entities providing services/advices in areas similar to the document, etc.

In one embodiment, the toolbar (4403) provides the address of the document to an advertisement server (e.g., 4301 in FIG. 43) to request for a list of communication references for the relevant peoples. In another embodiment, the toolbar (4403) determines a set of keywords based on the content of the document to format a search, which is submitted to the advertisement server (e.g., 4301 in FIG. 43) for a list of communication references of relevant peoples. Alternatively, the document (4417) and the communication references are provided by a content server (e.g., 4303 in FIG. 43); and the browser (4401) is configured to render the communication references in the toolbar (4403).

In FIG. 44, the toolbar (4403) includes a list of identifiers of the relevant people, which can be selectively displayed in the text field (4405) via the selection tool (4407). In one embodiment, at least one of the relevant people is not explicitly referenced in the document (4417) but identified based on relevance to the content of the document (4417).

A button (4409) can be used to initiate a request for a connection to the person/entity selected and displayed in the text field (4405). In one embodiment, the button (4409) indicates a real time availability of the person/entity for taking a call for real time communications with the user of the browser (4401). For example, when the person/entity is available to take the call (e.g., according to a pre-defined schedule of the person/entity, or according to real time presence information obtained via a communication network), the button (4409) displays a "call now" status; if the person/entity is available to take the call, the button (4409) displays a "schedule now" status. In one embodiment, when the person/entity is not available to communicate in person but has a pre-recorded message, the button (4409) displays a "listen now" status.

In one embodiment, after the button (4409) is selected, a request for callback to a phone number specified by the user of the browser (4401) is transmitted to the connection provider (4309). A call graph may be displayed to guide the user through the connection process. For example, a call graph can be displayed to collect the callback number of the user of the browser (4401), if the callback number is not pre-configured (e.g., previously configured for the toolbar 4403).

In another embodiment, after the button (4409) is selected, a VoIP-based telephone call (e.g., a SIP call) is initiated from the client computer running the browser (4401); and the VoIP-based telephone call is placed to a connection provider (e.g., 4309) based on a communication reference (4319) assigned to the advertiser (4311).

In another embodiment, after the button (4409) is selected, an instant messaging session is established based on a communication reference assigned to the person/entity selected and displayed in the text field (4405). The instant messaging session may support text chat, voice chat, video chat, common whiteboarding, application sharing, and/or others.

In FIG. 44, the toolbar (4403) also displays a telephone number (4411) associated with the selected and displayed person/entity (4405). In one embodiment, when the telephone number (4411) is dialed, the call is connected to a connection provider (e.g., 4309 in FIG. 43); the connection provider determines the contact (e.g., 4305 in FIG. 43) of the person/entity (4405) based on the dialed number and further connects the call to the person/entity (4405). Alternatively, the telephone number (4411) may be assigned to the person/entity (4405) by a telephone carrier; and when the telephone number (4411) is dialed, the call is connected to the person/entity (4405) by the telephone carrier.

In FIG. 44, the toolbar (4403) also displays the price (4413); and the user of the browser (4401) will be charged for the price (4413) for real time communicates with the person/entity (4405). For example, the user may purchase a package of 20 minutes, at a price of $25 for real time communications with the person/entity (4405); and the purchased bulk minutes (e.g., 20 minutes) can be used in one or more separate calls within a pre-determined time period.

In FIG. 44, the toolbar (4403) includes a selection button (4415) for further display of other information relevant to the selected person/entity (4405). For example, an advertisement message by the person/entity (4405) can be displayed using the selection button (4415); a link to a web page that contains an embedded call button assigned to the person/entity (4405) can be displayed.

In FIG. 44, a banner (4421) is displayed to show the contact information of the author of the document (4417). The contact information may include a telephone number and/or a call button assigned to the author.

In one embodiment, the author of the document (4417) is provided with a link or code pointing to a server of the connection provider or contact server. The link or code is to be embedded by the author of the document in the web page, such that when the web page is rendered, the banner (4421) is obtained from the server for display.

In another embodiment, a content management tool is used to generate the web page based on content and author information maintained by the content server; and the content management tool is configured to automatically determine whether the author of the document (4417) has a telephone number and/or a call button and to generate the link to the banner (4421) if the contact information of the author is available. In one embodiment, the author of the document (4417) can specify whether or not the content management tool can create the banner link for the document (4417).

In FIG. 44, the banner (4421) is for a pre-identified person/entity (e.g., the author of the document 4417). Another banner (4431) is used to present the communication references for a set of persons/entities that are dynamically identified based on the content of the web page and/or the preferences of the user of the browser (4401); and such persons/entities may or may not be explicitly mentioned in the document (4417).

In one embodiment, a link to the contact server (or connection provider) is embedded in the web page by the author of the web page or by a content management tool. When the web page is rendered, the contact server dynamically determines a set of persons/entities who are relevant to the web page and to who the user of the browser (4401) may want to talk. The list of persons/entities can be sorted according to a degree of relevance to the web page, the likelihood of the user talking to them, and/or the prices of the persons/entities.

In one embodiment, a control element (4423) can be used to scroll the list to display a selected portion of the list in a banner of a limited size. In the list, a link (e.g., 4425) can be used to initiate a request for a callback, a VoIP-based call, an IM session, or a request for a web page that presents further information about the corresponding person/entity. For example, the link (4425) may point to a blog page which has an embedded call button of the relevant person. Alternatively, the link (4425) may represent the call button of the relevant person.

In another embodiment, iconic representations of call buttons of the set of relevant persons/entities are also presented in the list.

In one embodiment, the list can be selected to present an expanded, detailed list of the relevant persons/entities.

In some embodiments, the document may be presented with some of the features but not all. For example, in one embodiment, the tool bar (4403) is optional; in another embodiment, the banners (4421 and 4431) may not be presented; in a further embodiment, the document includes the banner (4433) but not the tool bar (4403) and the other banners (4421 and 4431). In one embodiment, the banners (4421, 4431 and 4433) are implemented using one link or code, which selectively renders the features based on the content of the document.

Figure 45:
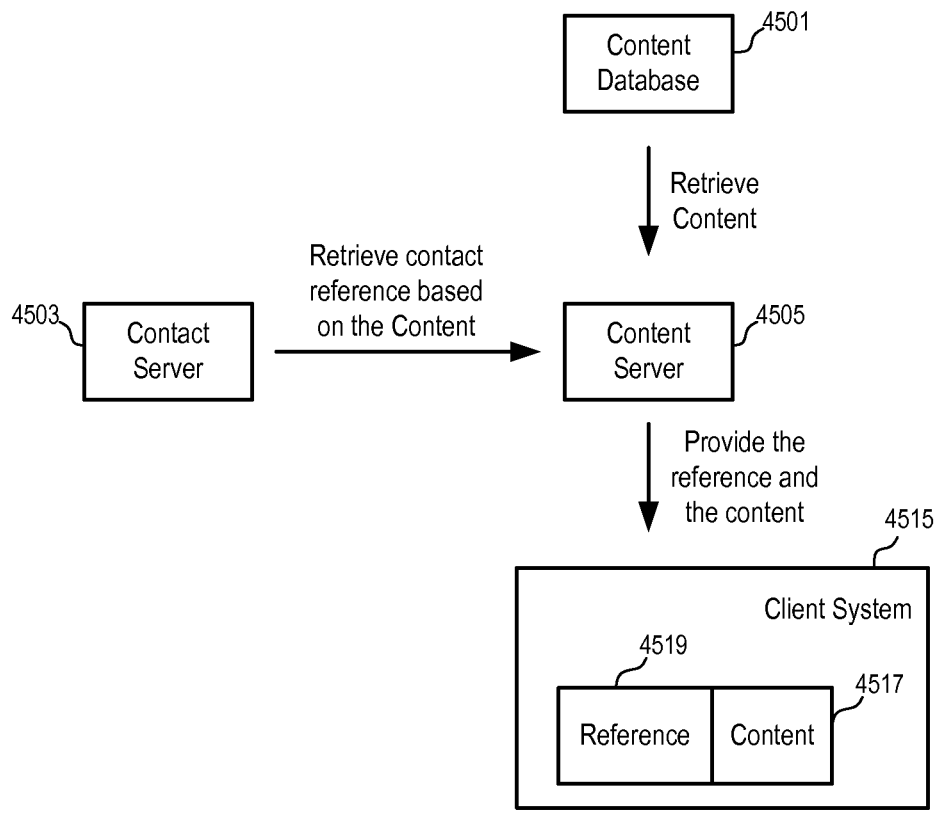
FIG. 45 illustrates a method to add communication references via a content management system to allow a user to request a connection to people relevant to the content for real time communications according to one embodiment.

FIG. 45 illustrates a method to add communication references via a content management system to allow a user to request a connection to people relevant to the content for real time communications according to one embodiment.

In FIG. 45, the content server (4505) generates a web page for the client system (4515) in response to a request from the client system (4515). The content server (4505) retrieves the requested content from the content database (4501) and retrieves contact references from the contact server (4503) based on the retrieved content.

In one embodiment, the content server (4505) determines the persons/entities that are explicitly referenced in the retrieved content and adds the contact information for the explicitly referenced persons/entities to the content. For example, the content server may identify the explicitly referenced persons/entities based on the author information, the names and/or titles mentioned in the content, etc. In one embodiment, the content server (4505) modifies the presentation of the content to show the communication references of the explicitly referenced persons/entities at locations close to where the references are made. For example, call buttons and/or telephone numbers can be appended to the name of the author; the names of the entities can be hyperlinked for access to their call buttons and/or telephone numbers; etc.

In one embodiment, to obtain the list of explicitly referenced persons/entities, the content server (4505) determines a set of search terms that are identifiers of persons/entities, such as names, user identifiers, email addresses, telephone numbers, etc.

Alternatively or in combination, the content server (4505) determines the relevant advertisers/persons/entities based on matching the topic of the content to the topics associated with the advertisers/persons/entities. For examples, the topic of the content can be matched to the topics of the advertisements of persons/entities to identify the relevant persons/entities. For example, the topic of the content can be matched to the topics of the web pages which have embedded call buttons for the corresponding persons/entities.

In one embodiment, to obtain the list of relevant advertisers/persons/entities, the content server (4505) determines a set of search terms that are representative of the topic of the content and that are generally not unique to advertisers/persons/entities. Alternatively or in combination, explicitly referenced persons/entities can also be used as a search term to determine related persons based on a database of social network.

Thus, a search of relevant advertisers/persons/entities related to the content (4517) can be performed automatically for the client system (4515) based on the requested content. The contact reference (4519) and the content (4517) are provided together to the client system (4515) for presentation.

Figure 46:
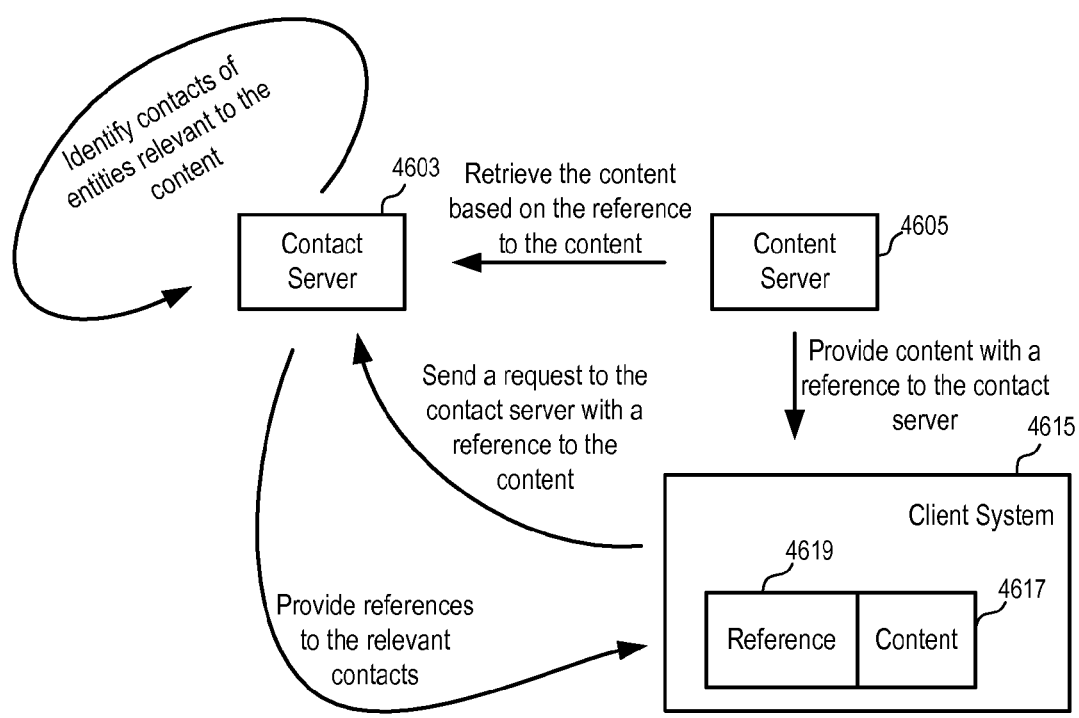
FIG. 46 illustrates another method to add communication references to allow a user to request a connection to people relevant to the content for real time communications according to one embodiment.

FIG. 46 illustrates another method to add communication references to allow a user to request a connection to people relevant to the content for real time communications according to one embodiment.

In FIG. 46, the content (4617) is provided to the client system (4615) by the content server (4605) together with a reference (4619) to the contact server (4603). When the client system (4615) renders the content (4617) and the reference (4619) for display, the client system (4615) sends a request to the contact server with a reference to the content.

For example, the reference (4619) can be implemented as a link or code pointing to the contact server. When a request is sent to the contact server (4603) according to the link, the referring URL that represents an address for the content (4617) is also sent to the contact server (4603). Using the referring URL, the contact server (4603) can retrieve the content from the content server (4605) to identify contacts of entities relevant to the content (4617) that is to be presented on the client system (4615), if the content (4617) is not already indexed or cached on the contact server. The entities may include advertisers of advertisements relevant to the content (4617).

In another embodiment, the content (4617) is pre-analyzed to generate a set of keywords that are representative of the content (4617). The set of keywords can be embedded in the reference (4619) and provided to the contact server (4603) with the request for relevant advertisements and contact information of relevant entities.

After the contacts of the relevant identities are identified based on the content retrieved by the contact server (4603) from the content server (4605), references to the relevant contacts are provided by the contact server (4603) to the client system (4615) for display with the content (4617). In one embodiment, the references to the relevant contacts (e.g., call buttons or telephone numbers) are presented separately from the content (4617). In one embodiment, relevant advertisements with call buttons and/or references for requesting a connection for real time communications in text, voice and/or video are also provided. The assigned communication references are used both to represent the advertisers and to track the contribution of the content providers in reaching the advertisers.

In one embodiment, the reference to the contact server provided by the content server (4605) may also include parameters that can be used to limit the scope of the search to be performed by the contact server (4603). For example, it may be desirable to exclude certain entities, such as the competitors of the content server (4605), from being listed with the content (4617).

In FIG. 46, the contact server (4603) is configured to obtain the content from the content server for the search of relevant entities. Alternatively, the search may be formulated at the client system (4615) (e.g., via a module of a browser such as a toolbar module, or a script embedded in or provided with the content, etc.)

Figure 47:
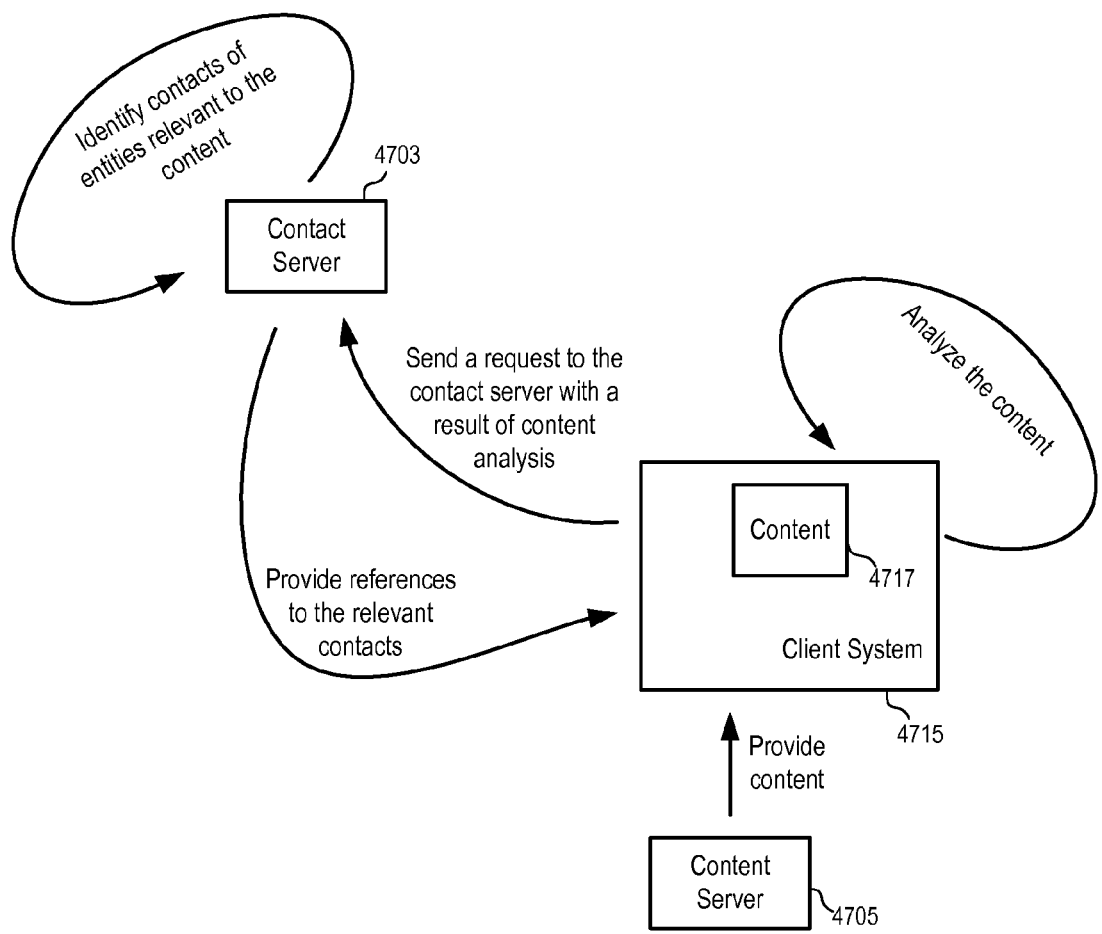
FIG. 47 illustrates a further method to add communication references to allow a user to request a connection to people relevant to the content for real time communications according to one embodiment.

FIG. 47 illustrates a further method to add communication references to allow a user to request a connection to people relevant to the content for real time communications according to one embodiment.

In FIG. 47, after the client system (4715) obtains the content (4717), the content (4717) is analyzed by the client system (4717) to determine the search terms for obtaining contacts of relevant entities, which may include relevant advertisers. For example, the search terms can be determined by the browser for the presentation of the content, or a plug-in module (e.g., a toolbar module) for the browser, or a script module sent with the content (4717) to the client system (4715), or a script module received according to a link sent to the client system (4715) with the content (4717), etc.

The client system (4715) sends a request to the contact server (4703) with the result of the content analysis. For example, the search terms can be sent to the contact server (4703) in a request for a list of relevant persons, their contact information, and/or their advertisement messages. In one embodiment, the information provided by the contact server includes information published by the entities (e.g., in blogs or other web sites on the Internet) and/or information to be published on behalf of the entities (e.g., advertisements of the entities).

The client system (4715) then presents the references to the relevant contacts together with the content. For example, a list of call buttons, telephone numbers, advertisements, and/or links to web pages that contain the corresponding call buttons can be presented in an area separate from the content (4717) in a web page.

Figure 48:
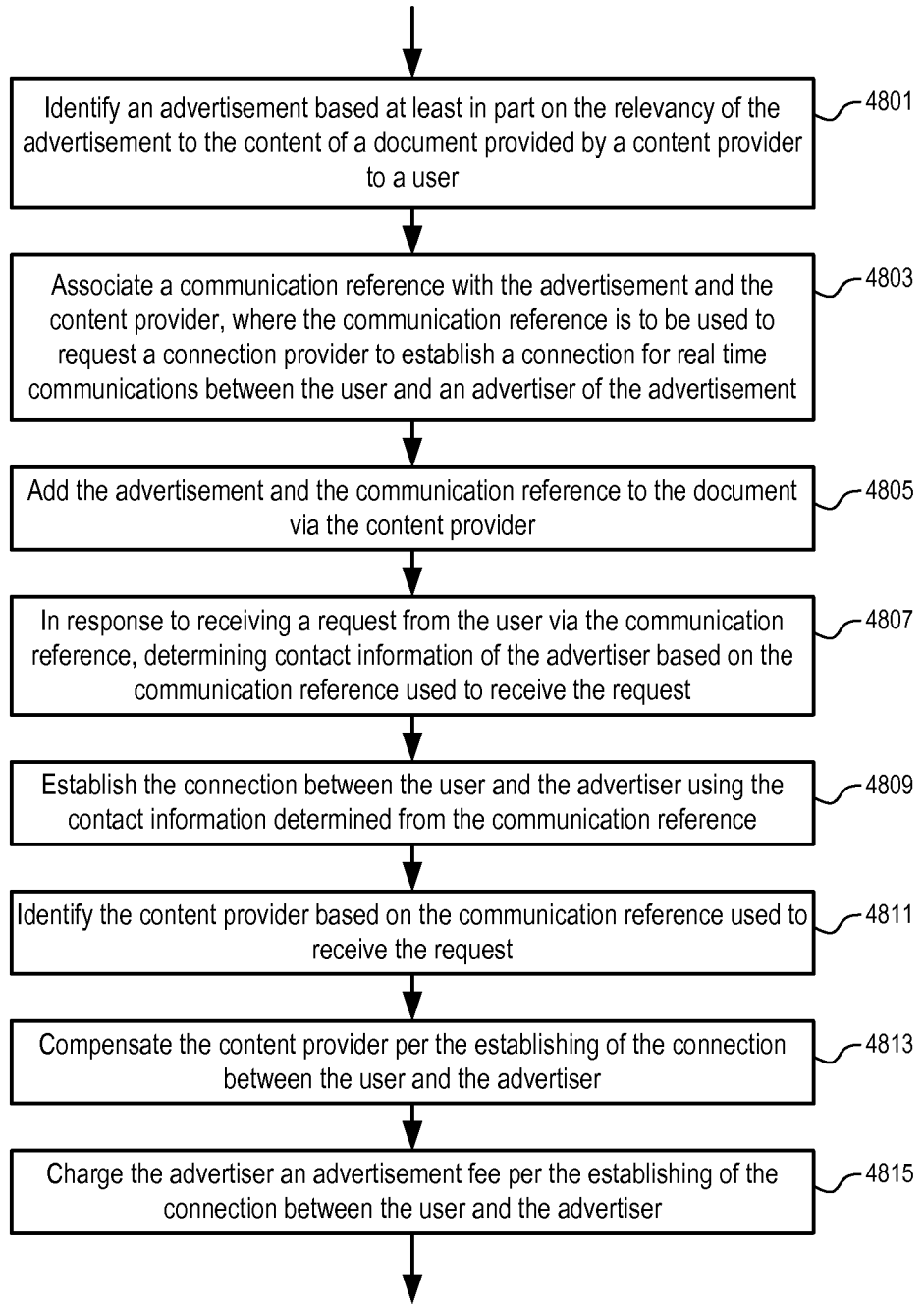
FIG. 48 illustrates a method to provide advertisements to facilitate real time communications between people according to one embodiment.

FIG. 48 illustrates a method to provide advertisements to facilitate real time communications between people according to one embodiment. In FIG. 48, after an advertisement is identified (4801) based at least in part on the relevancy of the advertisement to the content of a document provided by a content provider to a user, a communication reference that is to be used to request a connection provider to establish a connection for real time communications between the user and an advertiser of the advertisement is associated (4803) with both the advertisement and the content provider. The content of the document may be a blog, a profile page of a member of an online social network, an email message accessed via a web site, a news article, an electronic book, or an electronic magazine In one embodiment, the communication reference includes a telephone number of the connection provider without an extension, a telephone number of the connection provider with an extension, a session initiation protocol (SIP) uniform resource identifier (URI), or a Voice over Internet Protocol (VoIP) user identifier. In one embodiment, the communication reference comprises a link which when selected by the user causes a telephonic application to initiate a telephone call.

In FIG. 48, the advertisement and the communication reference are added (4805) to the document via the content provider. For example, the content provider may embed a code in the content to cause a browser to request for an advertisement when the document is rendered in the browser. Alternatively, the advertisement and the communication reference may be statically embedded in the document by the content provider prior to the user requesting the document, or be dynamically embedded in the document in response to the user requesting the document.

In FIG. 48, in response to a request received from the user via the communication reference, contact information of the advertiser is determined (4807) based on the communication reference used to receive the request; and using the contact information determined from the communication reference the connection is established (4809) for real time communications between the user and the advertiser. In one embodiment, the connection between the user and the advertiser includes a connection for real time communications between the user and the advertiser in text, voice or video.

In FIG. 48, the content provider is identified (4813) based on the communication reference used to receive the request and compensated (4815) per the establishing of the connection between the user and the advertiser.

In one embodiment, the advertiser is charged (4815) an advertisement fee per the establishing of the connection between the user and the advertiser.

In one embodiment, the connection between the user and the advertiser includes a telephonic connection. The connection provider receiving a telephone call from the user according to the communication reference to receive the request for the connection; and the connection provider places a separate telephone call to the advertiser and bridges the telephone call received from the user and the separate telephone call placed to the advertiser to establish the connection between the advertiser and the user.

In one embodiment, the connection provider establishes a first Voice over Internet Protocol (VoIP) connection with a telecommunication carrier which bridges the first VoIP connection to a public switched telephone network (PSTN) to the user, establishes a second Voice over Internet Protocol (VoIP) connection with a telecommunication carrier which bridges the second VoIP connection to a public switched telephone network (PSTN) to the advertiser, and connecting the first and second VoIP connections. In one embodiment, a media connection that does not go through the connection provider is established to connect the user and the advertiser.

In one embodiment, the connection provider may optionally provide language translation and/or format conversion to bridge the connections. For example, the connection provider may translate a message from a first spoken language to a second spoken language for transferring the message from the first connection to the second connection. For example, the connection provider may convert a message between text and voice to bridge the connections.

In one embodiment, to add the advertisement and the communication reference to the document, the content provider is provided with a code to be embedded in the document, which when loaded into a browser generates a request from the browser in reference to the document. In response to the request from browser, the advertisement and the communication reference are provided to the browser for display to the user. In one embodiment, the code includes a script which adds the advertisement and the communication reference to the document that is being rendered by the browser. In one embodiment, the advertisement is identified in response to the request from the browser.

In one embodiment, the identifying of the advertisement includes: receiving the document from the content provider; determining one or more keywords from the document; searching an advertisement database based on the one or more keywords; sorting a plurality of candidates resulted from the searching of the advertisement database; and based on a result of the sorting of the plurality of candidates, selecting one or more advertisements from the candidates for inclusion in the document.

In one embodiment, the searching of the advertisement database is based at least in part on the availability of advertisers to communicate with the user in real time according to schedules of the advertisers. For example, the advertisers who are not available for real time communications may be excluded.

In one embodiment, the searching of the advertisement database filters out advertisers of competitors of the content provider.

In one embodiment, the candidates are sorted according to bid prices of advertisers of the candidates; and the bid prices are to be charged in response to the connection provider connecting the user to advertisers of the candidates for real time voice communications.

In one embodiment, the candidates are sorted according to earning potentials of presenting the respective candidates. The earning potentials may include advertisement fees charged per establishing real time communication connections from a customer to the advertisers of the candidates and commission fees charged based on customer purchases via the real time communication connections between the customer and the advertisers of the candidates. In one embodiment, the likelihood of commission fees generated from returning customers is also considered in estimate the earning potentials.

In general, the routines executed to implement the processes may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects. Moreover, while the disclosure has been provided in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks (DVDs), etc.), among others, and transmission type media such as digital and analog communication links.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

What is claimed is:

1. A method, comprising:
  processing, by a web server, a request for an advertisement in reference to a document provided to a client system by a content server, the request received from the client system or the content server;
  responsive to the processing the request, determining, by an advertisement server coupled to the web server, a set of keywords representing content of the document;
  based at least in part on the set of keywords, searching, by the advertisement server, an advertisement database coupled to the advertisement server to identify an advertisement based at least in part on relevancy of the advertisement to the content of the document;

selecting, by the advertisement server, a communication reference from a pool of communication references that are dynamically recycled based on a predetermined set of allocation rules;

storing in the advertisement database a set of parameters in association with the advertisement, the set of parameters specifying the communication reference allocated to the advertisement and associated with a content provider for a first predefined period of time, the communication reference useable to request a telecommunication server to establish a connection for real time communications between a user of the client system and an advertiser of the advertisement;

generating, by the web server, a second document at least in part by adding the advertisement and the communication reference to the document;

transmitting, by the web server, the second document for presentation via the client system to the user of the client system;

processing, by at least one telecommunication server coupled to a session border controller configured to interface with a packet switched network, a connection request received from the client system utilizing the communication reference;

in response to the connection request from the client system using the communication reference, causing, by the at least one telecommunication server, the set of parameters stored in the advertisement database to be modified to extend the association of the communication reference with the advertisement for a second period of time and determining contact information of the advertiser based on the communication reference used to transmit the connection request;

establishing, by the at least one telecommunication server, the connection for real time communications between the user and the advertiser using the contact information determined from the communication reference; and identifying, by the at least one telecommunication server, the content provider based on the communication reference used to transmit the connection request, wherein the content provider is compensated for the connection based at least in part on the establishing of the connection for real time communications between the user and the advertiser.

2. The method of claim 1, wherein the communication reference comprises one of a telephone number of a connection provider without an extension, a telephone number of the connection provider with an extension, a session initiation protocol uniform resource identifier, or a voice over Internet protocol user identifier.

3. The method of claim 2, further comprising:
charging the advertiser an advertisement fee for establishing of the connection for real time communications between the user and the advertiser.

4. The method of claim 2, wherein the communication reference comprises a link which when selected by the user causes a telephonic application to initiate a telephone call.

5. The method of claim 2, wherein the connection for real time communications between the user and the advertiser includes a connection for real time communications between the user and the advertiser in at least one of text, voice, and/or video.

6. The method of claim 2, wherein the connection for real time communications between the user and the advertiser includes a telephonic connection.

7. The method of claim 6, further comprising: receiving the connection request from the user, where the receiving includes the connection provider receiving a telephone call from the user; and
the establishing the connection for real time communications includes the connection provider placing a separate telephone call to the advertiser and bridging the telephone call received from the user and the separate telephone call placed to the advertiser.

8. The method of claim 6, wherein the establishing of the connection for real time communications includes:
the connection provider establishing a first voice over Internet protocol connection with a telecommunication carrier which bridges the first voice over Internet protocol connection to a switch in a public switched telephone network to the user;
the connection provider establishing a second voice over Internet protocol connection with a telecommunication carrier which bridges the second voice over Internet protocol connection to a switch in the public switched telephone network to the advertiser; and
connecting the first voice over Internet protocol connection and the second voice over Internet protocol connection.

9. The method of claim 8, wherein connecting the first voice over Internet protocol connection and second voice over Internet protocol connection comprises establishing a media connection that does not go through the connection provider to connect the user and the advertiser.

10. The method of claim 1, wherein the adding the advertisement and the communication reference to the document comprises:
providing the content provider with a code to be embedded in the document, when loaded into a browser, the code generating a request from the browser in reference to the document; and
providing the advertisement and the communication reference to the browser in response to the request from the browser.

11. The method of claim 10, wherein the advertisement is identified in response to the request from the browser.

12. The method of claim 1, wherein
the document is received from the content provider.

13. The method of claim 12, wherein the identifying the advertisement further comprises:
sorting a plurality of candidate advertisements found resulting from searching the advertisement database; and
based on a result of the sorting the plurality of candidates, selecting at least one advertisement from the candidates for inclusion in the document.

14. The method of claim 13, wherein the searching includes searching with a criterion based on availability of an advertiser to communicate with the user in real time according to a schedule of the advertiser.

15. The method of claim 13, wherein the searching includes searching with a criterion to filter out advertisements of competitors of the content provider.

16. The method of claim 13, wherein the sorting includes sorting according to bid prices of advertisers of the candidate advertisements; wherein the bid prices are charged in response to the connection provider connecting the user to an advertiser.

17. The method of claim 13, further comprising:
determining an earning potential of presenting a respective candidate advertisement of the candidate advertisements;

wherein the sorting includes sorting the candidate advertisements according to respective earning potentials; and wherein each respective earning potential includes an advertisement fee charged for establishing a real time communication connection from a customer to the advertiser of the candidate advertisement and a commission fee charged based on a customer purchase resulting from the real time communication connection between the customer and the advertiser of the candidate.

18. The method of claim 1, wherein the content of the document comprises at least one of a blog, a profile page of a member of an online social network, an email message accessed via a web site, a news article, an electronic book, and/or an electronic magazine.

19. One or more non-transitory, machine-readable media storing instructions that, when executed by a server system, cause the server system to perform a method, the method comprising:

processing a request for an advertisement in reference to a document provided to a client system by a content server, the request received from the client system or the content server;

responsive to the processing the request, determining a set of keywords representing content of the document;

based at least in part on the set of keywords, searching an advertisement database to identify an advertisement based at least in part on relevancy of the advertisement to the content of the document;

selecting a communication reference from a pool of communication references that are dynamically recycled based on a predetermined set of allocation rules;

storing in the advertisement database a set of parameters in association with the advertisement, the set of parameters specifying the communication reference allocated to the advertisement and associated with a content provider for a first predefined period of time, the communication reference to be used to request a telecommunication server to establish a connection for real time communications between a user of the client system user and an advertiser of the advertisement;

generating a second document at least in part by adding the advertisement and the communication reference to the document;

transmitting the second document for presentation via the client system to the user of the client system;

processing a connection request received from the client system utilizing the communication reference;

in response to the connection request received from the client system via the communication reference, causing, by the at least one telecommunication server, the set of parameters stored in the advertisement database to be modified to extend the association of the communication reference with the advertisement for a second period of time and determining contact information of the advertiser based on the communication reference used to receive the connection request;

establishing the connection for real time communications between the user and the advertiser using the contact information determined from the communication reference;

identifying the content provider based on the communication reference used to receive the connection request; and compensating the content provider per the establishing of the connection for real time communications between the user and the advertiser.

20. A server system, comprising:

a web server configured to:
  process a request for an advertisement in reference to a document provided to a client system by a content server, the request received from the client system or the content server;
  transmit the advertisement and a communication reference for inclusion in the document for presentation via the client system to a user of the client system, the communication reference to be used to request a telecommunication server to establish a connection for real time communications between the user and an advertiser of the advertisement;

an advertisement server coupled to the web server and configured to:
  determine a set of keywords representing content of the document;
  based at least in part on the set of keywords, search an advertisement database coupled to the advertisement server to identify the advertisement based at least in part on relevancy of the advertisement to the content of the documents; and
  select a communication reference from a pool of communication references that are dynamically recycled based on a predetermined set of allocation rules;
  store in the advertisement database a set of parameters in association with the advertisement, the set of parameters specifying the communication reference allocated to the advertisement and associated with a content provider for a first predefined period of time;

a session border controller configured to interface with a packet switched network; and at least one telecommunication server coupled to the session border controller and the advertisement server, the at least one telecommunication server configured to:
  process a connection request received from the client system utilizing the communication reference;
  determine contact information of the advertiser based on the communication reference used to receive the connection request;
  cause the set of parameters stored in the advertisement database to be modified to extend the association of the communication reference with the advertisement for a second period of time upon receipt of the connection request;
  identify the content provider based on the communication reference used to receive the connection request; and
  establish the connection for real time communications between the user and the advertiser using the contact information determined from the communication reference;

wherein the content provider is compensated for the connection for real time communications between the user and the advertiser being established; and wherein the advertiser is charged an advertisement fee for the connection for real time communications between the user and the advertiser being established.

* * * * *